(12) United States Patent
Nix

(10) Patent No.: US 12,342,166 B2
(45) Date of Patent: Jun. 24, 2025

(54) EAP-TLS AUTHENTICATION WITH CONCEALED USER IDENTITIES AND WIRELESS NETWORKS

(71) Applicant: John A. Nix, Evanston, IL (US)

(72) Inventor: John A. Nix, Evanston, IL (US)

( * ) Notice: Subject to any disclaimer, the term of this patent is extended or adjusted under 35 U.S.C. 154(b) by 0 days.

(21) Appl. No.: 18/752,521

(22) Filed: Jun. 24, 2024

(65) Prior Publication Data
US 2024/0349053 A1   Oct. 17, 2024

Related U.S. Application Data

(63) Continuation of application No. 17/625,296, filed as application No. PCT/US2020/041048 on Jul. 7, 2020, now Pat. No. 12,022,287.
(Continued)

(51) Int. Cl.
*H04L 29/06* (2006.01)
*H04L 9/06* (2006.01)
(Continued)

(52) U.S. Cl.
CPC ......... *H04W 12/069* (2021.01); *H04L 9/0643* (2013.01); *H04L 9/0841* (2013.01); *H04L 63/0869* (2013.01); *H04L 63/166* (2013.01)

(58) Field of Classification Search
CPC . H04W 12/041; H04W 12/043; H04W 12/06; H04W 12/069; H04L 9/0643;
(Continued)

(56) References Cited

U.S. PATENT DOCUMENTS 7,774,411 B2   8/2010 LeMay et al.
8,601,569 B2   12/2013 Segre et al.
(Continued)

FOREIGN PATENT DOCUMENTS

WO   2018208228 A2   11/2018
WO   2019020439 A1   1/2019
WO   2020223319 A1   11/2020

OTHER PUBLICATIONS

ETSI Technical Standard 133 501 v.15.1.0, "5G; Security architecture and procedures for 5G System", Jul. 2018.
(Continued)

*Primary Examiner* — Malcolm Cribbs
(74) *Attorney, Agent, or Firm* — GrowIP Law Group LLC

(57) ABSTRACT

A device, mobile operator, network, and a device provider can exchange messages for EAP-TLS authentication. The network can include an authentication server function (AUSF). A device and a device provider can record both a device certificate and a device provider certificate. The network can receive an encrypted identity for the device and forward the identity to the device provider. The device provider can send the device certificate and the device provider certificate to the network. The network can (i) receive a "client hello", (ii) select a network public key and private key, and (iii) send a certificate signing request to the device provider with the network public key, and (iv) receive a network certificate verified by the device provider certificate. The network can receive the device certificate from the device in a TLS handshake and mutually authenticate with the device using the received network certificate and the device certificate.

13 Claims, 7 Drawing Sheets

Related U.S. Application Data

(60) Provisional application No. 62/871,298, filed on Jul. 8, 2019.

(51) Int. Cl.
| | | |
|---|---|---|
| *H04L 9/08* | (2006.01) | |
| *H04L 9/40* | (2022.01) | |
| *H04W 12/069* | (2021.01) | |

(58) Field of Classification Search
CPC ... H04L 9/0841; H04L 63/08; H04L 63/0823; H04L 63/0869; H04L 63/166
See application file for complete search history.

(56) References Cited

U.S. PATENT DOCUMENTS

| 9,648,019 | B2 | 5/2017 | Khello et al. |
|---|---|---|---|
| 10,716,002 | B2 | 7/2020 | Rajadurai et al. |
| 2008/0170520 | A1 | 7/2008 | Sim et al. |
| 2009/0083538 | A1 | 3/2009 | Merugu et al. |
| 2014/0282957 | A1 | 9/2014 | Thakore et al. |
| 2017/0111179 | A1 | 4/2017 | Gero et al. |
| 2019/0098502 | A1 | 3/2019 | Torvinen et al. |
| 2020/0344052 | A1 | 10/2020 | Fay |
| 2020/0344601 | A1* | 10/2020 | Baskaran .............. H04W 12/06 |
| 2021/0092603 | A1 | 3/2021 | Yang et al. |
| 2021/0203488 | A1 | 7/2021 | Ståhl |
| 2021/0368345 | A1 | 11/2021 | Nakarmi et al. |
| 2021/0377741 | A1 | 12/2021 | de Perthuis et al. |

OTHER PUBLICATIONS

Federal Institute of Industrial Property, Russia, "Written Opinion of the International Searching Authority" for WO2020223319, Sep. 20, 2020.

Internet Engineering Task Force (IETF) Request for Comments (RFC) 5216, "The Network Access Identifier", Mar. 2008.

Internet Engineering Task Force (IETF) Request for Comments (RFC) 7542, "The Network Access Identifier", May 2015.

Internet Engineering Task Force (IETF) Request for Comments (RFC) 8446, "The Transport Layer Security (TLS) Protocol Version 1.3", Aug. 2018.

Wikipedia, "Certificate Signing Request", May 1, 2019.

Wikipedia, "Post-Quantum Cryptography Standardization", Feb. 22, 2019.

Written Opinion of the International Searching Authority, International Application No. PCT/US2020/041048, Oct. 8, 2020.

* cited by examiner

Figure 3

Device Database 104d

| Device | NAI User Name | Device ID / SUPI 101a | Device Certificate 101c | Provider ID 104a | Provider Certificate 104c | Provider Secret Key 104e | Secret Key Parameters 111a" | Cert.Net 103c Signature Algorithm 111d |
|---|---|---|---|---|---|---|---|---|
| 1 | user-1 | 101a-1 | 101c-1 | 104a-1 | 104c-1 | 104e-1 | 111a"-1 | 111d-1 |
| 2 | user-2 | 101a-2 | 101c-2 | 104a-1 | 104c-1 | 104e-1 | 111a"-1 | 111d-1 |
| 3 | user-3 | 101a-3 | 101c-3 | 104a-2 | 104c-2 | 104e-2 | 111a"-2 | 111d-2 |
| 4 | user-4 | 101a-4 | 101c-4 | 104a-2 | 104c-2 | 104e-2 | 111a"-2 | 111d-2 |
| 5 | user-5 | 101a-5 | 101c-5 | 104a-3 | 104c-3 | 104e-3 | 111a"-3 | 111d-3 |
| 5 | user-5 | 101a-5 | 101c-5' *101k* | | | | | |
| ... | | | | | | | | |

Network Database 103d

| Device ID / SUCI 101b | Device ID / SUPI 101a | Device Certificate 101c | Network Certificate 103c | Network Secret key 103f | TLS Server Ephemeral SK 103q | TLS Device Ephemeral PK 101n | Shared Secret 235a | Symmetric key 225b | EMSK 236b | Anchor Key 236a |
|---|---|---|---|---|---|---|---|---|---|---|
| 101b-1 | 101a-1 | 101c-1 | 103c-1 | 103f-1 | 103q-1 | 101n-1 | 225a-1 | 225b-1 | 206b-1 | 206a-1 |
| 101b-2 | 101a-2 | 101c-2 | 103c-1 | 103f-1 | 103q-2 | 101n-2 | 225a-2 | 225b-2 | 206b-2 | 206a-2 |
| 101b-3 | 101a-3 | 101c-3 | 103c-2 | 103f-2 | 103q-3 | 101n-3 | 225a-3 | 225b-3 | 206b-3 | 206a-3 |
| 101b-4 | 101a-4 | 101c-4 | 103c-2 | 103f-2 | 103q-4 | 101n-4 | 225a-4 | 225b-4 | 206b-4 | 206a-4 |
| 101b-5 | 101a-5 | 101c-5 | 103c-3 | 103f-3 | 103q-5 | 101n-5 | 225a-5 | 225b-5 | 206b-5 | 206a-5 |
| 101b-6 | 101a-6 | 101c-6 | 103c-3 | 103f-3 | 103q-6 | 101n-6 | 225a-6 | 225b-6 | 206b-6 | 206a-6 |
| ... | | | | | | | | | | |

EAP-TLS AUTHENTICATION WITH CONCEALED USER IDENTITIES AND WIRELESS NETWORKS

RELATED APPLICATIONS

The present application is a continuation application of U.S. Nonprovisional patent application Ser. No. 17/625,296, filed on Jan. 6, 2022, which is a National Stage Application of and claims the benefit of International Application No. PCT/US2020/041048, filed on Jul. 7, 2020, which claims the benefit of U.S. Provisional Patent Application No. 62/871,298, filed on Jul. 8, 2019, all of which are incorporated by reference herein in their entireties.

BACKGROUND

Technical Field

The present systems and methods relate to conducting an extensible authentication protocol—transport layer security (EAP-TLS) authentication with concealed subscriber identities for wireless networks, and more particularly to storing and using keys and certificates with a device, a network, and a device provider in order to improve efficiency, increase flexibility, and enhance security of the EAP-TLS authentication.

Description of Related Art

The use of EAP-TLS authentication has been widely adopted over the past decade within enterprise wireless networks using WiFi standards such as 802.11. Standards for EAP-TLS authentication include the Internet Engineering Task Force (IETF) Request for Comments (RFC) 5216 titled "The EAP-TLS Authentication Protocol", which is herein incorporated by reference in its entirety. Since approximately 2017, the European Technical Standards Institute (ETSI) has begun publishing standards for $5^{th}$ generation (5G) wireless wide-area networks (WAN), such as described in TS 133 501 V15.1.0 titled "5G; Security architecture and procedures for 5G System", which is herein incorporated by reference in its entirety. Unlike prior $4^{th}$ generation wireless WAN networks, 5G standard networks can include the support of authentication of devices using EAP-TLS, as described in Annex B of TS 133 501. EAP-TLS authentication enables the use of certificates for mutual authentication of a device and a wireless network. Previous wireless WAN standards for authentication such as with 4G LTE, 3G, etc. have depended on a pre-shared secret key recorded in a device and a secure server within the network. The significant changes with 5G networks removes some previous limitations, such as requiring the use of a pre-shared secret key, but also creates additional needs in the art in order to efficiently support EAP-TLS authentication for thousands or more different types of devices connecting with hundreds or more different wireless networks globally.

The inclusion of support for EAP-TLS in 5G networks can ease the support for wireless device authentication and secure connectivity for many applications, where a pre-shared secret key such as a key K within a subscriber identity module (SIM) or embedded SIM may no longer be required. Most commercial arrangements for device owners or device users bind the use of the pre-shared secret key K within a device to a particular home wireless network that also records and derives keys from the same pre-shared secret key. 5G networks also include the use of a subscription concealed identifier (SUCI) as a partially encrypted form of a subscription permanent identifier (SUPI). 5G networks as specified in TS 133 501 also include the use of a network access identifier (NAI) according to IETF RFC 7542 titled "The Network Access Identifier", which is herein incorporated by reference in its entirety.

In addition, in 2018 the IETF updated TLS version 1.2 to TLS version 1.3 in IETF RFC 8446 titled "The Transport Layer Security (TLS) Protocol Version 1.3", which is herein incorporated by reference in its entirety. ETSI published standards as of May 2019 such as TS 133 501 for 5G networks do not address the use of TLS version 1.3 with EAP-TLS authentication. A need exists in the art for devices, wireless networks, devices, and device providers to support an EAP-TLS authentication using TLS version 1.3 with the encrypted or partially encrypted subscription concealed identifiers as described in TS 133 501 Annex B, where the corresponding subscription permanent identifiers can use the NAI format.

Although the use of PKI certificates and corresponding private keys for EAP-TLS authentication can avoid the logistical and provisioning complexities of using a pre-shared secret key for authentication (such as with 4G and 5G AKA authentication), the use of EAP-TLS authentication can create a new series of problems or needs in the art for the many different devices and wireless networks which use EAP-TLS authentication. These problems may be avoided or more easily addressed with existing implementations of EAP-TLS authentication with corporate or enterprise WiFi networks, for example, because the enterprise can control both the device and the wireless network. The enterprise can ensure (i) a root certificate or certificate issuer certificate stored in the wireless network can be used to authenticate the device and (ii) and a root certificate or certificate issuer certificate stored in the device can be used to authenticate the wireless network, which is often required for mutual authentication using EAP-TLS standards. In addition, TLS authentication and PKI certificates and secret keys can support many different sets of cryptographic algorithms and cryptographic parameters, and an enterprise deploying EAP-TLS authentication currently can control the device certificates and the wireless network certificates to ensure the PKI certificates support compatible sets of cryptographic parameters and algorithms.

However, for widespread and even global deployments of 5G networks and devices, there can be hundreds or more different device manufacturers, device providers, and wireless networks, where each could use different combinations of preferred cryptographic algorithms, parameters, and/or certificate issuers. In addition, (A) the device manufacturers or device providers storing device default PKI certificates in devices with device default cryptographic algorithms and cryptographic parameters may not support (B) the network PKI certificates and network supported cryptographic algorithms and cryptographic parameters. For many applications, no pre-existing relationship may exist between a device manufacturer and a wireless network before device distribution to end users and the device's first connection to a 5G wireless network. In other words, the relatively closed environment of an enterprise configuring devices for connection to a Wi-Fi network with EAP-TLS authentication is much less complex since the enterprise controls the device and network before the devices connect to the enterprise Wi-Fi. For 5G networks, the wireless network operator will typically not control the device before devices connect to the 5G network.

As one example of complexity for EAP-TLS authentication for 5G networks, a device, using EAP-TLS authentication and a subscription concealed identifier, may not record a certificate chain or root certificate that can be used to authenticate a network certificate received from the network in a TLS handshake for EAP-TLS authentication. A need exists in the art for a wireless network to support EAP-TLS authentication for any one of hundreds or more of different devices types using concealed identities from hundreds or more different device providers. A need exists in the art, where the device uses a subscription concealed identifier, to support verification of a certificate received from any one of hundreds or more different wireless networks, where no pre-existing relationship may exist between the device owner and the wireless network.

For example with the hundreds or more different 5G wireless networks globally and with a manufactured or installed set of certificate issuer certificates or root certificates, a device could receive a server certificate from an authentication server function (AUSF) that does not chain or may not be able to be verified through a root certificate or certificate issuer certificate recorded by the device. In addition, the server certificate may use cryptographic algorithms and parameters that are different than those used by a certificate issuer certificate stored within the device. The device may not have access to an IP network without first authenticating with a wireless network. This potentially creates significant problems, where the device does not have access to the IP network to receive (i) a supporting certificate for verifying the server certificate from (ii) a server other than through the wireless network where a connection is attempted. In other words, the supporting certificate may be required in order to verify the server certificate received from the wireless network, but the device may not be able to receive the supporting certificate from an IP network without first successfully completing an EAP-TLS authentication.

Similarly, (i) the wireless network may control or establish a first certificate chain for a server certificate used by an authentication server function (AUSF), (ii) a device provider may control or establish a second certificate chain within a device before distribution to and end user for verifying the server certificate, and (iii) the server certificate from a wireless network may not be verifiable by the second certificate chain. The problem of (iii) is compounded by the thousands or more potential combinations of different certificate issuer certificates and supported cryptographic parameters for required certificates to successfully complete an EAP-TLS authentication. A need exists in the art for ensuring a device can authenticate a server certificate from a wireless network using both (i) a certificate issuer certificate recorded in the device before distribution, and (ii) cryptographic algorithms and parameters recorded in the device before distribution that would support verification of the server certificate.

A need exists in the art for a device to support EAP-TLS mutual authentication, without requiring a device user to load a server certificate or supporting certificate issuer certificate in order for the device to conduct mutual authentication with a wireless network. A need exists in the art for a device to record compatible cryptographic algorithms and cryptographic parameters for a server certificate without requiring a device user to load compatible cryptographic algorithms and cryptographic parameters that can be required in order for the device to use or verify the server certificate.

A need exists in the art for a device to operate with at least one certificate authority different than certificate authorities for authenticating web sites during web browsing or establishing TLS sessions with general servers. Some common root certificates or certificate issuer certificates may be essential for devices to properly work with millions of different servers, but the device may prefer to prevent those certificates from being used by the device to authenticate a 5G network server certificate. As one example, hackers could easily, successfully, and authoritatively obtain a valid certificate from "Let's Encrypt" for an example domain name of "5g-eap-hacker.com". If the device is based on Android from 2020, then the device would store a root certificate or intermediate certificate for "Let's Encrypt".

The hackers could (i) set up a rouge gnode b, and (ii) AUSF using the valid "Let's Encrypt" certificate for the example domain "5g-eap-hacker.com". The device could connect to the gnodeb, select use of EAP-TLS authentication, and receive the valid certificate and verify the certificate using the root certificate or intermediate certificate for "Let's Encrypt". The successful verification of the valid certificate for "5G-eap-hacker.com", and associated authentication steps for the device to authenticate the network, could result in the device believing the AUSF was authenticated, when in fact it was operated by potential hackers. A need exists in the art for a device provider to have control over the at least one certificate authority for authentication of an AUSF that is different than certificate authorities for authenticating web sites. A need exists in the art for a network to obtain, select, and use a certificate for the network that can be authenticated using the at least one certificate authority certificate stored in the device in order to for the device to authenticate the AUSF. Without access to an IP network (such as after successfully completing EAP-TLS authentication with the wireless network), the device may not be able to request a server certificate that can be verifiable through an installed certificate chain in a device, and consequently mutual authentication using methods such as EAP-TLS may fail or require manual intervention or unnecessary interaction with a device user in order for the EAP-TLS authentication to succeed. Again, the above problems related to server certificate verification by a device and the use of different cryptographic algorithms and parameters for different server certificates received by a device is compounded by the fact that there could globally be hundreds of mobile network operators and thousands or more device providers.

A device provider may not know which of the hundreds of different mobile networks a particular device may try to connect with until the device is turned on by a user or first attempts to connect with a mobile network in a particular geographical region. Even if a particular geographical region is known, such as the United States, before a device attempts to connect to one of a handful of wireless networks, the preferred wireless network may not be known to a device provider before a device attempts to connect. A need exists in the art for a device to receive a server certificate in a TLS handshake from a wireless network supporting EAP-TLS, where verification of the server certificate does not require intervention from an end user, in order to allow a device to mutually authenticate with EAP-TLS using a subscription concealed identifier with a plurality of different mobile network operators.

In addition, a device provider may control or establish a certificate chain for verifying a device certificate stored within a device, and (ii) an authentication server function may record a set of certificate issuer certificates and/or root certificates with cryptographic algorithms and cryptographic parameters that may not support the verification of the device certificate. Devices from hundreds or more different device providers can also use different certificate chains for the device certificates and also different sets of cryptographic algorithms and cryptographic parameters. Or, as explained 3 paragraphs above, a hacker with a device could easily obtain a valid certificate for use with a device from an important and valid certificate authority on the Internet, such as "Let's Encrypt". Thus, a device with a valid certificate (at least verifiable through a "Let's Encrypt" intermediate or root certificate) may attempt to connect with a wireless network. A need exists in the art for devices with some valid certificates to remain unauthenticated with a network and require different device certificates for authentication with the network.

The request by the authentication server function for supporting certificate issuer certificates and/or cryptographic algorithms and cryptographic parameters for a received device certificate may take additional time, complexity, and potential security issues for securely receiving a supporting certificate issuer certificate and/or cryptographic algorithms and cryptographic parameters in order to properly verify a received device certificate. A need exists in the art for ensuring an authentication server function can securely and efficiently authenticate a device certificate received through a wireless network, where the device can utilize a subscription concealed identifier.

Further, a need exists in the art for a network to verify that a device certificate has not been revoked when conducting an EAP-TLS authentication. Although TLS and EAP-TLS standards support the online certificate status protocol (OSCP) a device may not have Internet access until after the completion of an EAP-TLS authentication. Without Internet access, the device may not be able to generate OSCP stapling for the verification that the device certificate has not been revoked. Consequently, a need exists in the art for a network to verify that a received device certificate has not been revoked, where the device sending the device certificate may not have access general access to the Internet to communicate with other servers than a network or MNO until after the completion of an EAP-TLS handshake.

Many other examples exist as well for needs in the art for devices to securely and efficiently conduct EAP-TLS authentication with wireless networks, where the device uses a subscription concealed identifier, and the above are examples are just a few and intended to be illustrative instead of limiting.

SUMMARY

Methods and systems are provided for a device, a mobile network operator (MNO), a network, and a device provider to support EAP-TLS authentication, where the device can use a subscription concealed identifier. A system can include a plurality of devices, a mobile network operator, a network, and a device provider. The device can record a subscriber permanent identifier (SUPI), a device certificate, a device private key corresponding to the device public key in the device certificate, an elliptic curve integrated encryption scheme (ECIES) function, a static network public key for the ECIES function, MNO parameters, a device provider certificate with a device provider public key, and cryptographic algorithms and cryptographic parameters used with both the device provider certificate and the device certificate. The subscriber permanent identifier can comprise a network access identifier (NAI) supporting IETF RFC 7542, where the NAI can include a user name and a realm. The realm can comprise a first portion with a provider identity and a second portion with a network identity. For some embodiments, the user name can comprise an International Mobile Subscriber Identity (IMSI).

The device can be a computing device for connecting with wireless networks such as a 5G network and the device can include a radio. The device can include a processor, memory, a user interface, and a bus connecting the components within an enclosure. The device could comprise a radio module within a larger device, such as a radio module within an automobile, industrial equipment, a mobile handset such as a smart phone, and other possibilities exist as well for physical embodiments of the device. The device can conduct an EAP-TLS authentication through the MNO with the network.

The mobile network operator can comprise a wireless network with geographically distributed radios and antennas in order to wirelessly connect with the plurality of devices. The MNO can include a MNO identity in order to uniquely identify the MNO, such as including a mobile country code and a mobile network code. The MNO can receive messages from the device through a wireless network and forward the messages to the network. The MNO can receive messages from the network and forward the messages to the device through the wireless network. The MNO can establish a secure session through an IP network with the network.

The network can include a plurality of servers operating in a coordinate manner to support communications with a device. The network can include an authentication server function (AUSF) and a network database. The network can include an identity comprising the network identity in the second portion of a realm for the device subscriber permanent identifier. The network can conduct an EAP-TLS authentication with the device through the MNO supporting 5G standard such as TS 133 501 V15.1.0. The network can establish a secure session with a device provider. The network can operate a network database for storing data associated with each of the plurality of different devices connecting with the network through the MNO. The network can record or operate an elliptic curve integrated encryption scheme (ECIES) function for decryption of a subscription concealed identifier (SUCI) and a static network private key for the ECIES function.

The device provider can comprise a collection of servers for an entity that controls the device before the device connects with the MNO. The device provider can represent a device manufacturer, a device distributor, or a device owner for a plurality of different devices. The device provider can include an identity comprising the provider identity in the first portion of a realm for the device subscriber permanent identifier. The device provider can operate a device database storing data for the plurality of devices. The device provider can record the subscriber permanent identifier, a device certificate for the device, a device provider certificate, a device provider private key for the public key in the device provider certificate, and cryptographic algorithms and cryptographic parameters used with at least the device provider certificate.

The device can generate the subscription concealed identifier (SUCI) using at least the SUPI and the ECIES encryption function with the static network public key. The device can use the MNO parameters to establish a radio resource connection with the MNO. The device can send the SUCI to the MNO, and the MNO can use the plaintext second portion of the realm to select the network and send the SUCI to the network. For some embodiments, the device can send the MNO a realm portion of the SUPI without a user name portion, and the ECIES encryption function operating on the user name portion can be omitted.

The network can use the plaintext second portion of the realm to select the static provider private key for the ECIES function, where the static network private key corresponds to the static network public key for the ECIES function stored and used by the device to generate the SUCI. The network can use at least the ECIES function and the static network private key for the ECIES function to decrypt the SUCI and read the SUPI. The network can send the SUPI to the device provider. For some embodiments, the network can send a certificate signing request (CSR) for a network static public key either (i) along with the SUPI (if the network determines a valid network certificate is not current or present for a provider domain in a SUCI or SUPI), or (ii) after the network and device provider establish a secure session.

The device provider can receive the SUPI from the network and use the SUPI to select a device provider certificate and a device certificate for the device from the device database. The device provider can send at least the device provider certificate and the device certificate to the network. The network can store the received device provider certificate and the device certificate along with the SUPI and the SUCI in the network database. For embodiments where the user portion is omitted from the SUCI as sent by the device, then the device provider can send the network the device provider certificate and omit the device certificate. Or, the device provider could send a bulk set of device certificates to the network, without association to a specific SUCI as received by the network. For embodiments where network sends a CSR to device provider before network receives a TLS "client hello" message from the device, then device provider would send network the network certificate signed by the device provider before the network sends a command to the device to start an EAP-TLS session.

The network can send an EAP-TLS start command to the device through the MNO. The network can receive a "client hello" and the SUCI from the MNO, where the "client hello" can support TLS version 1.3 as specified in RFC 8446. The "client hello" can include an ephemeral elliptic curve cryptography (ECC) public key for the device, where the device stores the corresponding device ephemeral private key. The AUSF can generate a server ephemeral PKI key pair compatible with the received ECC public key from the device, including a server ephemeral public key. The network can store the PKI keys in the network database. The network can use the SUCI received with the "client hello" to select the device provider certificate for the device from the network database. The "client hello" can include a list of supported cryptographic parameters for the device.

The network can record a set of cryptographic parameters and a set of network public keys and network private keys for each member of the set of cryptographic parameters. The network can select a network public key and a network private key for a set of cryptographic parameters, where the set of cryptographic parameters was included in the "client hello" message received from the device. The network can send a Certificate Signing Request (CSR) to the device provider with the selected network public key, along with the set of cryptographic parameters for the network public key. The message with the CSR can also include the SUPI for the device.

The device provider can receive the CSR and verify the CSR. The device provider can select the device provider private key to use for generating a network certificate based on the SUPI, where the device provider can determine the corresponding device provider public key stored by a device using the SUPI and a query from a device provider database. In this manner, a device provider can ensure that a network certificate generated by the device provider for the network can be verified by the device using the device provider public key stored by the device. The device provider can generate a network certificate for the network public key using the device provider private key (possibly selected using the SUPI) and a signature algorithm and parameters specified in the device provider certificate. The network certificate can include a digital signature of the network public key using the device provider private key. The device provider can send the network certificate to the network.

The network can receive the network certificate and process a "server hello" using at least the received network certificate and the corresponding selected network private key. Data processed by the AUSF for a "server hello" can include standard fields such as the server ephemeral public key, selected extensions, a certificate request, and the received network certificate. The data processed in the previous sentence can be included in a "Certificate Verify" step. The AUSF can use the network private key (which can correspond to the network public key in the network certificate) to create a digital signature for a "Certificate Verify" portion of a "server hello" message. A device provider identity in the device provider certificate can comprise a named certificate authority in the extensions.

The network can generate a shared secret and a symmetric ciphering key using the device ephemeral public key received in the "client hello" and the derived server ephemeral private key with an elliptic curve Diffie-Hellman (ECDH) key exchange. The network can store the derived shared secret and the symmetric ciphering key with the SUCI for the device in the network database. The server can encrypt at least the selected extensions, a certificate request, and the network certificate and the "CertificateVerify" into a ciphertext using the derived symmetric ciphering key. The network can send the device a "server hello" message with the server ephemeral public key and the ciphertext through the MNO, where the message to the MNO can include the SUCI so that the MNO can route the message to the device.

The device can receive the "server hello" message and take steps to process the message. The device can generate the shared secret and the symmetric ciphering key using the server ephemeral public key received in the "server hello" and the derived device ephemeral private key using the ECDH key exchange. The device can decrypt the ciphertext using the symmetric ciphering key. The device can read the plaintext value for the network certificate. The device can confirm that the device provider public key stored by the device is used for verification of the network certificate. The device can verify the digital signature of the network public key using the device provider public key recorded by the device. In this manner, the network certificate as used by the AUSF and MNO can be trusted by the device without requiring the device to verify a parent certificate chain for the network certificate, since the device previously securely records the device provider public key required to verify the network certificate. If the received network certificate does not contain a digital signature verified through the device provider public key previously securely stored by the device, then the device could verify the received network certificate through a certificate issuer chain stored within the device.

In other words, the device does not need Internet connectivity in order to verify the received network certificate as a server certificate in the "server hello" message because the network certificate can be verified with data previously stored inside the device before connecting with the MNO. The selection by the device provider of the device provider private key used for the digital signature in the network certificate (by generating the network certificate from the CSR) can ensure the network certificate can be verified by the device without the device needing connectivity to an IP network (in order to query for other intermediate verifying certificates), thereby solving some needs in the art identified above.

The device can also verify the "CertificateVerify" digital signature portion of the decrypted "server hello" ciphertext using the public key with the received network certificate. In this manner, the device can trust that the AUSF has access to the network private key corresponding to the network public key in the network certificate. Verification of the "CertificateVerify" digital signature can comprise an authentication of the network and/or MNO with the device.

The device can use the network certificate and the user portion of the SUPI to select a device certificate stored in the device. For example, the device could record multiple device certificates and select a device certificate compatible with the cryptographic parameters and algorithms within the network certificate. Or the device could select the device certificate based on the extensions within the decrypted ciphertext within the "server hello" message. In some embodiments, the device can select a device certificate using the device provider identity as a named certificate authority within the extensions, and the selected device certificate can be verified with the device provider certificate (where the device provider certificate includes the device provider identity). The device can generate a response to the "server hello", where the response includes the selected device certificate and a digital signature or "Certificate Verify" from the device. The device could generate the "CertificateVerify" using the device private key corresponding the device public key in the device certificate. The device can encrypt the response with the derived symmetric ciphering key and send the response to the MNO. The MNO can forward the response with the SUCI to the network.

The network/AUSF can use the SUCI received with the encrypted response to select the symmetric ciphering key from the network database. The network/AUSF can decrypt the encrypted response from the device to read the plaintext values of the device certificate and the digital signature for the device "CertificateVerify". The AUSF can compare (i) the received device certificate from the device with (ii) the device certificate stored in the network database, where the stored device certificate in the network database could be received previously as described above from the device provider. If (i) the received device certificate from the device and (ii) the received device certificate from the device provider are the same, then the device certificate can be trusted or considered verified. Or, if the device certificate received from the device is not the same as the device certificate received from the device provider, then the AUSF can conduct a certificate verification for the device certificate received from the device through a chain of certificate issuer certificates. The AUSF can verify the device "CertificateVerify" in the response by generating a digital signature using the device public key from the device certificate, and if the received digital signature is equal to or the same as the generated digital signature, then the device can be considered authenticated with the network.

The AUSF can use (i) the shared secret key from the TLS ECDH key exchange stored in the network database for the device and (ii) the plaintext data from the "client hello" and the "server hello" in order to generate a TLS master secret according to the steps in IETF RFC 8446. In exemplary embodiments, the TLS master secret can be derived using a hash-based key derivation function with input of at least the ephemeral public key from the device in the "client hello" message, the server ephemeral public key from the "server hello" message, the shared secret, and the network certificate. Additional mutually shared data between the device and the network can be used to derive a TLS master secret.

The AUSF can use the generated or derived TLS master secret to generate at least a value for an extended master secret key (EMSK) as specified in EAP-TLS standards, such as inputting the TLS master secret into a key derivation function that could include a secure hash algorithm. The AUSF can use a portion of the EMSK, such as the leading 256 bits from an EMSK as an anchor key or Kausf. The AUSF can send the anchor key along with the SUPI for the device to the MNO. The MNO can use the anchor key to derive subsequent keys required for secure wireless communications with the device.

The device can conduct the equivalent steps of using the shared secret key and the plaintext data from the "client hello" and the "server hello" in order to generate the TLS master secret according to the steps in IETF RFC 8446. The device can use the generated or derived TLS master secret to generate at least a value for EMSK as specified in EAP-TLS standards, such as inputting the TLS master secret into a key derivation function that could include a secure hash algorithm. The device can use a portion of the EMSK, such as the leading 256 bits from an EMSK as an anchor key or Kausf. The device can use the anchor key to derive subsequent keys required for secure wireless communications with the mobile network operator.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 3 is an illustration of a device database and a network database with exemplary data stored, in accordance with exemplary embodiments;

DETAILED DESCRIPTION OF EXEMPLARY EMBODIMENTS OF THE INVENTION

FIG. 1

Figure 1:
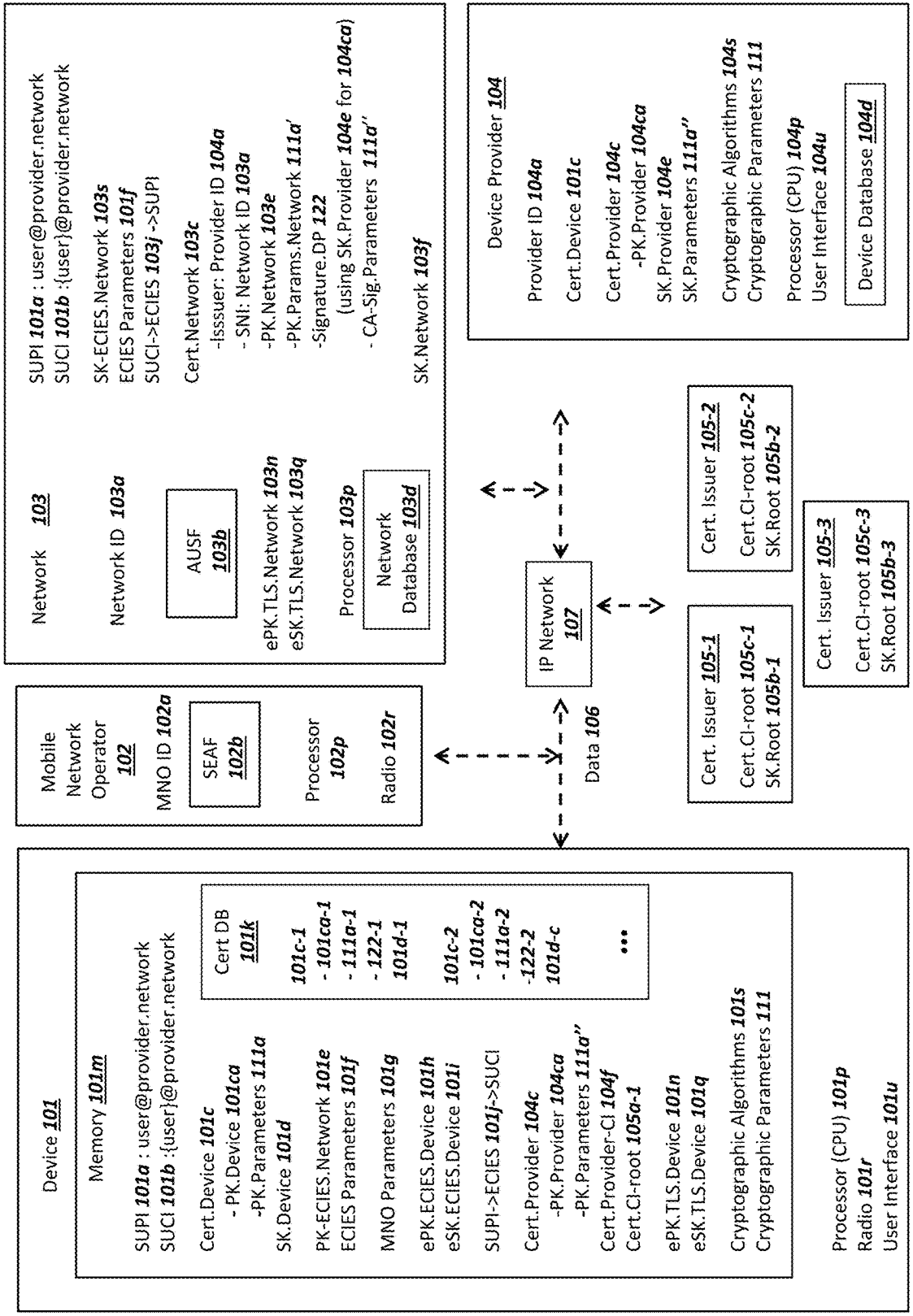
FIG. 1 is a graphical illustration of an exemplary system, where a device communicates data with a mobile network operator and a network in order to mutually authenticate with the network, in accordance with exemplary embodiments.

FIG. 1 is a graphical illustration of an exemplary system, where a device communicates data with a mobile network operator and a network in order to mutually authenticate with the network, in accordance with exemplary embodiments. The system 100 can include a device 101, a mobile network operator 102, a network 103, a device provider 104, and certificate issuers 105. A system 100 can use multiple different external certificate issuers over time, depicted as 105-1 through 105-3. The depicted nodes or entities can communicate data 106 over an Internet Protocol (IP) network 107. Although a single device 101, a single mobile network operator 102, a single network 103, and a single device provider 104 are depicted in FIG. 1, a system 100 can comprise a plurality of each of the depicted nodes or entities. A system 100 as depicted in FIG. 1 can support EAP-TLS authentication for 5G wireless WAN networks, such as supporting EAP-TLS authentication as described in Annex B of TS 133 501 V15.1.0. Other wireless networking technology for device 101 and MNO 102 could be supported as well, such as WiFi.

Device 101 and mobile network operator 102 can utilize a variety of wireless wide area network (WAN) and wireless local area network (LAN) wireless and technologies to communicate data 106 between the nodes, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, and 5G or subsequent wireless technologies. In addition, the wireless technology used by device 101 and mobile network operator 102 could support or implement wireless LAN technologies such as WiFi and the related series of standards from IEEE 802.11 standards, such as 802.11ac, 802.11 ax, etc. Other examples exist as well for wireless WAN technology and/or wireless LAN technology used by device 101 and mobile network operator 102 without departing from the scope of the present disclosure.

Mobile network operator 102, network 103, and device provider 104 can connect to the IP network 107 and communicate with each other via a wired connection such as, but not limited to, an Ethernet connection, or a fiber optic connection. In other words, mobile network operator 102 can connect to (i) device 101 through wireless technology and (ii) a network 103, a device provider 104, and a certificate issuer 105 using wired technology. IP network 107 could also be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 107 could utilize globally routable IP addresses. A private IP network overlayed on IP network 107 could utilize private IP addresses which could also be referred to as an Intranet. Other possibilities for IP Network 107 and a private network between mobile network operator 102, network 103, and device provider 104 exist as well without departing from the scope of the disclosure.

Mobile network operator (MNO) 102 can include a plurality of radio-frequency (RF) access technologies (RAT) systems for supporting wireless communications with a plurality of devices 101 in a networked manner, including through the use of geographically dispersed antennas, radio nodes, or towers. The RAT systems for MNO 102 can include a radio 102r for communicating with device 101, where radio 102r includes an antenna system and can operate through licensed radio spectrum. In exemplary embodiments, MNO 102 can operate a plurality of radios 102r which are connected to an IP network 107 in a secure manner, including connecting via a private IP network.

In exemplary embodiments, mobile network operator 102 can comprise traditional public land mobile networks providing data and voice services such as AT&T, Verizon, T-Mobile, Sprint, etc, and provide data communications services through a variety of radio access technologies. Further, although FIG. 1 depicts an MNO 102 as communicating with device 101 with a radio 102r, another entity besides a mobile network operator could perform the function of MNO 102. For embodiments where radio 101r for device 101 uses WiFi technology, then MNO 102 could comprise an entity other than a PLMN, such as a service or network that operates a plurality of WiFi access points. The function of MNO 102 could also be conducted by a large enterprise with a collection of geographically distributed WiFi access points.

Each of mobile network operator (MNO) 102, network 103, and device provider 104 could operate a plurality of servers in order to support the communications and connectivity depicted in FIG. 1 and additional Figures below. The exemplary data structures, values or numbers, and steps for a MNO 102, network 103, and device provider 104 depicted in FIG. 1 and Figures below could be recorded and/or conducted by a collection of servers for each entity. Exemplary servers for a mobile network operator 102, network 103, or device provider 104 in system 100 can be either different physical computers such as rack-mounted servers, or different logical or virtual servers or instances operating in a "cloud" configuration.

An exemplary server or collection of servers for MNO 102 can comprise a Security Anchor Function (SEAF) 102b, where a MNO 102 can include at least one SEAF 102b for establishing secure and authenticated communications with device 101 through at least one radio 102r. The SEAF 102b could comprise and operate according to the European Technical Standards Institute (ETSI) standard TS 133 501 V15.1.0 from August of 2018 and titled "5G; Security architecture and procedures for 5G System", which is hereby incorporated by reference in its entirety. In exemplary embodiments, the SEAF 102b for MNO 102 can receive an anchor key from network 103 in order to establish secure and authenticated communication with device 101, such as depicted and described for a message 237 below in FIG. 2. In exemplary embodiments where Extensible Authentication Protocol-Transport Layer Security (EAP-TLS) in a system 100, then SEAF 102b could operate as specified in section 6.1.1.2 of TS 133 501 V15.1.0, where "the SEAF takes the role of pass-through authenticator."

Note that MNO 102 could use other wireless networking technologies besides 5G. Thus, although an SEAF 102b is depicted in FIG. 1, a different collection of servers or an entity besides a SEAF 102b could perform the steps for a MNO 102 depicted in FIG. 2 below, without departing from the scope of the present invention. In general, the function of an SEAF 102b as depicted and described in connection with FIG. 2 below could be conducted by at least one server or process operating within a cloud computing environment, where the server or process may not be an SEAF 102b. For example, the server or process operating with equivalent functionality as an SEAF 102b in FIG. 2 below could (i) receive a partially encrypted Network Access Identifier (NAI) such as a SUCI 101b from device 101 with an encrypted user name and a plaintext realm for the NAI, and (ii) use the plaintext realm to forward the SUCI 101b to network 103, where network 103 uses or is associated with at least a portion of the plaintext realm.

MNO 102 can include a MNO identity 102a, where MNO identity 102a can comprise the combination of a mobile country code and a mobile network code, according to 3GPP standards for 4G networks, 5G networks, etc. As one example, MNO identity 102a for an example network of AT&T could comprise an MCC number of 310 and a MNC number of 410, such that the MNO identity 102a can be 310410. Note that a MNO 102 can operate with multiple MNO identities 102a, and a MNO identity 102a could also comprise a Domain Name Service (DNS) name such as an exemplary value of "att.net", and other possibilities exist for a MNO identity 102a without departing from the scope of the present invention. In addition, a MNO 102 could operate with a plurality of MNO identities 102a.

MNO 102 can include a plurality of processors 102p in order to store and record data as well as communicate within a system 100 over an IP network 107 and a radio 102r. Processor 102p can comprise a general purpose processor appropriate for the computational requirements for a MNO 102, and may operate with multiple different processor cores, including field programmable gate arrays (FPGA). A processor 102p can comprise exemplary ARM® based processors or an Intel® based processor such as belonging to the XEON® family of processors, and other possibilities exist as well. Processor 102p can utilize a data bus to fetch instructions from memory or storage within a server and operate on the instruction. A processor 102p can include components such as registers, accumulators, and logic elements to add, subtract, multiply, and divide numerical values and record the results in memory. In exemplary embodiments, at least one processor 102p within MNO 102 can be used with an SEAF 102b to conduct the steps for MNO 102 and send/receive messages for MNO 102 as depicted and described in connection with FIG. 2 below. Although not depicted in FIG. 1, MNO 102 can include memory and at least one database in order to establish communications with a plurality of devices 101 through a plurality of radios 102r.

Device 101 can be a computing device for sending and receiving data using a radio 101r. Device 101 can take several different embodiments, such as a general purpose personal computer, a mobile phone or mobile handset based on the Android® or Fuchsia from Google® or the IOS operating system from Apple®, a tablet, a device with a sensor or actuator for the "Internet of Things", a module for "machine to machine" communications, a device that connects to a wireless Wide Area Network (WAN) operated by MNO 102, a router, and/or a server, and other possibilities exist as well for the embodiments of a device 101 without departing from the scope of the present invention.

The electrical components within device 101 can include a memory 101m, a processor 101p, a radio 101r, and a user interface 101u. Although not depicted in FIG. 1, a data bus or a system bus could internally electrically connect the depicted components within a device 101. Additional components to support the operation of device 101 can include a battery to store electrical power, an antenna to transmit and receive RF signals, a sensor to collect data external or internal to the device 101, such as temperature, motion, position, pressure, etc. A device 101 could also include an actuator to convert electrical signals into physical actions, such as a motor for moving components, a relay for opening or closing a circuit, etc.

Memory 101m can comprise combinations of (i) volatile random access memory and nonvolatile memory. The volatile memory can include random access memory (RAM) for relatively fast read and write operations compared to nonvolatile memory, such as SRAM or DRAM. RAM for memory 101m could also include persistent RAM or nonvolatile RAM (NVRAM), such that data in a persistent RAM memory or nonvolatile RAM is stored when power is removed. Nonvolatile memory can include storage memory such as a flash memory and record or store data when power is removed from device 101. In general, different forms and electrical components for memory 101m can be used without departing from the scope of the present disclosure. Processor 101p can comprise a central processing unit (CPU) or a "system on a chip" and be similar to a processor 102p for a MNO 102 described above, but with reduced capabilities for a device 101 compared to a processor 102p for MNO.

Device 101 may include radio 101r support radio-frequency (RF) communications with networks including a MNO 102 via standards such as GSM, UMTS, mobile WiMax, CDMA, LTE, LTE Advanced, 5G, and/or other mobile-network technologies. In a wireless configuration, the radio 101r may also provide connectivity to local networks such as 802.11 WLAN, Bluetooth, Zigbee, or an IEEE 802.15.4 network, among other possibilities. In exemplary embodiments, a radio 101r is connected to an antenna, which could be either internal to device 101 or external to device 101.

Note that device 101 may also optionally include user interface 101u which may include one or more devices for receiving inputs and/or one or more devices for conveying outputs. User interfaces are known in the art and thus user interfaces are not described in detail here. User interface 101u could comprise a touch screen if device 101 operates as a smartphone or mobile phone. Device 101 can optionally omit a user interface 101u, since no user input may be required for many M2M applications such as networked sensors, although a user interface 101u could be included with device 101. LED lights or a display of LEDs could also comprise a user interface 101u.

Device 101 can include a device identity comprising a subscription permanent identifier (SUPI) 101a. The device identity can comprise a string or number to uniquely identify device 101 with MNO 102, network 103, and device provider 104, and other nodes connected to the IP network 107. A device identity of a SUPI 101a can include a network access identifier (NAI) according to IETF RFC 7542, titled "The Network Access Identifier", which is herein incorporated by reference in its entirety. A NAI can consist of different portions, such as a user identity, and a realm. The user identity can comprise a number or a string to uniquely identify device 101 within a realm. A NAI for a SUPI 101a can have many forms, and with several examples for a NAI are included in RFC 7542. Other possibilities exist as well for a NAI as a SUPI 101a for an identity of device 101 without departing from the scope of the present invention. The use of a SUPI 101a in an NAI format as a device identity for device 101 is not required for some exemplary embodiments, and for some embodiments the SUPI 101a could be a single string with an embedded user identity and realm but without the "@" character standard for a NAI.

As depicted in FIG. 1, in exemplary embodiments, a SUPI 101a can have a user identity and a realm, where the realm can have a prefix and a suffix. The prefix and the suffix can have multiple portions or more than one portion. In general, (i) a realm suffix can include a base string of a domain name associated with a network 103 (depicted as "network" for SUPI 101a in FIG. 1), and (ii) a realm prefix can include a second string associated with a device provider 104 (depicted as "provider" for SUPI 101a). In exemplary embodiments, the realm prefix can include at least a portion of a provider identity 104a and the realm suffix can include at least a portion of a network identity 103a. Note that a realm suffix could also include data or a name for MNO 102, which could include a MNO ID 102a. Other embodiments of a SUPI 101a for a device 101 than that depicted in FIG. 1 could include exemplary values of "user@network.provider" (e.g. a prefix first portion of the realm includes a name for the network 103 and a suffix second portion of the realm includes a name for the device provider 104). In other exemplary embodiments, the realm of a SUPI 101a can comprise solely a name or identity for device provider ID 104a, and for these embodiments, MNO 102 and network 103 could have agreements and technical arrangements to route data 106 with the realm of a provider ID 104a to device provider 104.

In preferred embodiments, a device 101 with a user identity of "XXXXX" could have be associated with a device provider with the name "Company", where the company has a commercial agreement and technical agreement with a cloud service such as Amazon Web Services to operate the authentication server function (AUSF) 103b, such that devices 101 for the company (e.g. a device provider) could roam and/or be authenticated with a plurality of mobile network operators. The cloud service could have commercial and technical agreements with a plurality of mobile network operators, including MNO 102 depicted in FIG. 1. The cloud service could have an exemplary network ID 103a of aws.com. For this exemplary embodiment described in this paragraph, the SUPI 101a for device 101 could comprise an example string of "XXXXX@company.aws.com". Note that an identity of MNO 102 such as MNO ID 102a may not need to be included in SUPI 101a, and MNO 102 can select network 103 based on the suffix of the realm (e.g. aws.com). In another embodiment, the MNO 102 identity could be included in the realm, where the MNO ID 102a could be "att.com", and the SUPI 101b for device 101 could be "XXXXX@company.aws.att.com". Other possibilities exist as well without departing from the scope of the present invention.

Although not depicted in FIG. 1, a NAI as a SUPI 101a could comprise a string where realm has an identity of the network 102a in the prefix and an identity of the device provider 103a in the suffix. Or, the realm could comprise a single base string that is unique for a combination of an identity of device provider 104a and network 102a (such as a realm of "company-aws.com"). Further, in some exemplary embodiments, the realm of a NAI for SUPI 101a could omit an identity device provider 104a and consist only of an identity for network 103 of network ID 103a (where the realm could be uniquely associated with a device provider 104). Or, the realm of a NAI for SUPI 101a could omit an MNO identity 102a and consist only of an identity for network 103 of network ID 104a. In general, the realm of a SUPI 101a can include sufficient identifying information (such as at least a portion of network ID 103a and/or provider ID 104a) in order for data within a message 205 (below in FIG. 2) from device 101 to be (i) received by MNO 102 and forwarded to network 103, and (ii) received by network 103 and forwarded to device provider 104.

A device 101 can also include a subscription concealed identifier (SUCI) 101b. SUCI 101b can include an encrypted identity of a user name or user identity, depicted as "{user}" in FIG. 1 and the plaintext realm, where exemplary formats or contents of a realm were depicted and described in the two paragraphs above. A SUCI 101b can be derived from a SUPI 101a using an elliptic curve integrated encryption scheme (ECIES) 101j, which is described in addition detail below. In exemplary embodiments, device 101 communicates with a MNO 102 using a SUCI 101b as the identity for device 101 instead of the SUPI 101a, in order for the user identity of device 101 to be encrypted.

Although "user" is the term depicted in FIG. 1 and also for a NAI in RFC 7542 and related 3GPP specifications, the "user" portion of a NAI can comprise a string of digits or numbers or characters to uniquely identify device 101 for a device provider 104 and the "user" portion of a NAI within a SUPI 101a or SUCI 101b does not need to be associated with a user such as a person. In other words, a "user" within an identifier such as a NAI or a SUPI 101a can be an identity for a device. The plaintext for the realm in a SUCI 101b can be required in order for MNO 102 and/or network 103 to route data for a SUCI 101b forward (e.g. MNO 102→network 103 and network 103→device provider 104). MNO 102 could use at least a first plaintext prefix with network ID 103a in the realm to select a network 102. In other words, in exemplary embodiments, the realm portion of a NAI for a SUCI 101b can remain plaintext, although the "user" portion of a NAI for a SUCI 101b can be encrypted.

The "user" portion of a NAI for a SUPI 101a could comprise a medium access control (MAC) address for a physical interface such as Ethernet or WiFi, an international mobile subscriber identity (IMSI) or international mobile equipment identity (IMEI) with 2G/3G/4G networks, and other possibilities exist as well for the user portion of a NAI as a SUPI 101a without departing from the scope of the present invention. In exemplary embodiments, SUPI 101a can be written to hardware in device 101 and operate as a globally unique, long-term identity for device 101. Note that a device 101 could use several different SUPI 101a, such as a first SUPI 101a with a first network 103 and a second SUPI 101a with a second network 103, where the realm portion can be different for the first and second SUPI 101a and the different realm portions can include different network IDs 103a for the first and second network 103.

A certificate for device 101 can comprise cert.device 101c and can include the device identity comprising the SUPI 101a. For some embodiments, the device identity within a device certificate cert.device 101c can be a number, string, or value that is different than the SUPI 101a. As one example, a SUPI 101a could be for connecting with a wireless network 102, while a device identity in a cert.device 101c can be for communicating with a device provider 104. A certificate 101c for device 101 can include a device public key corresponding to the device private key SK.Device 101d, a set of cryptographic parameters for the device public key, the identity of a certificate authority, and a digital signature for the certificate authority. A certificate 101c for device 101 and other nodes in a system 100 can comprise a certificate supporting X.509 v3 formats. The cryptographic parameters can specify parameters for both the device public key and also the digital signature from a certificate authority, and two different sets of cryptographic parameters could be used for each of the device public key and the digital signature. Cryptographic parameters in a certificate can specify algorithms such as RSA or elliptic curve cryptography (ECC) values, ECC curve names, key lengths in bits, signature algorithms, validity dates, encoding rules, etc. The signature of the certificate authority for cert.device 101c could be included in device certificate 101c.

A node of system 100 in FIG. 1, such as the authentication server function (AUSF) 103b can use the device certificate cert.device 101c in order to authenticate device 101 with MNO 102 and network 103. Additional details regarding the use a certificate for device 101 of cert.device 101c will be described below in FIG. 2. Note that other nodes in a system 100 can record and operate with a certificate similar to cert.device 101c, except with identities for the nodes, the public keys for the nodes, and certificate authority digital signatures for the public keys. A device 101 could record an use multiple different device certificates 101c (possibly with different device public keys corresponding to different device private keys and/or cryptographic parameters) in a database 101k, where the device 101 selects the different device certificates 101c based on the MNO 102 and/or the network 102 the device 101 communicates with.

A device 101 can record and use a device private key SK.device 101d (e.g. "secret key"). The private key can correspond to the public key in the device certificate cert-.device 101c. In exemplary embodiments, device 101 internally generates a random number for the device private key SK.device 101d and using cryptographic algorithms 101s and a set of cryptographic parameters 111a and generates the device public key in a certificate 101c. The private key SK.device 101d and the corresponding public key can be for the set of cryptographic parameters within the certificate 101c, such as the values for an elliptic curve named curve or cryptographic algorithm type 111c in FIG. 4b below. The generation of the public key for device certificate cert.device 101c could be (i) during device 101 manufacturing or distribution and (ii) before device 101 sends a SUCI 101b to a MNO 102.

In some exemplary embodiments before device 101 establishes a radio connection with MNO 102 (such as during a device configuration step), device provider 104 receives the public key for SK.device 101d and signs the public key with a device provider secret key such as SK.Provider 104e in order to generate the device certificate cert.device 101c. Or, a device certificate cert.device 101c could be signed by a different certificate issuer than a certificate issuer operated by device provider 104. Note that cryptographic algorithms 101s and PKI keys for device 101 can support post-quantum cryptography (PQC) and support code-based, lattice-based, and related cryptographic algorithms. Example possible algorithms for parameters in device certificate cert.device 101c include those described in "Post-Quantum Cryptography Standardization" from Wikipedia dated Mar. 12, 2019, which is herein incorporated by reference.

Device 101 can store or record a public key for the device provider 104 of PK-ECIES. Network 101e in order to conduct ECIES 101j encryption of the user name for a SUCI 101b. The public key can be associated with a set of cryptographic parameters ECIES Parameters 101f for using the public key (such as an ECC curve name), and the cryptographic parameters could be used with ECIES 101j function. In other words, ECIES Parameters 101f can specify a named curve associated with PK-ECIES.Network 101e. The network 103 and/or AUSF 103b can record a private key corresponding to PK-ECIES.Network 101e, where the private key can comprise SK-ECIES.Network 103s as depicted in FIG. 1.

The value of PK-ECIES.Network 101e could be written to memory 101m during manufacturing or distribution or configuration of device 101, or securely before the time device 101 sends a SUCI 101b to a wireless network 102. Note that PK-ECIES.Network 101e can comprise multiple different points on different ECC curves, such that different values of PK-ECIES.Network 101e can be selected depending on the parameters ECIES Parameters 101f used by ECIES 101j. In other words, PK-ECIES.Network 101e can include a first public key for name curve P-256, a second public key for named curve 25519, where the selection of the first public key or second public key could be based on ECIES Parameters 101f.

MNO parameters 101g can include a list of numbers or strings for values such as (i) allowed frequencies or frequency bands to scan, (ii) preferred access lists for roaming onto other wireless networks, (iii) criteria for a device 101 to select MNO 102, including in idle mode, (iv) support for emergency services, (v) supported languages or character encoding, (vi) codes to search for in beacons broadcast by a wireless network 102, (vii) parameters for a radio 101r to use when connecting to a wireless network 102, (viii) names or addresses for a server associated with a MNO 102 in order for a device 101 to conduct radio resource connect procedures, etc. A device 101 can record multiple sets of MNO parameters 101g for a plurality of different MNO 102, and a device 101 could select a MNO 102 from a plurality of available MNO 102 for radio 101r based on data within MNO parameters 101g.

Device 101 can derive an ephemeral public key ePK.E-CIES.Device 101h and an associated secret key or private key eSK.ECIES.Device101i, using a random number, a key pair generation function, and the set of ECIES Parameters 101f. Device 101 can utilize a random number generator similar such as hardware random number generator in order to derive the private key eSK.ECIES.Device 101i and input the random number into the key pair generation function. A key pair generation function could be included in application software running on device 101, and exemplary software for key pair generation algorithm can comprise OpenSSL, crypto++, or Mozilla libraries. The resulting ephemeral public key ePK.ECIES.Device 101h can be sent to MNO 102 in a message 205 below in FIG. 2. The resulting secret key or private key eSK.ECIES.Device101i can be input into the encryption function ECIES 101j in order to convert a SUPI 101a into a SUCI 101b, where the user portion of an NAI for a SUPI 101a can be encrypted in a SUCI 101b. In some embodiments, the realm portion of the NAI in a SUCI 101b can remain plaintext, such that wireless network 102 can read the plaintext realm for the SUCI 101b in order to select and forward the SUCI 101b to a network 103 and/or device provider 104.

Device 101 can include an encryption function ECIES 101j in order to convert a SUPI 101a into a SUCI 101b. The encryption function ECIES 101j can comprise the identity encryption scheme as described in Annex C: "Protection schemes for concealing the subscription permanent identifier" in ETSI standard TS 133.501 version 15.1.0. In summary, device 101 can conduct an elliptic curve Diffie-Hellman key exchange using private key eSK.ECIES.Device101i and public key PK-ECIES.Network 101e and parameters ECIES Parameters 101f in order to generate an encryption key and a message authentication code (MAC) key. The user portion of SUPI 101a, or the user name, can be input into the encryption function ECIES 101*j* along with the derived encryption key and MAC key in order to generate SUCI 101*b* which contains the user name as a ciphertext (depicted as "{user}" in FIG. 1 and FIG. 2 below). A MAC code generated by ECIES 101*j* using the MAC key can be used to verify message integrity for the SUCI 101*b* by device provider 104. The realm portion of SUPI 101*a* can remain as plaintext for SUCI 101*b* after encryption function ECIES 101*j*.

Device 101 can record or store a certificate for device provider 104 comprising Cert. Provider 104*c*, where the certificate for device provider 104 can be similar to the certificate for device 101 described above. Device 101 could also record a plurality of different device provider certificates Cert.provider 104*c*, where the different certificates 104*c* could use different provider IDs 104*a* and/or different sets of cryptographic parameters 111*a"* from parameters 111. The different provider IDs 104*a* and/or cryptographic parameters 111*a"* could be used to verify a digital signature 122 within a device provider certificate 104*c*. An identity for device provider 104 recorded with Cert. Provider 104*c* can comprise provider ID 104*a*. Cert. Provider 104*c* can also record a public key for device provider 104 comprising PK.Provider 104*ca*.

Cryptographic parameters can be included in the certificate for device provider 104, such as an ECC named curve for PK.Provider 104*ca*, a time for validity of the certificate, and other information normally recorded in an X.509 v3 certificate. Note that in exemplary embodiments, the certificate Cert. Provider 104*c* can be associated with and generated by device provider 104 and not MNO 102 and network 103. As depicted and described below in connection with FIG. 2, exemplary embodiments contemplate that (i) device 101 can authenticate with network 103 and (ii) MNO 102 can obtain an anchor key for device 101 without device 101 receiving or storing a certificate for MNO 102 and network 103 different than the stored or recorded device provider certificate Cert. Provider 104*c*.

In this manner, the use of a device 101 in a system 100 can be significantly more flexible than conventional technology, since (i) a device provider 104 can control the device 101 before connecting to MNO 102 or selecting MNO 102 and (ii) device 101 does not need to receive a separate server certificate that chains to (or can be verified through) a previously recorded root certificate Cert.CI-root 105*c*. In other words, without the technology described herein, an MNO 102 and network 103 operating an AUSF 103*b* may not readily guarantee (or without user interaction for device 101) that device 101 can verify a server certificate received from AUSF 103*b* that can be verified with a recorded root certificate Cert.CI-root 105*c*.

The certificate Cert. Provider 104*c* can be signed by a certificate authority such as with a device provider certificate issuer certificate 104*f*, and device 101 can record a chain of certificate authority certificates up to a root certificate Cert.CI-root 105*c* for a certificate issuer 105. For example, as depicted in FIG. 1, device 101 Cert.Provider 104*c* could be signed by a certificate issuer for device provide 104 with a certificate comprising Cert. Provider-CI 104*f*. The public key for the device provider certificate issuer in Cert. Provider-CI 104*f* could be signed by the certificate issuer 105-1. The certificates for device provider 104 including Cert. Provider 104*c* and the supporting chain of certificates including Cert. Provider-CI 104*f* and root certificate Cert.CI-root 105*c*-1 could be written by device provider 104 during distribution or configuration of device 101 or before device 101 is received by an end user of device 101. The certificates for device provider 104 including Cert.Provider 104*c* and the supporting chain of certificates including Cert. Provider-CI 104*f* and root certificate Cert. CI-root 105*a* could be stored by device 101 before device 101 sends data 106 to a MNO 102 in order to authenticate the device 101 with MNO 102.

For embodiments where the certificate Cert. Provider 104*c* is written to device 101 or stored by device 101 before a device 101 connects with a MNO 102, then a device 101 could also (i) receive Cert. Network 103*c* in a message from network 103 and (ii) check that the received Cert. Network 103*c* can be verified with the device provider public key 104*ca* in the stored Cert.Provider 104*c*. In this manner, Cert. Network 103*c* could be authenticated and verified without requiring device 101 to conduct a full set of certificate signature verification steps through parent certificates of Cert. Network 103*c* up to root certificate Cert. CI-root 105*c* stored within device 101. Note that when device 101 sends a message 205 below in FIG. 2, device 101 may not have full access to the Internet 107 in order to conduct steps and receive messages to verify a network certificate 103*c* with parent certificates that are not previously recorded in device 101 before sending the message 205.

In other words, without recording Cert.Provider 104*c* in memory before connecting to a MNO 102, then device 101 could receive a server/network certificate from AUSF 103*b* that does not chain to (or be verified through) root certificate Cert.CI-root 105*c*, which can cause significant problems with conventional technology. The reason is device 101 may not have access to IP network 107 without first authenticating with AUSF 103*b* and may have no ability to request a parent certificate from a network certificate such as Cert. Network 103*c* from AUSF 103*b* that chains to (or can be verified through) root certificate Cert.CI-root 105*c*. Without (i) previously recording Cert. Provider 104*c* to verify a network certificate Cert. Network 103*c* and (ii) verifying a received Cert.Provider 104*c* through a root certificate Cert.CI-root 105*c*-1 (or some other certificate previously securely stored in device 101 before connecting with MNO 102), then device 101 may not feasibly be able to verify a received Cert. Network 103*c* and thus authenticate MNO 102 and network 103.

Device 101 can derive an ephemeral public key ePK.TLS.Device 101*n* and an associated secret key or private key eSK.TLS.Device 101*q*, using a random number, a key pair generation function, and the set of cryptographic parameters for a TLS session. Device 101 can utilize a random number generator in order to derive private key eSK.TLS.Device 101*q* and input the random number into the key pair generation function. A key pair generation function could be included in application software running on device 101, and exemplary software for key pair generation algorithm can comprise OpenSSL, crypto++, or Mozilla libraries. The resulting ephemeral public key ePK.TLS.Device 101*n* can be sent to MNO 102 and network 103 in a message 218 below in FIG. 2 in a TLS 1.3 "Client Hello" message.

Device 101 could use a set of cryptographic algorithms 101*s* in order to process and use ePK.TLS.Device 101*n* and eSK.TLS.Device 101*q* with TLS messages such as a "client hello", a "server hello", and subsequent TLS messages. Private key eSK.TLS.Device 101*q* and a public key for network 103 of ePK.TLS.Network 103*n* can be input into an ECDH key exchange algorithm within cryptographic algorithms 101*s* in order to mutually derive a shared secret key. The shared secret key can be used to generate or derive a symmetric ciphering key and a MAC key. Device 101 could use the PKI keys with cryptographic algorithms 101*s* and cryptographic parameters 111 in order to mutually derive a symmetric ciphering key and a MAC key with network 102, as specified in IETF RFC 8446 titled "The Transport Layer Security (TLS) Protocol Version 1.3", which is herein incorporated by reference in its entirety. Note that device 101 and network 103 could also use the PKI keys to mutually derive a symmetric ciphering key and a MAC key using previous versions of TLS as well, such as TLS version 1.2.

Cryptographic algorithms 101s can include the steps and logic for processor 101p in device 101 to conduct in order for device 101 to securely communicate with MNO 102 and network 103. Cryptographic algorithms 101s can include at least symmetric ciphering algorithms, a random number generator, a key pair generation algorithm, digital signature algorithms, asymmetric ciphering algorithms, and key exchange algorithms. Cryptographic algorithms 101s can also support post-quantum cryptography, such as the exemplary types 111c for parameters 111 depicted and described in connection with FIG. 4b below. Cryptographic algorithms 101s can also include a key verification step for verifying that a received public key is valid for an ECC curve. Cryptographic algorithms 101s can use libraries available from example cryptographic suites such as OpenSSL, crypto++, BouncyCastle, or Mozilla, and other possibilities exist as well without departing from the scope of the present disclosure. Cryptographic algorithms 101s can use inputs of keys such as public keys, private keys, and/or symmetric keys along with cryptographic parameters 111 in order to for device 101 to process cryptographic data including ciphertext, key exchanges, and digital signatures.

Cryptographic parameters 111 can specify values or settings for (i) conducting an ECDH or ECDHE key exchange, (ii) mutually deriving a shared secret, (iii) mutually deriving a symmetric ciphering key from the shared secret, (iv) using a symmetric ciphering algorithm with the symmetric ciphering key, and (v) using a digital signature algorithm. As contemplated herein, cryptographic parameters 111 may also be referred to as parameters 111. Each of device 101, MNO 102, and network 103 and device provider 104 can record at least one compatible subset of parameters 111a, 111a', or 111a" within a set of cryptographic parameters 111. Parameters 111 can specify values for an elliptic curve cryptography (ECC) curve name, key length, key formatting (e.g. compressed or uncompressed), encoding rules, etc. Parameters 111 are also depicted and described in connection with FIG. 4b below.

As contemplated herein, the parameters 111 and cryptographic algorithms 101s used with ECC PKI keys and a key exchange in the present invention can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. Other possibilities exist as well for cryptographic parameters 111 without departing from the scope of the present invention.

For use of ECC algorithms, parameters 111 can specify elliptic curve names such as, but not limited to NIST P-256, sect283k1, sect283r1, sect409k1, sect409r1, and other possibilities exist as well. Further, elliptic curves that do not depend on curves currently specified by the National Institute of Standards and Technology (NIST) could be utilized as well, such as, but not limited to, Curve22519, curve448, or FourQ. Parameters 111 can specify domain parameters for nodes in system 100 and other systems herein to calculate values or numbers in a compatible manner, such as common base point G for use with ECC PKI key pairs and a defining equation for an elliptic curve.

Network 103 can comprise a collection of servers and also operate as a cloud service. As depicted for system 100 in FIG. 1, network 103 can communicate with device 101, MNO 102, and device provider 104 through IP network 107. Network 103 can include a network identity of network ID 103a, which could comprise a domain name, a name, or a string to uniquely identify network 103 in a system 100 and other systems herein. In exemplary embodiments, at least a portion of network ID 103a is included in the realm of device identity comprising a NAI for SUPI 101a.

Network 103 can include an authentication server function AUSF 103b as specified in ETSI TS 133 501 V15.1.0, as well as subsequent or related versions of ETSI standards. In general, an authentication server function can communicate with a security anchor function SEAF 102b from MNO 102. AUSF 103b can receive a SUCI 101b for device 101 from SEAF 102b, where MNO 102 receives SUCI 101b from device 101 via a wireless network and radio 102r. Additional details for the communication and operation of AUSF 103b for network 103 is provided below in FIG. 2. In exemplary embodiments, AUSF 103b and device 101 can support EAP-TLS authentication, where EAP-TLS authentication for device 101 using a wireless network is described in Annex B of ETSI TS 133 501 V15.1.0. AUSF 103b can send and receive messages with device 101 through MNO 102 and also send and receive messages with device provider 104 through IP network 107. Network 103 can include at least one processor 103p, where processor 103p can operate in a similar manner as a processor 102p described above for MNO 102. Processor 103p could be included in a server and also within AUSF 103b. A network 103 can operate with a plurality of processors 103p in order to perform the steps and communicate the messages depicted and described for a network 103 in subsequent figures herein.

Network 103 can derive an ephemeral public key ePK.TLS.Network 103n and an associated secret key or private key eSK.TLS.Network 103q, using a random number, a key pair generation function, and the set of cryptographic parameters for a TLS session. Network 103 can utilize a random number generator such as hardware random number generator in order to derive the private key eSK.TLS.Network 103q and input the random number into the key pair generation function. A key pair generation function could be included in application software running in network 103. The PKI keys depicted and associated cryptographic algorithms and cryptographic parameters could be operated within AUSF 103b. The cryptographic algorithms and cryptographic parameters operated within AUSF 103b could be equivalent to cryptographic algorithms 101s and cryptographic parameters 111 used by device 101. Exemplary software for key pair generation algorithm can comprise OpenSSL, crypto++, or Mozilla libraries.

The resulting ephemeral public key ePK.TLS.Network 103n can be sent to MNO 102 and device 101 in a message 227 below in FIG. 2 and other Figures herein in a TLS 1.3 "Server Hello" message as key share 103n. Network 103 could use a set of cryptographic algorithms in order to process and use ePK.TLS.Network 103n and eSK.TLS.Network 103q with TLS messages such as a "client hello", a "server hello", and subsequent TLS messages. Private key eSK.TLS. Network 103q and a public key for device 101 of ePK.TLS.Device 101n can be input into an ECDH key exchange algorithm in order to mutually derive a symmetric ciphering key and a MAC key. AUSF 103b could use the PKI keys with cryptographic algorithms and cryptographic parameters in order to mutually derive a symmetric ciphering key and a MAC key with device 101, as specified in IETF RFC 8446 titled "The Transport Layer Security (TLS) Protocol Version 1.3", which is herein incorporated by reference in its entirety. Note that device 101 and network 103 could also use the PKI keys to mutually derive a symmetric ciphering key and a MAC key using previous versions of TLS as well, such as TLS version 1.2.

As depicted in FIG. 1, a network 103 can also operate a network database 103d. A network database 103d could comprise a collection of servers and storage memory for storing values associated with a plurality of devices in order to support the operation of a system 100. A network database 103d could store values, strings, or numbers for device 101 such as a SUCI 101b received from MNO 102 and a device provider certificate 104c and/or device certificate 101c for device 101 received from device provider 104, and other data could be stored in a network database 103d as well. Exemplary data for an exemplary network database 103d is depicted and describe in connection with FIG. 3 below. Data within a network database 103d could be recorded or stored as network 103 receives data for a device 101 from a MNO 102 and a device provider 104. Subsequent communications after receipt of the data could use a network database 103d in order to select stored values for communication with device 101.

Network 103 can store or record a secret key for the network 103 of SK-ECIES. Network 103s in order to conduct ECIES 103j decryption of the user name in a received SUCI 101b. The private key can be associated with a set of cryptographic parameters ECIES Parameters 101f for using the private key (such as an ECC curve name), and the cryptographic parameters could be used with ECIES 103j decryption function. Note that a network 103 could use (i) a first SK-ECIES.Network 103s with a first network ID 103a with ECIES 103j decryption function and (ii) a second SK-ECIES.Network 103s with a second network ID 103a with ECIES 103j decryption function, where the different values for network ID 103a and SK-ECIES. Network 103s could also be stored within a network database 103d in FIG. 3 below. In exemplary embodiments, a MAC code output by ECIES 103j is calculated over the entire SUCI 101b, including an encrypted user name for device 101, and thus the integrity or authentication of a received plaintext realm within the SUCI 101b can be verified by comparing the received MAC code for a SUCI 101b and a calculated MAC code output the ECIES 103j ECIES Parameters 101f can specify a named curve associated with private key SK-ECIES.Network 103s. As described above, the device 101 can record a public key corresponding to SK-ECIES.Network 103s, where the public key for device 101 can comprise PK-ECIES.Network 101e as depicted in FIG. 1. The value of PK-ECIES. Network 101e could be generated by Network 103 using SK-ECIES. Network 103s and ECIES Parameters 101f. PK-ECIES.Network 101e could provided to device 101 before device 101 sends a SUCI 101b to MNO 102, such as during device manufacturing or device distribution or during a secure session prior to device 101 sending a message 205 in FIG. 2 below. Different values of SK-ECIES.Network 103s and corresponding ECIES Parameters 101f can be selected by network 103 using (i) at least a portion of network ID 103a in a realm within a received SUCI 101b for device 101 and (ii) a network database 103d. SK-ECIES-.Network 103s can comprise a first private key for named curve P-256 and a second public key for named curve 25519, where the selection of the first private key or second private key could be based on ECIES Parameters 101f, which could be associated with the network ID 103a in a realm received in a SUCI 101b for device 101. Note that the transmission of a SUCI 101b by device 101 can also include a specified set of ECIES parameters 101f in order to identify a named curve or parameters associated with ePK.ECIES-.Device 101h transmitted by device 101 along with the SUCI 101b. Different devices 101 could include the different network ID 103a names in the SUCI 101b, such as a first set of devices using an exemplary value of "network-1" in the realm portion of a SUCI 101b and a second set of devices using an exemplary value of "network-2" in the realm portion of SUCI 101b. In exemplary embodiments, the network ID 103a in the realm portion of a SUCI 101b can be used to select from network database 103d the SK-ECIES.Network 103s for an ECIES decryption function 103j, such that different devices 101 can use different corresponding PK-ECIES.Network 101e for a SUPI/ECIES encryption function 101j by the different devices. The use of different network ID 103a names and different secret keys SK-ECIES. Network 103s for network 103 could also be stored in a network database 103d in FIG. 3 below.

Network 103 can include a decryption function ECIES 103j in order to convert a SUCI 101b into a SUPI 101a. The decryption function ECIES 103j can comprise the identity decryption scheme as described in Annex C: "Protection schemes for concealing the subscription permanent identifier" in ETSI standard TS TS 133.501 version 15.1.0. In summary, device provider can conduct an elliptic curve Diffie-Hellman key exchange using (i) the selected private key SK-ECIES.Network 103s (where key 103s can be selected based on ID 103a in a SUCI realm), (ii) a received device public key ePK.ECIES.Device 101h received along with SUCI 101b, and (iii) parameters ECIES Parameters 101f in order to generate an encryption key and a message authentication code (MAC) key. The user portion of SUCI 101b, or the encrypted user name, can be input into the decryption function ECIES 103j along with the derived encryption key and MAC key in order to generate SUPI 101a which contains the user name as a plaintext. A MAC code generated by ECIES 103j using the MAC key can be used to verify message integrity for the SUCI 101b by network 103. The realm portion of SUCI 101a can be received as plaintext and may preferably not be altered or changed by ECIES 103j for some exemplary embodiments.

Network 103 can store a network certificate Cert. Network 103c, where (i) the public key in Cert. Network 103c can be digitally signed by a device provider 104 using SK.Provider 104e and (ii) the corresponding public key for SK.Provider 104e of PK.Provider 104ca can be stored by device 104 before sending a SUCI 101b to MNO 102. A network 103 can also record or store a plurality of network certificates Cert. Network 103c for different network public keys and different parameters, as well as for signature by different device providers 104. Cert. Network 103c can include (i) a certificate issuer identity, which can comprise device provider identity Provider ID 104a, (ii) a server name identifier (SNI) 103a for network 103 which can comprise a network identity 103a, (iii) a network public key PK.network 103e, (iv) a set of parameters for the network public key of PK.Parameters. Network 111a', and (v) a digital signature 122 over at least the network public key, where the digital signature 122 can be generated by device provider 104 using SK.Provider 104e for the PK.Provider 104ca stored by device 101. A network 103 can also store the secret or private key corresponding to the public key 103e in Cert.

Network 103c, and the private key can comprise network private key SK.Network 103f. The steps for network 103 to obtain the network certificate cert.network 103c are depicted and described in connection with FIG. 2 and subsequent figures below. For some embodiments, network 103 could also store a network certificate 103c before device 101 connects with MNO 102.

Device provider 104 can comprise an entity or set of servers for authenticating or managing plurality of devices 101. Although depicted in FIG. 1 and other Figures herein as "device provider 104", an entity such as a device owner, a device manufacturer, or a device distributor could record the data and perform the functions of a "device provider 104". In general, a device provider 104 can comprise an entity or collection of servers which is the source for providing Cert.Provider 104c to device 101 before device 101 connects with MNO 102, where Cert. Provider 104c can be used by device 101 to authenticate MNO 102 and with AUSF 103b below in FIG. 2 and subsequent Figures herein. As contemplated herein, a "device provider" may also be referred to as a "provider". Consequently, a device provider secret key SK.Provider 104e can be referred to as a "provider secret key 104e", a device provider certificate Cert. Provider 104c can be referred to as a "provider certificate 104c", etc.

Although depicted as "device provider" in FIG. 1 and subsequent Figures herein, the device provider 104 could be a device owner, a device distributor, or a device manufacturer. In general, a device provider has a sufficient level of ownership or control of device 101 before device 101 connects with MNO 102 such that device provider 104 or an entity associated with device provider 104 could record or store the device identity SUPI 101a, and at least a certificate 101c for device 101 before device 101 connects with MNO 102. For some embodiments, device provider 104 could also be a device user, where the device user operates a plurality of different devices. As one example, device provider 104 could be a large enterprise responsible for hundreds or more devices that are geographically dispersed, and the enterprise may prefer to support the authentication and networking connectivity for device 101 using the steps and messages depicted herein.

Device provider 104 can include a provider identity of provider ID 104a. Provider ID 104a can comprise a name or unique identifier, including a domain name or at least a portion of a realm in a NAI, in order to uniquely identify device provider 104 in a system 100, since a system 100 could include a plurality of different device providers 104. At least a portion of the provider ID 104a can be included in the SUPI 101a and SUCI 101b, such as within the realm portion of the SUPI 101a and SUCI 101b, as depicted in FIG. 1. Although a single provider ID 104a is depicted in FIG. 1, a device provider could use a plurality of different related provider ID 104a names or identities, such as "company-1", "company-2", etc. The use of different provider ID 104a names is depicted for in a device database 104d in FIG. 3 below.

Device provider 104 can store a plurality of device identities comprising SUPI 101a for a plurality of devices. Although depicted as external to device database 104d in FIG. 1, the values of SUPI 101a could be recorded within device database 104d along with the unique user name portion for each of the devices. Note that for a given device 101 in a system 100, a user name may not be globally unique, but the combination of user name and realm for a SUPI 101a can be globally unique in preferred embodiments. For some embodiments, device provider 104 can also store the concealed identity SUCI 101b received from a network 103 and originated by device 101 in order to conduct an ECIES decryption step to convert the SUCI 101b into a SUCI 101a for device 101. In other words, although a network 103 is depicted as conducting an ECIES decryption function 103j, for some embodiments a device provider 104 could conduct the decryption function and convert a SUCI 101b into a SUPI 101a for a device 101.

Device provider 104 can also store or record a plurality of device certificates 101c corresponding to a plurality of devices in a system 100. The device provider 104 could be responsible for initial configuration of devices 101 or receive initial configuration data for devices 101, where the initial configuration of device 101 can include the generation of a device certificate 101c, and device provider 104 could store the device certificate 101c for each of the devices 101. Although depicted as external to a device database 101d, device provider 104 could store a plurality of device certificates in a device database 101d. By device provider 104 storing a device certificate 101c and providing the device certificate 101c to a network 103, the authentication by network 103 of device 101 can be simplified, as described below in FIG. 2 (since network 103 could trust device provider 104 and receive the device certificate 101c from device provider 104, where network 103 may not trust device 101 when a certificate 101c is received from device 101).

A certificate for device provider 104 can comprise Cert. Provider 104c and can include the device provider identity comprising provider ID 104a. A certificate 104c for device provider 104 can include a public key corresponding to the device provider private key SK.Provider 104e, a set of cryptographic parameters for the device provider public key, the identity of a certificate authority, and a digital signature for the certificate authority, as well as a specified digital signature algorithm used for the digital signature. A certificate 104c for device provider 104 and other nodes in a system 100 can comprise a certificate supporting X.509 v3 formats, and other formats or structures for a device provider certificate Cert. Provider 104c and other certificates as contemplated herein are possible as well. The cryptographic parameters can specify parameters for both the device provider public key and also the digital signature from a certificate authority. Cryptographic parameters in a certificate can specify algorithms such as RSA or elliptic curve cryptography (ECC) values, ECC curve names, key lengths in bits, signature algorithms, validity dates, encoding rules, etc. Cryptographic parameters in a device provider certificate 104c and other certificates herein can also support algorithms for post-quantum cryptography, as depicted and described for parameters 111 in FIG. 4b below. The signature of the certificate authority or certificate issuer for Cert. Provider 104c could be included in device provider certificate 104c.

Note that a device provider 104 could use a plurality of different device provider certificates 104c, and the device provider certificate 104c for a device could be selected from a device database 104d for a device using the SUPI 101a output from decryption function ECIES 103j and received from a network 103. In some exemplary embodiments, the device provider certificate Cert. Provider 104c is also recorded in a device 101 as depicted in FIG. 1 before device 101 sends a SUCI 101b to MNO 102. In other exemplary embodiments, device 101 may not record Cert. Provider 104c before device 101 sends a SUCI 101b to MNO 102, and for these embodiments Cert. Provider 104c could be received an verified by device 101 in a TLS handshake, where device 101 could verify Cert. Provider 104c using another "parent" certificate for Cert. Provider 104c such as certificate issuer 105 root certificate Cert. CI-root 105c-1.

A device provider 104 can record and use a device provider private key SK.Provider 104e (e.g. "secret key"). The private key can (i) correspond to the public key in the device provider certificate Cert.Provider 104c and (ii) be used by device provider 104 in order to generate the digital signature for Cert.Network 103c. In exemplary embodiments, device provider 104 (i) internally generates a random number for the device provider private key SK.Provider 104e and using cryptographic algorithms 104s, (ii) generates the device provider public key in a Cert. Provider 104c and the set of cryptographic parameters within the certificate Cert. Provider 104c, such as the values for an elliptic curve named curve and specification of digital signature algorithms. The generation of the public key for device provider certificate Cert. Provider 104c could be before or during device 101 manufacturing or distribution and before device 101 sends a SUCI 101b to a MNO 102. In this manner, a device provider certificate Cert. Provider 104c could be written to device 101 before device 101 sends a SUCI 101b to MNO 102.

In some exemplary embodiments, device provider 104 operates a parent or "intermediate" certificate authority or certificate issuer in order to generate and sign Cert. Provider 104c. The public key for SK.Provider 104e in Cert.Provider 104c could be signed by a device provider secret key SK. Provider-CI (not shown in FIG. 1) for Cert. Provider-CI 104f stored by a device 101. Note that device 101 could store the certificate issuer certificate Cert. Provider-CI 104f for the device provider certificate Cert. Provider 104c, as depicted in FIG. 1. The public key for Cert. Provider-CI 104f could be signed by SK.Root 105b-1 from a certificate issuer 105-1, where the certificate authority/issuer signature in Cert. Provider-CI 104f can be verified with root certificate Cert. CI-root 105c-1. Although a single level of a certificate issuer between device provider certificate Cert. Provider 104c and root certificate Cert.CI-root 105c-1 is depicted in FIG. 1 within a device 101, a device provider 104 could operate multiple levels of intermediate certificates between device provider certificate Cert.Provider 104c and root certificate Cert.CI-root 105c-1. As depicted in FIG. 1, a system 100 could include multiple root certificate issuers 105, and device provider 104 could record multiple certificates Cert. Provider-CI 104f or Cert. Provider 104c signed by different root certificate issuers 105 with different SK.Root 105b from the different certificate issuers 105.

Cryptographic algorithms 104s can include the steps and logic for processor 104p in device provider 104 to conduct in order for device provider 104 to securely communicate with network 103. Cryptographic algorithms can include symmetric ciphering algorithms, a random number generator, a key pair generation algorithm, digital signature algorithms, asymmetric ciphering algorithms, and key exchange algorithms. Cryptographic algorithms can also include a key verification step for verifying that a received public key is valid for an ECC curve. Cryptographic algorithms 104s can use libraries available from example cryptographic suites such as OpenSSL, crypto++, BouncyCastle, or Mozilla, and other possibilities exist as well without departing from the scope of the present disclosure. Cryptographic algorithms 104s can us inputs of keys such as public keys, private keys, and/or symmetric keys along with cryptographic parameters 104x in order to for device provider 104 to process cryptographic data including ciphertext, key exchanges, and digital signatures.

Cryptographic parameters 111 can specify values or settings for (i) conducting an ECDH or ECDHE key exchange to obtain or derive a shared secret, (ii) mutually deriving a symmetric ciphering key using at least the derived shared secret, (iii) using a symmetric ciphering algorithm with the symmetric ciphering key, and (iv) using a digital signature algorithm. Cryptographic algorithms 104s for device provider 104 can correspond or be equivalent to cryptographic algorithms 101s for device 101, and cryptographic parameters 111 for device provider 104 can correspond or be equivalent to cryptographic parameters 111 for device 101.

Device provider 104 can operate a plurality of servers with at least one processor 104p. A processor 104p can comprise a central processing unit (CPU) or a "system on a chip" and be similar to a processor 102p for a MNO 102 described above. Device provider user interface 104u can comprise a web-based interface for administrators of device provider 104 to manage the function and operation of device provider 104 as well as manage a plurality of devices 101. User interface 104u can support the addition of new devices in a system 100, the deletion or revocation of existing devices in a system 100, etc. User interface 104u can also allow changes in values and tables for a plurality of devices 101 in a device database 104d, where a device database 104d is depicted and described in connection with FIG. 3 below.

Device database 104d can record a plurality of values for a plurality of devices in order for device provider 104 to manage or operate communications with device 101 through a network 103. Device database 104d can record for each device exemplary values of SUPI 101a, device certificate 101c, the provider ID 104a used by device 101, a device provider certificate 104c used by a device 101, etc. Additional details regarding the data stored in a device database 104d are depicted and described in connection with FIG. 3 below.

As depicted in FIG. 1, device 103 can also store or operate a database 101k, which could also comprise a certificate database. The database 101k can include a plurality of certificates for device 101. An exemplary first certificate 101c-1 for device 101 could include a first device public key 101ca-1, a first set of parameters 111a-1 for the device public key, and a digital signature 122-1 over at least the first device public key 101ca-1, where the digital signature can be verified by a certificate such as Cert. Provider 104d or a certificate issuer certificate such as Cert. Provider-CI 104f. Along with the first certificate can be stored a first device private key 101d-1 for the first device public key 101ca-1. Device 101 could include the same device identity of SUPI 101a in multiple certificates in database 101k. In addition, device 101 could include different values of SUPI 101a in different certificates in database 101k.

An exemplary second certificate 101c-2 for device 101 could include a second device public key 101ca-2, a second set of parameters 111a-2 for the device public key, and a digital signature 122-2 over at least the second device public key 101ca-2, where the digital signature can be verified by a certificate such as Cert.Provider 104d or a certificate issuer certificate such as Cert. Provider-CI 104f. Along with the second certificate can be stored a second device private key 101d-2 for the second device public key 101ca-2. In exemplary embodiments, a device 101 can select a device certificate 101c from a database 101k using the parameters 111a. Although not depicted for a database 101k, the certificates could also include identities for issuers, such as provider ID 104a, network ID 103a, etc., and device 101 could select a device certificate 101c from the database 101k using the certificate issuer identity. For some embodiments, the device could select the device certificate 101c based on both the parameters 111a and the certificate issuer identity. The parameters 111a and certificate issuer identity could be received in extensions within a "server hello" message 227 as depicted in FIG. 2 below.

Although FIG. 1 depicts MNO 102, network 103, and device provider 104 as separate nodes or entities, in some exemplary embodiments different entities or function of the nodes could be combined. In one embodiment, a MNO 102 and a network 103 could be combined, such that a MNO 102 controls or operates the network 103. In this embodiment, then a MNO 102 would operate both a SEAF 102b and an AUSF 103b. Or, a network 103 could control or operate a MNO 102, such that the network 103 controls or operates both a SEAF 102b and an AUSF 103b. The operation of a network 103 and device provider 104 could also be combined.

In addition, although a MNO 102 is depicted in FIG. 1, the wireless networking technology operated by MNO 102 with radios 102r could use WiFi based technology (e.g. based on 802.11 standards) and a collection of geographically distributed WiFi access points. The WiFi access points could be controlled by network 103 and a security anchor function 102b could be omitted. In another embodiment, the function and operation of a network 103 and a device provider 104 could combined, such that either (i) network 103 records the data and operates the function of a device provider 104, or (ii) a device provider 104 operates an AUSF 103b. Other possibilities exist as well for the combination of the data and functions for a MNO 102, network 103, and device provider 104 without departing from the scope of the present invention.

FIG. 2

Figure 2:
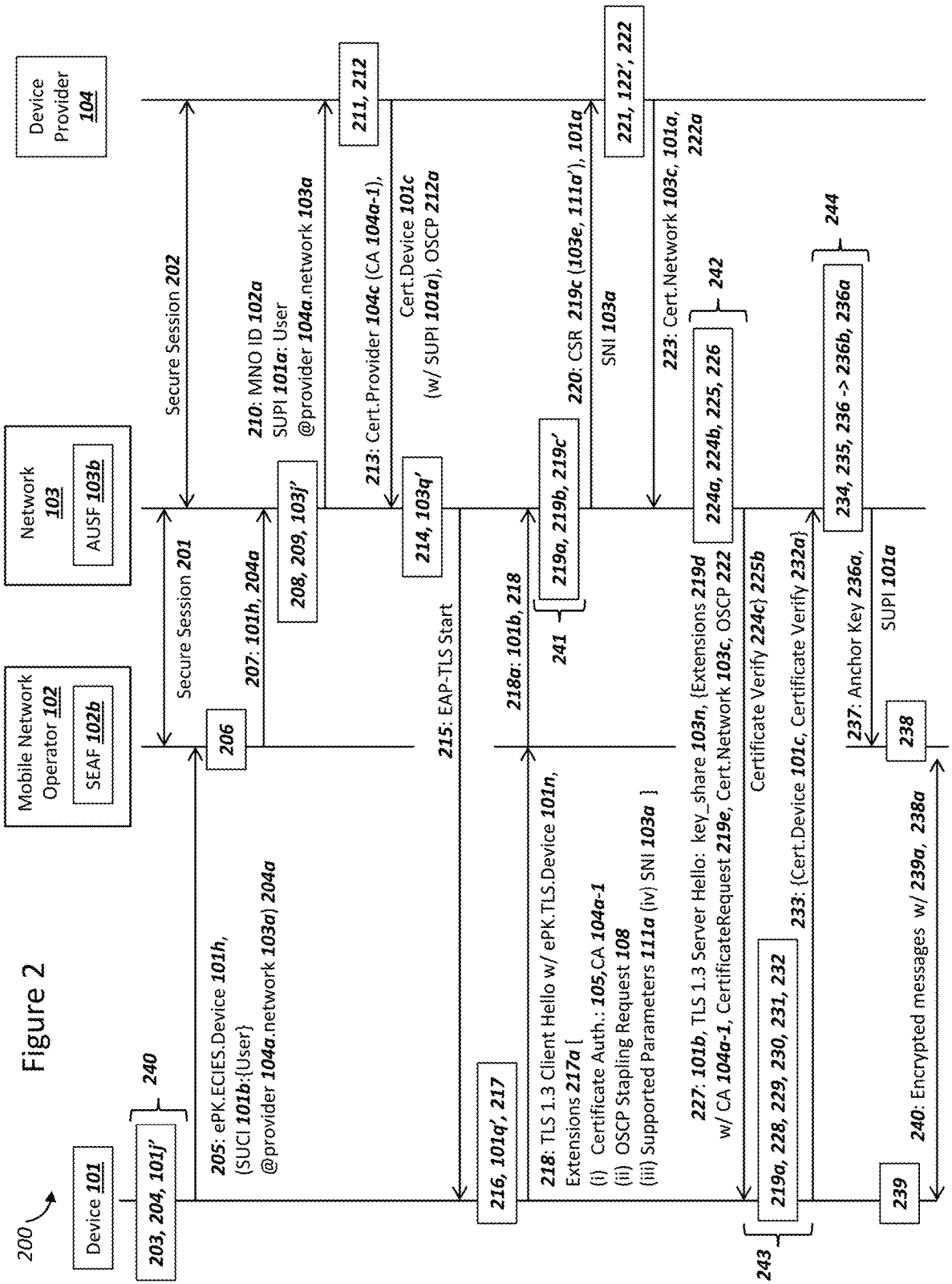
FIG. 2 is a simplified message flow diagram illustrating an exemplary system with exemplary data sent and received by a device, a mobile network operator, a network, and a device provider, in accordance with exemplary embodiments.

FIG. 2 is a simplified message flow diagram illustrating an exemplary system with exemplary data sent and received by a device, a mobile network operator, a network, and a device provider, in accordance with exemplary embodiments. System 200 can include a device 101, a mobile network operator (MNO) 102, a network 103, and a device provider 104. The nodes or entities within system 200 were also depicted and described in connection with FIG. 1 above, where FIG. 2 depicts exemplary steps for the nodes and exemplary message flows between the nodes. Although a single device 101, MNO 102, network 103, and device provider 104 are depicted in a system 200, a system 200 could include a plurality of each of the depicted nodes connected via an IP network 107. In addition, data recorded for device 101 and device provider 104 depicted and described above in FIG. 1 (other than ephemeral PKI keys) can be recorded in the device 101 and device provider 104 depicted in FIG. 2 before the steps and message flows are conducted in FIG. 2.

In order to support authentication of devices 101 with network 103, a MNO 102 could establish a secure session 201 with network 103. Secure session 201 could comprise establishing a secure communications link between the two servers using protocols such as TLS, IPSec, a virtual private network (VPN), a secure shell (SSH), or similar networking, transport, or application layer technologies in order to establish secure communications between MNO 102 and network 103. Secure session 201 can utilize certificates for each of MNO 102 and network 103 in order to provide mutual authentication and mutual key derivation for a symmetric encryption key in secure session 201. Secure session 201 can also be conducted over IP network 107, although the secure session 201 could also be established or conducted through a private network. Other possibilities exist as well for establishing a secure session 201 between MNO 102 and network 103 without departing from the scope of the present disclosure.

In order to support authentication of devices 101 with network 103, a network 103 and device provider 104 could establish a secure session 202. Secure session 202 can be equivalent to secure session 201 described in the paragraph above. Secure session 202 could use certificates from both network 103 and device provider 104 for mutual authentication and the secure derivation of encryption keys for the secure session. Note that subsequent data transmitted from device provider 104 to network 103 through the secure session 202 can be trusted by network 103 on the basis of the trust for secure session 202. For example, network 103 and AUSF 103b could receive a device certificate 101c for a device 101, where the device certificate 101c may not be authenticated with a certificate chain and a root certificate recorded or used by network 103. However, network 103 could still trust the device certificate 101c since the device certificate 101c could also be received through secure session 202, where secure session 202 can be mutually authenticated using certificates for both network 103 and device provider 104. In some exemplary embodiments, both secure session 201 and secure session 202 are established using TLS 1.3.

At step 203, device 101 can power on and load firmware and configuration data in order to connect with wireless network 102. A step 203 can also include firmware or software in device 101 loading a RF module or radio 101r within device with an operating configuration such as MNO parameters 101g in FIG. 1 (such as frequencies to use, wireless technology to use such as 5G or WiFi 6, etc.). Step 203 can include device 101 scanning for available mobile networks 102 and then selecting a preferred mobile network. In exemplary embodiments, device 101 scans for mobile network identities broadcast in system information blocks, there the mobile network identity such as mobile network ID 102a matches the value for a mobile network in a realm for a SUPI 101a recorded by device 101.

In other words, device 101 could include multiple SUPI 101a with different realms for different networks 103 and device providers 104, and search for a MNO 102 in an RF beacon or signal that matches a realm for one of the multiple SUPI 101a. For other embodiments, the MNO ID 102 may not be included in a portion of a realm within a SUPI 101a, and a device 101 could select the MNO 102 using MNO parameters 101g. At the conclusion of a step 203, device 101 can select and store a SUPI 101a to use with a MNO 102. A step 203 can also include device 101 selecting MNO parameters 101g based on observed and available MNO 102 for a radio 101r in device 101. The selection of a SUPI 101a for device 101 in a step 203 can include the selection of (i) a device provider 104 provider ID 104a for a realm of the SUPI 101a and/or (ii) a selection of network identity network ID 103a for a realm of SUPI 101a. The values for PK-ECIES.Network 101e and ECIES Parameters 101f can be selected in a step 203 based on the provider ID 104a for the SUPI 101a. As one example a SUPI 101a selected in a step 203 could comprise an exemplary value of "XXXXX@company.aws.com", where XXXXX is the user name, "company" is the provider ID 104a and "aws.com" is the network ID 103a. Other possibilities for the selection of a SUPI 101a by device 101 from a plurality of SUPI 101a stored by device 101 in a step 203 are possible as well, without departing from the scope of the present disclosure.

At step 204, device 101 can conduct a radio resource connection (RRC) request with MNO 102 using a radio 101r and the selected MNO parameters 101g. The RRC can transition a radio 101r in device 101 from an idle state to an active state. In the active state, device 101 can transmit messages or data to MNO 102. A step 204 can also include device 101 generating an ephemeral PKI key pair of ePK.E-CIES.Device 101h and eSK.ECIES.Device 101i. At step 101j' device 101 can conduct the ECIES 101j encryption function with secret key eSK.ECIES.Device101i and public key PK-ECIES.Network 101e in order to derive a symmetric ciphering key and an MAC key. The user name portion of a SUPI 101a can be input into the ECIES 101j along with the symmetric key and the MAC key in order to output a first portion the SUCI 101b comprising an encrypted user name for the device 101.

The realm portion of a SUPI 101a can be input into the ECIES 101j along with the MAC key in order to output a MAC code covering the realm portion the SUCI 101b, such that the realm portion can be verified using the MAC code. Or, a single MAC code for both the first portion of the SUCI 101b and the realm portion of the SUCI 101b could be generated or calculated in a step 204. As depicted in FIG. 2, the combination of an encrypted user name, selected provider ID 104a for a realm, and/or the selected network ID 103a for a realm can comprise a value 204a. The value 204a can also include a MAC code using the MAC key from ECIES 101j encryption function, such that a device provider 104 receiving and decrypting the value 204a comprising at least the SUCI 101b and the MAC code can verify the integrity of the value 204a.

Device 101 can then send a message 205 to the selected MNO 102 through (i) a wireless network operated by MNO 102 and (ii) the radio resource connection from a step 203, where the message 205 includes at least the public key ePK.ECIES.Device 101h and the value 204a. MNO 102 and SEAF 102b can receive the message 205 and conduct a step 206 in order to process the message 205. At step 206, SEAF 102b can (i) read the plaintext realm for SUCI 101b in value 204a, and (ii) select the network 103 using the network ID 103a in a realm for SUCI 101b. In a preferred exemplary embodiment as depicted in FIG. 2, the suffix of the realm can comprise the network ID 103a, but in other embodiments the prefix of the realm could comprise the network ID 103a. Or, the entire realm in a SUCI 101b received by MNO 102 could comprise the network ID 103a Note that MNO 102 and network 103 could have prior commercial and technical agreements for MNO 102 to forward device 101 authentication data to network 103 and AUSF 103b. If MNO 102 has no commercial relationship with network 103, or secure session 201 could not be established, or MNO 102 cannot forward the data in message 205, then MNO 102 can send device 101 an error message with an error code explaining the failure. Device 101 could then take corrective steps, such as selecting a different MNO 102 or different network 103 via a different SUPI 101a for device 101 in order to send a message 205 to the different MNO 102. Or, device 101 could select a different SUPI 101a in a step 204 again and send a new SUCI 101b with a different SUPI 101a to the same MNO 102 in order to conduct authentication with the MNO 102 and network 103.

MNO 102 can then send network 103 and AUSF 103b a message 207 through secure session 201, where (i) message 207 includes ePK.ECIES.Device 101h and the value 204a, and (ii) the value 204a includes SUCI 101b. The AUSF 103b for network 103 can receive the message 207. At step 208, the AUSF 103b can read and process the plaintext data in the realm for SUCI 101b in value 204a. At step 208, the AUSF 103b can select the device provider 104 using the device provider ID 104a in the realm for SUCI 101b. In a preferred exemplary embodiment as depicted in FIG. 2, the prefix of the realm can comprise the provider ID 104a.

Note that network 103 and device provider 104 could have prior commercial and technical agreements for network 103 to forward device 101 authentication data to device provider 104. If network 103 has no commercial relationship with device provider 104, or secure session 202 could not be established, or network 103 cannot forward the data in message 207, then network 103 can send MNO 102 an error message with an error code explaining the failure. MNO 102 could then send device 101 an error code explaining the failure, such that device 101 could take corrective steps, such as selecting a different MNO 102 or different network 103 in order to send a message 205 to the different MNO 102. Upon a failure, a device 101 could also conduct a subsequent step 204 in order to select a different SUPI 101a and generate a new SUCI 101b for the new, different SUPI 101a to the same MNO 102 or a different MNO 102. Upon successful receipt of a SUCI 101b, a step 208 can include AUSF 103b storing SUCI 101b in a network database 103d for subsequent use in identifying device 101, such as when receiving a "client hello" message 218 below with a SUCI 101b added to message 218 by SEAF 102b.

Network 103 can then conduct a series of steps in order to process the message 207. At step 209, network 103 can read the plaintext network ID 103a in SUCI 101b and use network database 103d in order to select (i) secret key SK-ECIES.Network 103s and (ii) ECIES Parameters 101f. Within a network database 103d, a network ID 103a can be uniquely associated with secret key SK-ECIES.Network 103s and (ii) ECIES Parameters 101f. Network 103 can then conduct a verification of the received ePK.ECIES.Device 101h using the ECIES Parameters 101f. The verification step can comprise verifying that the received public key is on the curve specified by ECIES Parameters 101f, the public key value does not comprise the "point at infinity", etc.

Network 103 can then conduct a step 103j' using ECIES decryption function 103j in order to convert the ciphertext user name in SUCI 101b into plaintext. ECIES 103j was depicted and described in connection with FIG. 1 above. A step 103j' can also include deriving a MAC key and verifying a MAC code within value 204a in order to check the message integrity of SUCI 101b. In other words, device provider can securely store a SUPI 101a for device 101 after step 103j' in a network database 103d. For some exemplary embodiments, a SUCI 101b could omit an encrypted user portion of the NAI, and the SUCI 101b in a message 205 and message 207 can comprise only the realm portion of the NAI. The MNO 102 can use the realm portion of the NAI, such as the network ID 103a in the realm, to select the network 103 and AUSF 103b. In this manner, when the user is omitted from SUCI 101b, AUSF 103b can still send a TLS start command 215 to device 101.

Network 103 and AUSF 103b can then send a message 210 to device provider 104 through secure session 202, where message 210 can include (i) MNO ID 102a, and (ii) the value SUPI 101a. Note that the inclusion of MNO ID 102a can be useful for device provider 104 in a message 210, since (i) device 101 could connect with multiple different MNO 102, and (ii) network 103 could support multiple different MNO 102, and (iii) device provider 104 may need to know which MNO 102 is used by device 101 for billing or administrative purposes. In other words, without including MNO ID 102a in message 210 then device provider 104 may not know which MNO 102 that device 101 attempts to connect with.

Although an ECIES decryption function 103j is depicted in FIG. 2 as being conducted by a network 103, in some exemplary embodiments a device provider 104 could conduct the ECIES decryption function 103j and network 103 would send device provider 104 a message 210 with the SUCI 101b for a device 101. For these embodiments, then device provider 104 could store the values for secret key SK-ECIES.Network 103b and parameters ECIES Parameters 101f, as well as the ECIES decryption function 103j. In other words, although FIG. 1 depicts values for secret key SK-ECIES. Network 103b and parameters ECIES Parameters 101f, as well as the ECIES decryption function 103j as within a network 103, a device provider 104 could store the data and perform a step 103j' in some exemplary embodiments. Device provider 104 could conduct the step 103j' (instead of network 103 as depicted in FIG. 2) to decrypt the encrypted user portion within a SUCI 101b received from MNO 102 in order to generate a SUPI 101a for device 101. For the embodiment described in this paragraph, then a message 210 could include a SUCI 101b instead of a SUPI 101a, and device provider 104 could conduct the steps of 209 and 103j' instead of a network 103. For the embodiment described in this paragraph, then the depicted key of "PK-ECIES.Network 101e" stored by device 101 can be associated with a device provider 103 instead of a network 103.

Device provider 104 can conduct a step 211 with the plaintext user name to query a device database 104d for data pertaining to device 101, and a step 211 can include verifying that device 101 with the SUPI 101a is authorized to connect with MNO 102 and/or network 103. In a step 211, device provider 104 can determine the MNO 102 that device 101 attempts to connect with based on the MNO ID 102a received in a message 210 above. If device 101 is not authorized to connect with MNO 102, then device provider 104 could send an error message to network 103 (for forwarding to device 101) and not proceed to the additional steps depicted in FIG. 2.

At step 212, device provider 104 can use the user name from SUPI 101a from message 210 to query device database 104d for the device certificate cert.device 101c and also the device provider certificate cert.provider 104c recorded by device 101, as depicted and described above in connection with FIG. 1. Note that a device certificate cert.device 101c can include the SUPI 101a as the device identity within the certificate. For embodiments where device 101 stores a plurality of certificates 101c, then device provider 104 could select the plurality of device certificates 101c from a device database 104d in a step 212, and device provider 104 could subsequently send network 103 the plurality of selected device certificates 101c.

For some exemplary embodiments, a step 212 could omit the selection of either device certificate 101c or device provider certificate 104c, and either certificate could be omitted in a subsequent message such as message 213. For embodiments where a user name was omitted from a message 205, then device provider 104 could receive a provider ID 104a from the realm for device 101 in a message 210 and select a device provider certificate cert.provider 104c for the provider ID 104a in a step 212 and omit the selection of a device certificate cert.device 101c. Embodiments where a user name is omitted from a message 205 (or has a "null" value, etc.) are also depicted and described in connection with FIG. 4a below.

A step 212 can also include device provider 104 collecting an OSCP stapling 212a through root certificate Cert.CI-root 105c for certificates cert.device 101c and cert.provider 104c. OSCP staplings is described in the TLS 1.3 RFC 8446, and OSCP stapling 212a provides an updated signature from parent certificate issuers that the certificate has not been revoked. In exemplary embodiments, OSCP stapling 212a is provided for cert.provider 104c, such that device 101 could verify the OSCP stapling 212a using the certificate chain for cert.provider 104c recorded by device 101. OSCP stapling 212a can be important for device 101 because device 101 may not have connectivity to IP network 107 without successfully conducting an EAP-TLS authentication with MNO 102, but connectivity to IP network 107 would normally be required to check certificate revocation lists without OSCP stapling 212a. In subsequent steps a network public key PK.network 103e can be in a network certificate verified using the device provider public key PK.provider 104ca, and both device 101 and network 103 can use OSCP stapling 212a of cert.provider 104c in order to verify that cert.provider 104c has not been revoked. In other words, without OSCP stapling 212a from a step 212, device 101 may not feasibly be able to check for certificate revocation for the device provider certificate cert.provider 104c selected by device provider 104 in a step 212. Device 101 can receive cert.provider 104c in a subsequent "server hello" message in FIG. 2 along with OSCP stapling 212a.

Device provider 104 can then send network 103 and AUSF 103b a message 213 through secure session 202, where message 213 can include the selected device provider certificate Cert.Provider 104c from a step 212, device certificate Cert. Device 101c (possibly w/SUPI 101a) from a step 212, and OSCP stapling 212a for device provider certificate 104c and/or device certificate 101c. A SUPI 101a for device 101 can be in a device certificate Cert.Device 101c. For embodiments where the user name was omitted from a message 205 (but a realm with provider ID 104a associated with provider certificate cert.provider 103c was in message 205), then message 213 can omit a device certificate cert.device 104c. Network 103 and AUSF 103b can receive the message 213 and conduct a step 214 to store (i) device provider certificate Cert.Provider 104c and (ii) device certificate Cert.Device 101c for the SUPI 101a and (iii) SUCI 101b used by device 101 in a network database 103d as depicted in FIG. 3 below. In exemplary embodiments Cert.Provider 104c includes a subset of cryptographic parameters 111a' and Cert. Device 101c includes a subset of cryptographic parameters 111a'.

Network 103 could operate a network database 103d similar to device database 104d, where an exemplary network database 103d is depicted in FIG. 3 below. In a step 214, network 103 could store received certificates such as device provider certificate Cert. Provider 104c and device certificate Cert. Device 101c for a plurality of devices 101 along with the SUCI 101b for devices 101 received in messages 207 and SUPI 101a for devices 101 derived in a step 103j'. AUSF 103b can determine the SUPI 101a for device 101 based on the SUPI 101a within a device certificate 101c, and both the values for SUPI 101a and string or file for device certificate 101c could be stored in a network database 103d as depicted in FIG. 2 below. Or, in another exemplary embodiment the SUPI 101a could also be sent external to a device certificate in a message 213. Network 103 and AUSF 103b can then use a network database 103d to select device provider certificate Cert.Provider 104c and device certificate Cert.Device 101c in subsequent steps, such as a step 219a using the SUPI 101a or SUCI 101b for a device 101. In a step 214, network 103 could also verify that a SUPI 101a received with a device certificate 101c in a message 213 matches the SUPI 101a derived in a step 103j' for a SUCI 101b received in a message 205.

In addition, although message 213 with Cert.Provider 104c and Cert.Device 101c is depicted as being sent by device provider 104 after the receipt of a message 210, device provider 104 could send Cert. Provider 104c and Cert. Device 101c to network 103 before a message 210 and after the establishment of secure session 202. Device provider 104 could send Cert. Provider 104c and Cert. Device 101c for a plurality of different devices 101. By sending message 213 as depicted in FIG. 2, then OSCP stapling 212a can be more current or more "fresh" for device 101. In addition, a network 103 could record a plurality of device provider certificates Cert. Provider 104c in a network database 103d before network 103 receives a message 213, and in this embodiment then a message 213 could include an identifier of a device provider certificate Cert. Provider 104c (such as a certificate identity) instead of the full certificate as a *.pem file or equivalent. Further, a network 103 could record a plurality of device certificates Cert. Device 104c in a network database 103d before network 103 receives a message 213, and in this embodiment then a message 213 could include an identifier of a device certificate Cert.Device 101c (such as a certificate identity) instead of the full certificate as a *.pem file or equivalent.

Further, although device provider certificate Cert.Provider 104c and device certificate Cert.Device 101c are depicted in FIG. 2 as being sent in the same message 213, a message 213 could be sent in parts, such as the data being transmitted via a physical interface in device provider 104 separately. A device provider certificate Cert. Provider 104c or device certificate Cert.Device 101c could be selected by device provider at a later point in time than depicted in FIG. 2, such as device provider 104 sending device provider certificate Cert.Provider 104c and/or device certificate Cert.Device 101c after the receipt of a message 220 from network 103. A step 211 to select the device provider certificate Cert.Provider 104c or device certificate Cert.Device 101c could be conducted after device provider 104 receives a message 220. Other possibilities for the sequence and timing for a device provider 104 to send a network 103 device provider certificate Cert. Provider 104c or device certificate Cert. Device 101c are possible as well without departing from the scope of the present disclosure.

Note that network 103 and AUSF 103b can trust Cert. Provider 104c and Cert. Device 101c, since the certificates can be delivered through the secure session 202. Or, in a step 214 network 103 could conduct a certificate verification of Cert.Provider 104c and Cert. Device 101c through a root certificate, such as a Cert. CI-root 105c. Note that Cert. Provider 104c and Cert. Device 101c do not have to be verified through a root certificate stored by network 103, since the certificates are received through secure session 202, where secure session 202 can be established with other certificates for device provider 104 (and the other certificates for a secure session 202 could be verified through a different root certificate than the Cert. CI-root 105c recorded by device 101 as depicted in FIG. 1). A step 214 can also include AUSF 103b verifying that AUSF 103b supports the cryptographic parameters 111a' and/or 111a" in the certificates received in a message 213. In other words, AUSF 103b can use a step 214 to verify that AUSF 103b can conduct a TLS 1.3 session using the parameters and certificates for Cert. Provider 104c and Cert. Device 101c received in a message 213.

At step 103q' AUSF 103b can generate an ephemeral private key for a TLS session with device 101 comprising eSK.TLS.Network 103p and the parameters within Cert.Provider 104c. In other words, AUSF 103b can read the named elliptic curve and key length from Cert. Provider 104c received in message 213 and generate a private key for the named curve and key length in a step 103q'. The use and function of an ephemeral secret key eSK.TLS. Network 103q was also described above in FIG. 1. AUSF 103b can generate the corresponding public key ePK.TLS.Network 103n. A step 103q' could also be conducted after receiving a "client hello" message 218. AUSF 103b can then send device 101 an "EAP-TLS Start" message 215, which is also depicted as step 6 in Figure B.2.1.1-1 of 3GPP TS 133.501 version 15.1.0. Note that message 215 is sent to MNO 102 and MNO 102 can transmit message 215 through the radio resource connection established by device 101 in step 204 above. Where MNO 102 functions as a "pass through" entity for messages between network 103 and device 101, then the vertical line for MNO 102 in FIG. 2 is omitted.

Device 101 can receive the "EAP-TLS" start message 215 can conduct a series of steps in order to generate the "client hello" message. Although TLS version 1.3 according to IETF RFC 8446 is depicted in FIG. 2, subsequent and related version of a transport layer security protocol could be used as well between device 101 and an AUSF 103b operating in network 103. In a step 216, device 101 using processor 101p can select parameters for a subsequent "client hello" message 218 using the cryptographic parameters in the stored device provider certificate 104c associated with a device provider ID 104a used in the realm of a SUCI 101b transmitted by device 101 in a message 205. In this manner, the set of cryptographic parameters for a "client hello" message 218 and a "server hello" message 227 can be reasonably assured to be compatible before the "client hello" message 218 is transmitted by device 101. In other words, in exemplary embodiments, a device 101 can store a device provider certificate 104c before device 101 sends a message 205, including storing the device provider certificate 104c during a configuration of device 101 or a secure session for device 101 before device 101 sends a message 205.

The selected parameters in a step 216 can include at least a digital signature algorithm such as the elliptic curve digital signature algorithm as supported by TLS version 1.3 (or another TLS version for messages 218 and 227) and also a named elliptic curve supported by the TLS version in subsequent messages 218 and 227. In exemplary embodiments, the set of cryptographic parameters selected from stored device provider certificate Cert.Provider 104c can be a subset of cryptographic parameters 111 for device 101. Or, in some exemplary embodiments device 101 could select the entire set or a larger subset of cryptographic parameters 111 in a step 216 in order to generate a "client hello" message 218. The selected set of cryptographic parameters for device 101 in a step 216 can include data for extensions 217a below. Device 101 could also use cryptographic algorithms 101s with the selected parameters from a step 216 in order to generate a "client hello" message 218. Device 101 could also store first list of cryptographic algorithms 101s and a second list of cryptographic parameters 111 for device 101 and generate an extensions 217a using the first list and the second list.

In a step 101q', device 101 can generate device ephemeral private key eSK.TLS.Device 101q and the corresponding device ephemeral public key ePK.TLS.Device 101n using the selected set of cryptographic parameters from a step 216 above. The generation of ePK.TLS.Device 101n and eSK.TLS.Device $101q$ were also previously described above for device 101 in FIG. 1. Note that the ephemeral private and public key for device 101 and the ephemeral private and public key for network 103 can support post-quantum cryptographic algorithms, as specified by cryptographic algorithms and cryptographic parameters stored in the two nodes. At the conclusion of a step $101q'$, device 101 can conduct a step 217 in order to complete the processing or generation of the "client hello" message 218. The "client hello" message 218 generated in a step 217 can include a random number generated by device 101 using cryptographic algorithms $101s$, a list of cipher suites supported by device 101 such as a symmetric ciphering algorithm and a cipher block chaining mode, the identity or data for a key derivation function including a hash function, and the list of supported extensions 217a according to section 4.2 of IETF RFC 8446. In exemplary embodiments, the data for a "client hello" message 218 can be generated in a step 217 using the set of cryptographic algorithms $101s$ in device 101 and parameters $111a"$ from device provider certificate Cert.Provider 104c.

Device 101 can process extensions 217a, where the extensions 217a can either (i) omit a certificate_authorities extension or (ii) include at least a certificate authority specified by cert.provider 104c as stored by device 101 such as provider ID 104a as a supported certificate authority, or (iii) the identity for the root certificate issuer 105-2, where device 101 includes a root certificate cert.root 105c-1 as depicted in FIG. 1 above. For some exemplary embodiments, a device 101 can verify a subsequent certificate received from AUSF 103b and network 103 as cert.provider 104c by simply comparing if the received cert.provider 104c from AUSF 103b matches the cert.provider 104c stored in memory $101m$, as depicted in FIG. 1 above. The previous sentence pertains to verifying a received cert.provider 104c from AUSF 103b is trusted, and a device 101 would use the public key in cert provider 104c in order to verify a network certificate cert.network 103c from network 103.

In other words, the digital signature in a "CertificateVerify" segment within a TLS handshake with MNO 102 and AUSF 103b could be verified by a network certificate cert.network 103c, and a digital signature in cert.network 103c could be verified by the public key in cert.provider 104c. In this manner the verification through a certificate authority chain could be omitted in exemplary embodiments, thereby simplifying mutual authentication for device 101 and AUSF 103b/MNO 102. Note that device 101 may not have access to IP network 107 other than sending messages to SEAF 102b, and thus device 101 may not have the ability to verify a server certificate in the form of a network certificate 103c from AUSF 103b (different than device provider certificate 104c) that does not verify through an existing certificate or certificate authority previously stored in device 101, if the received certificate from AUSF 103b does not have a chain terminating with a stored root certificate 105a.

Note that Cert. Provider 104c and device certificate Cert.Device101c can be stored by device 101 before device 101 sends "client hello" message 218, and also in a manner under the control of device provider 104 (including during any of device configuration, device manufacturing, or device distribution), and thus device provider 104 can take steps when processing device provider certificate Cert. Provider 104c and device certificate Cert. Device 101c to ensure the specified cryptographic parameters within the certificates are compatible. Device provider certificate Cert. Provider 104c and device certificate Cert.Device101c can have compatible or equivalent sets of cryptographic parameters (such as specifying the same digital signature algorithm and mutually supported or equivalent named elliptic curves), and in this manner device 101 and AUSF 103b can be reasonably assured that (i) the negotiation and use of cryptographic parameters in TLS messages such as messages 218 and 227 will be compatible and (ii) the negotiation of a TLS handshake in messages 218 and 227 will be successful.

Device provider can select or specify for device 101 cryptographic parameters including extensions in section 4.2 of TLS version 1.3 for cryptographic algorithms $101s$ (such as during a device configuration step to load device 101 with the data depicted and described in FIG. 1). The selected or specified cryptographic parameters can be compatible with device provider certificate Cert.Provider 104c and device certificate Cert. Device 101c. In this manner, a TLS session can be reasonably assured to successfully be negotiated between device 101 and AUSF 103b before the series of steps and message flows depicted in FIG. 2, including a message 218, a message 227, and a message 233.

In other words, through the use of (i) device provider certificate Cert. Provider 104c for verifying a network certificate cert.network 103c for AUSF 103b (ii) cryptographic parameters $111a"$ supporting device provider certificate Cert.Provider 104c for AUSF 103b, a TLS session can be reasonably assured to be successful. This contrasts with conventional technology, where if AUSF 103b uses a network certificate that is not verified using Cert. Provider 104c stored in device 101 then the negotiation of the TLS session is more likely to fail from both (i) incompatible sets of cryptographic parameters or cryptographic algorithms, and (ii) the network certificate for AUSF 103b may not be able to be verified through a certificate chain in device 101 up to a stored root certificate Cert.CI-root 105c,-1 and (iii) device 101 may not have access to IP network 107 in order to obtain additional certificates that could verify a server certificate or network certificate cert.network 103c through a stored root certificate.

If a server or network certificate selected by AUSF 103b for use in a TLS session is verified by a certificate that is (i) not previously securely received and stored by device 101, and (ii) or verified through a certificate chain with a different root certificate than Cert. CI-root 105c stored by device 101, then device 101 may not be able to verify the sever certificate selected by AUSF 103b (different than Cert. Provider 104c stored by device 101). The potential issues for AUSF 103b to select a server certificate verified by a different certificate than device provider certificate Cert.Provider 104c stored by device 101 are compounded by the likely scenarios where (i) hundreds of different AUSF 103b may be used globally with different cryptographic parameters and cryptographic algorithms used for the server certificate and also (ii) server certificates with different verifying certificate chains up to different root certificates.

The steps and message flows depicted in FIG. 2 and subsequent figures herein, along with supporting data recorded as depicted in FIG. 1, provide a solution to the significant number of issues that can arise when an AUSF 103b uses a server certificate verified by a certificate different than device provider certificate Cert. Provider 104c. In summary, to solve the many potential issues and problems of an AUSF 103b using a server certificate verified by a certificate different than the device provider certificate Cert. Provider 104c stored by device 101, (i) the device 101 can store the device provider certificate Cert.Provider 104c before sending a SUCI 101b in a message 205, (ii) the AUSF 103b can conduct the subsequent series of steps to securely obtain a server certificate (also referred to herein as a "network certificate") which can be verified by the device provider certificate Cert. Provider 104c from a device provider 104 in a message 213 and stored in device 101, and (iii) the device 101 can use the device provider certificate Cert. Provider 104c to verify a server certificate Cert. Network 103c when conducting a TLS session with device 101 as depicted in FIG. 2.

Device 101 can then send the TLS "client hello" message 218 to MNO 102 and through SEAF 102b, where MNO 102 forwards the "client hello" message 218 to network 103 and AUSF 103b. The "client hello" message 218 through MNO 102 is also depicted as message 8 and 9 in Figure B.2.1.1-1 of 3GPP TS 133.501 version 15.1.0. A "client hello" message 218 can include a key share value of ePK.TLS.Device 101n, which is depicted in FIG. 2. A "client hello" message 218 can include additional data for a "client hello" message as described in section 4.1.2 of IETF RFC 8446, including the data processed by device 101 in 216 and 217, such as selected extensions 217a. As depicted in FIG. 2, message 218 can include supported certificate authorities 105-1 and 104a, an OSCP stapling request 108 for a server certificate from AUSF 103b, the supported parameters 111a for device 101, and a server name indication (SNI) 103a. In exemplary embodiments, the SNI 103a value in a message 218 is also the network ID 103a in a realm for a SUCI 101b or SUPI 101a.

Note that MNO 102 and SEAF 102b can include a Nausf_UEAuthentication_Authenticate Request value with the message 218a, such that AUSF 103b can determine which device 101 the "client hello" message 218 is associated with. In exemplary embodiments and also as supported by 3GPP TS 133.501 version 15.1.0, the Nausf_UEAuthentication_Authenticate Request received with message 218a by AUSF 103b can include the SUCI 101b. Message 218a from MNO 102 to network 103 can comprise message 218 from device 101 to MNO 102. As depicted in FIG. 2, the SEAF 102b can include the SUCI 101b with the "client hello" in message 218a sent to AUSF 103b that includes the "client hello" message 218 from device 101.

AUSF 103b can receive message 218a and conduct a series of steps to process the "client hello". AUSF 103b can conduct a verification 219a of the received ePK.TLS.Device 101n using the named curve specified by cryptographic parameters within the "client hello" message 218 within extensions 217a. The verification step can comprise verifying that the received public key is on the curve specified by the received cryptographic parameters, the public key value does not comprise the "point at infinity", etc. The verification step 219a can comprise the verification step within section 4.2.8.2 of IETF RFC 8446.

AUSF 103b or network 103 can then conduct a step 219b in order to select at least PK. Network 103e and PK.Params. Network 111a' from a network database 103d using SUCI 101b received along with the "client hello" from SEAF 102b. Thus, although device 101 may submit a plurality of different parameters 111a in a message 218, in exemplary embodiments network 103 and AUSF 103b can select a PK.network 103d for parameters 111a' from the parameters 111a' in a device provider certificate 104c received in message 213. As noted above in a step 214 for AUSF 103b, the AUSF 103b can previously store device provider certificate Cert. Provider 104c, device certificate Cert.Device 101c, SUPI 101a, and SUCI 101b for device 101 in network database 103d after receiving the message 213 above from device provider 104.

A step 219b can also comprise AUSF 103b also selecting the device certificate Cert.Device 101c from a network database 103d using the SUCI 101b received along with the "client hello" from SEAF 102b, although the device certificate Cert. Device 101c could be selected at a later time, such as after the receipt of a message 233 (such as if message 205 included a "null" value for a user identity of device 101θ). An AUSF 103b can use a step 219b to select a device provider certificate 104c from a network database 103d using the SUCI 101b from message 218a for conducting an EAP-TLS authentication. The selected device provider certificate 104c from a step 219b can comprise the certificate for verifying a server certificate Cert. Network 103c for AUSF 103b to use when conducting an EAP-TLS authentication with device 101, such as the generated Cert. Network 103c comprising the server certificate below in a "server hello" within message 227.

In exemplary embodiments, the provider ID 104a within the device provider certificate 104c selected from a step 219b can include the identity of a certificate authority for network 103 to use in extensions 219d for the subsequent "server hello" message 227 described below. In other words, both network 103 and device 101 can select a device provider certificate 104c with the certificate authority identity or name of provider ID 104a in order to successfully mutually authenticate. In this manner, device 101 and network 103 can be reasonably assured that (i) device 101 can verify the network certificate 103c selected by network 103 using the provider ID 104a as a certificate authority in extensions 217a, and (ii) network 103 can verify the device certificate 101c selected by the device 101 using the provider ID 104a as a certificate authority in extensions 219d.

At step 219b, AUSF 103b can also further process the "client hello" by taking the steps specified in IETF RFC 8446, such as generating a server random number, selecting extensions 219d according to section 4.2 of RFC 8446 based on a subset of extensions 217a received in the "client hello" message 218, generating a certificate request 219e according to section 4.3.2 of RFC 8446, etc. The certificate request 219e from a step 219c can comprise a request for device 101 to mutually authenticate with AUSF 103b using at least a device certificate 101c.

At step 219c', AUSF 103b can generate a certificate signing request (CSR) 219c for the selected PK. Network 103e from a step 219b above. In exemplary embodiments, for security and commercial reasons, a network 103 may prefer to securely record the secret key SK.network 103f, where corresponding public key can be included in a network certificate 103c. For these embodiments, then AUSF 103b can internally generate the digital signature for a certificate verify according to section 4.4.3 of RFC 8446. The CSR 219c from a step 219c' can support a signature request compatible with standards such as IETF RFC 2986 and related standards. The CSR 219c can be generated by AUSF 103b using either (i) the corresponding secret key SK.network 103f, or (ii) a different secret key for network 103 where device provider 104 can verify the CSR 219c with a digital signature for the CSR 219c and a different certificate than cert.network 103c for network 103.

In exemplary embodiments, the collection of steps 219a through 219c' can comprise a step 241 as depicted in FIG. 2. The CSR 219c can also be generated by AUSF 103b using a secret key corresponding to a public key stored in device provider 104, such that device provider 104 could verify the CSR 219c. The AUSF 103b could also trust the CSR 219c using the mutually authenticated secure session 202 used to send and receive the CSR 219c. The "certificate signing request" from network 103 for the selected server certificate/ server public key 103e could comprise a request as described in the Wikipedia article titled "Certificate Signing Request" from May 1, 2019, which is herein incorporated by reference in its entirety.

AUSF 103b can then send device provider 104 a message 220, where message 220 can include the CSR 219c for the selected PK.Network 103e and associated parameters 111a'. Message 220 can also include the device SUPI 101a, where SUPI 101a was derived from a SUCI 101b in a step 103j'. Message 220 can also include the SNI 103a used by network 103 in a system 200, and other standard information for a CSR can be included in a message 220 as well. Device provider 104 can receive the message 220 and conduct a series of steps in order to securely generate a network certificate Cert. Network 103c which can be verified by the device 101 both (i) using data recorded by device 101 and (ii) without requiring device 101 to have access to an IP network to receive and verify intermediate or parent certificates for verification of a Cert. Network 103c processed and generated by device provider 104. In some embodiments, the message 220 can include the provider ID 104a received in a message 218, such that device provider 104 can use the provider ID 104a in order to select a secret key SK.provider 104e in order to generate a digital signature 122 for the network certificate 103c.

For some exemplary embodiments, a message 220 can omit data from a message 218 or 218a, and network 103 could send device provider 104 the message 220 before sending a message 210 (and a device provider 104 could also conduct steps and send the message 223 described below before a message 210). In other words, a network 103 could send device provider 104 a request to generate a network certificate 103c after the establishment of a secure session 202. For these embodiments, network 103 could send a plurality of CSR 219c for a plurality of network public keys 103e before a device 101 communicates with the network 103. The network 103 could store the plurality of network certificates 103c in a network database 103d and select the network certificate 103c for use with the device 101 based on the SUPI 101a and also potentially the extensions 217a in a message 218. In other words, for some embodiments the network 103 does not need to send a message 220 to receive a network certificate 103c after receiving a message 218 and the network certificate 103c could be stored in a network database 103d before receiving the message 218.

At step 221, device provider 104 can verify the CSR 219c for the PK.network 103e. Device provider 104 can use the SUPI 101a to select a set of cryptographic parameters 111a", where cryptographic parameters 111a" correspond to the parameters used with a device provider secret key SK.provider 104e. In other words, a network public key PK.network 103e can use a first set of cryptographic parameters, and the device provider private key SK.provider 104e could use a second, different set of cryptographic parameters. A device provider could record multiple different values for SK.provider 104e with different sets of parameters. Different devices could also record multiple different sets of cryptographic parameters 111a, which could be stored in a device database 104d. Device provider 104 can conduct a step 221 to select parameters 111a" that can be used by device 101 to verify a network certificate Cert.Network 103c. Device provider could also use the provider ID 104a with a message 220, or query for a PK.provider 104ca or SK.provider 104e associated with device 101 using the SUPI 101a. Other possibilities exist as well for a device provider to use information received in a message 210 or message 220 in order to select a SK.provider 104e to create a certificate cert.network 103e without departing from the scope of the present disclosure.

Without a SUPI 101a or related information to identify the parameters supported by device 101 to verify a Cert. Network 103c in a message 220, a device provider 104 may not be able to determine which parameters 111a" and corresponding private key SK.provider 104e to use in order to generate a network certificate Cert. Network 103c in a manner that can be verified by device 101. Device provider 104 can use the SUPI 101a (or SUCI 101b) or provider ID 104a to select a SK.provider 104e with parameters 111a" that can be verified by device 103. For this embodiment, where device provider 104 can use the SUPI 101a to select an SK.provider 104e with parameters 111a" that can be verified by device 103, then network 103 could send a message 220 with a CSR 219c either (i) before the receipt of a TLS client hello message 218, or (ii) along with the SUPI 101a in a message 210. In other words, for the embodiment described in the previous sentence, network 103 could, before sending a message 215, conduct step 219c' to generate a CSR 219c, send the CSR to device provider 104, and receive the network certificate cert.network 103c.

Note that the CSR 219c could also be sent after a step 201, where network 103 could request at least one network certificate 103c for a network public key 103e. In a related embodiment, when network 103 derives a network public key 103e, then network 103 could automatically or programmatically (e.g. with conditions) send the derived network public key 103e in a CSR 219c to at least one device provider 104 in order to request and receive a network certificate 103c for the derived network public key 103e.

Or, in other embodiments, a network 103 could send the parameters 111a" for the device provider 104 to use with the CSR 219c to generate the network certificate Cert. Network 103c, where the parameters 111a" were included with the device provider certificate 104c for device 101 received by network 103 in a message 213. The parameters within a CSR 219c according to IETF standards specify the parameters 111a' for the public key, but do not specify the parameters for a PKI key pair for device provider 104 to use in order to generate the certificate cert.network 103c. Those parameters could be selected as parameters 111a" by device provider 101 in a step 221 using the message 220 (such as SUPI 101 a or parameters 111a" or provider ID 104a in the message 220).

Device provider 104 can then generate a digital signature 122 in a step 122' using the selected device provider private key SK.provider 104e and parameters 111a". The digital signature 122 can be included in the network certificate Cert. Network 103c. Device provider 104 can generate or create the network certificate Cert. Network 103c in a step 122'. In a step 222, device provider 104 can then also generate OSCP stapling 222a for the Cert. Network 103c through the certificate chain 104f recorded by device 101. Device provider 104 could determine or select the certificate chain 104f using identification information in a message 220 or message 210 such as the device SUPI 101a or provider ID 104a. OSCP stapling 222a from a step 222 can include previous OSCP stapling 212a for device provider certificate 104c, but with the addition of a timestamp signature for Cert. Network 103c with device provider secret key SK.provider 104e. In other words, OSCP stapling 212a can be a subset of OSCP stapling 222a, where OSCP stapling 222a adds an OSCP signature for the Cert. Network 103c.

OSCP stapling 222a by device provider 104 instead of network 103 can ensure that device 101 can verify the OSCP stapling 222a and reasonably confirm certificates in the verification chain for Cert.network 103c have not been revoked, since device provider 104 can record the full chain of certificates and several private keys for the corresponding public keys in the certificate chain stored by device 101. A network 103 may not know or record the parent certificates or private keys required for device 101 to verify an OSCP stapling 222a (where a device provider 104 can know the data since device provider 104 controlled the device 101 before connecting with network 103 and record the data in a device database 104d). Thus in exemplary embodiments a device provider 104 generates OSCP stapling 222a for the Cert.network 103c in a step 222.

Device provider 104 can then send network 103 a message 223 with the generated Cert. Network 103, SUPI 101a, and OSCP stapling 222a. The inclusion of SUPI 101a with message 223 can indicate or signal to network 103 which device 101 the network certificate Cert.network 103c can be used with. For some embodiments, a Cert.network 103c can be used with an entire realm of a group of devices 101, and for these embodiments, the Cert.network 103c could be used with devices that include network ID 103a in the realm of a NAI for a device identity such as SUPI 101a. For these embodiments, a SUPI 101a for a particular device could be omitted, and the network identity 103a could be in the Cert. Network 103c as a server name indication. As contemplated herein, the certificate 103c received in a message 223 could also include a unique certificate identity for the certificate 103c, such that network 103 can identify the network certificate cert.network 103c using the unique certificate identity. The identity of the network certificate cert.network 103c could be used by network 103 for all messages 218 or 218a with a provider ID 104a.

AUSF 103b can receive message 223 with the network certificate 103c and conduct steps to generate a "server hello" response for the received "client hello" from device 101. In step 224a, AUSF 103b could verify the network certificate Cert. Network 103c from device provider 104 using the device provide certificate Cert. Provider 104c. In a step 224a, AUSF 103b could store the network certificate Cert. Network 103c in a network database 103d, along with a SUPI 101a for device 101, for embodiments where the message 223 includes the SUPI 101a for device 101. At step 224b, AUSF 103b could can generate a digital signature 224c comprising a "CertificateVerify" for the data processed in a steps 219a and 219b using the secret key SK.network 103f corresponding to the public key in Cert. Network 103c (PK.Network 103e). The digital signature 224c could also use the cryptographic parameters 111a' specified in Cert. Network 103c for the PK.Network 103e. The digital signature 224c processed in a step 224b can comprise a "Certificate Verify" 224c and support TLS 1.3, DTLS 1.3. "CertificateVerify" 224c can be over the data processed by AUSF 103b for a "server hello" message (e.g. at least "key share" 103n, which comprises ePK.TLS.Network 103n, Extensions 219d, CertificateRequest 219e, and network certificate cert-.network 103c). "CertificateVerify" in FIG. 2 and as described herein can comprise a "Certificate Verify" according to section 4.4.3 of RFC 8446, and other possibilities exist as well.

At step 225, AUSF 103b can conduct an ECDH key exchange with device ephemeral public key ePK.TLS.Device 101n received in message 218 and server ephemeral private key eSK.TLS.Network 103q derived in a step 103q' in order to mutually derive shared secret 225a and then derive a symmetric ciphering key 225b and an associated MAC key. A step 225 can follow the steps and procedures as specified by section 7 of RFC 8446 for the shared secret 225a and then deriving the symmetric ciphering key 225b, although other possibilities exist as well for the derivation of a shared secret key 225a and a symmetric ciphering key 225b without departing from the scope of the present disclosure. As supported by section 7 of RFC 8446, (i) a first portion of a symmetric ciphering key 225b and an associated MAC key for encryption by AUSF 103b and decryption by device 101 can be different than (ii) a second portion of a symmetric ciphering key 225a and an associated MAC key for decryption by AUSF 103b and encryption by device 101. However, both device 101 and AUSF 103b can conduct a step 225 in order to derive both the first and second portions of a symmetric ciphering key 225b.

At step 225, AUSF 103b can derive a shared secret 225a with device 101 as a point with x and y coordinates, where the device ephemeral public key is raised to the power of the scalar ephemeral private key with a modulus according to the named curve to for the PKI keys in cryptographic parameters associated with the keys and also in extensions 219d selected in a step 219b. The x coordinate of the resulting point can comprise a shared secret 225a. AUSF 103b or network 103 could store the derived shared secret 225a and the symmetric ciphering key 225b from a step 225 in a network database 103d as depicted in FIG. 3 below, along with the SUCI 101b received in a message 218 and/or the combination of SUCI 101b and SUPI 101a received in a message 213. The symmetric key 225b and the associated MAC key can be derived from the shared secret 225a using a key derivation function (KDF) or a secure hash algorithm mutually shared with device 101. The KDF and secure hash algorithm could be specified and shared between device 101 and AUSF 103b in extensions 217b and extensions 219d, such as a secure hash algorithm of SHA-256, SHA-384, etc. Parameters for a KDF or secure hash algorithm could be included in cryptographic parameters 111, which are also depicted and described in connection with FIG. 4b.

Device 101 can take equivalent steps with the corresponding keys as used by AUSF 103b in order to derive the shared secret 225a and the symmetric key 225b and an associated MAC key, which is also described in section 7 of IETF RFC 8446. At step 226, AUSF 103c can complete the processing of a "server hello" message according to RFC 8446 by encrypting the values Extensions 219d, CertificateRequest 219e, Certificate 103c, OSCP stapling 222a (from message 223), and Certificate Verify 224c with the symmetric ciphering key 225b derived in a step 225.

Other data could be included in a "server hello" message as well without departing from the scope of the present invention. Although Annex B of 3GPP TS 133.501 version 15.1.0 describes the use of TLS version 1.2, a MNO 102 and SEAF 102b and AUSF 103b in a system 200 could support the use of TLS version 1.3. Or, the sequence of steps and messages in FIG. 2 for a system 200 could be adjusted to support TLS version 1.2 without departing from the scope of the present disclosure. Further, future versions of EAP-TLS authentication for 5G networks, WiFi networks, and 3GPP networks could support TLS version 1.3, where the future versions could be compatible with the steps and message flows depicted for a system 200 in FIG. 2 and other systems and Figures herein.

AUSF 103b can then send through MNO 102 the "server hello" message 227. Note that AUSF 103 can insert or add the SUCI 101b for device 101 external to the "server hello" message 227, such that SEAF 102b and MNO 102 can send the "server hello" message 227 to the correct device 101. In other words, MNO 102 can use the SUCI 101b as external to the "server hello" message 227 in order to route the message 227 to device 101 through base stations and at least one gnodeb with a radio 102r. The data within a "server hello" message is depicted in FIG. 2 and also described above with a step 226. The bracket values of "{" and "}" in for message 227 and other messages or data depicted in Figures herein depict that the ciphertext data is encrypted with the derived symmetric ciphering key, such as key 225b from a step 225 and also verified with a MAC code using a MAC key from a step 225. The key 225b and other symmetric ciphering keys are not sent along with the encrypted data. As described above in a step 219b for network 103 to select a device provider certificate 104c, the message 227 in FIG. 2 can include the provider ID 104a as a certificate authority for network 103, and device 101 can use the provider ID 104a in order to select the device certificate 101c when responding to message 227.

Device 101 can receive the "server hello" message 227 and take steps in order to process the message. At step 219a, device 101 can verify the received ephemeral public key using the same steps as a step 219a for AUSF 103b above, which can also comprise the verification step 4.2.8.2 in RFC 8446. At step 228, device 101 can conduct and ECDH key exchange with device ephemeral private key eSK.TLS.Device 101q and server ephemeral public key ePK.TLS.Network 103n derived in a step 103q' in order to mutually derive a symmetric ciphering key and a MAC key.

A step 228 can follow the steps and procedures as specified by section 7.4 of RFC 8446. At step 228, device 101 can derive a shared secret with AUSF 103b as a point with x and y coordinates, where the network/server ephemeral public key 103n is raised to the power of the scalar device ephemeral private key with a modulus according to the named curve to for the PKI keys. The x coordinate of the resulting point can comprise a shared secret 225a. The symmetric key 225b and the MAC key can be derived from the shared secret 225a using a secure hash function and a key derivation function. A step 228 can also comprise device 101 decrypting the ciphertext data from a message 227 using the derived symmetric ciphering key 225b and verifying message 227 integrity with the MAC code and the MAC key derived in step 228.

A step 229 can comprise device 101 verifying the digital signature in the digital signature for "CertificateVerify" 224c using the public key and parameters in network certificate 103c in order to confirm the digital signature is correct. Device 101 could confirm the received value for "Certificate Verify" 224c matches a calculated value for "CertificateVerify" 224c. The message or data input into the digital signature algorithm can comprise the data key_share 103n, Extensions 219d, CertificateRequest 219e, Certificate 103c, and OSCP stapling 222a, and also follow the steps for certificate verification in RFC 8446. Other possibilities exist as well for the steps to verify a digital signature of a "CertificateVerify" 222a using the public key in a device provider certificate 104c without departing from the scope of the present disclosure.

A step 230 can comprise device 101 verifying that the received network certificate 103c with the stored device provider certificate 104c. The network certificate 103c can include a digital signature 122 created using the device provider private key SK.provider 104e. The digital signature 122 could be created in the step 122' above in FIG. 2. Device 101 could confirm the received value for digital signature 122 in network certificate 103c matches a calculated value for digital signature 122 using the stored value of device provider public key PK.provider 104ca in a stored device provider certificate 104c. Note that the use of the stored device provider certificate 104c for verification of the received network certificate 103c solves an important need in the art described above. Device 101 may prefer to not use a generally trusted root certificate, such as a root certificate for "Let's Encrypt", to verify the network certificate 103c, since essentially any network 103 (including potentially malicious networks) could obtain a valid certificate from "Let's Encrypt". Or in other embodiments, a device 101 in a step 203 can verify that a network name 103a within a network certificate 103c matches the network name 103a sent as a realm with a SUCI 101b. In this manner, valid certificates from networks that do not use the network name 103a would not be used by device 101 to verify a network certificate 103c.

For embodiments where network certificate 103c contains a signature from a certificate authority or for a public key not previously securely stored by device 101, then device 101 can conduct a series of steps to verify the received network certificate 103c up through at least one recorded and securely received certificate within device 101, such as a root certificate Cert. CI-root 105c-1. Note that in some embodiments, the sequence of steps 229 and 230 could be switched, and the order of other steps depicted as contemplated herein could be adjusted without departing from the scope of the present invention. In addition, a step 230 can comprise device 101 verifying an OSCP stapling 222a, such that device 101 could confirm that parent certificates for network certificate 103c has not been revoked and also that network certificate 103c has not been revoked. In exemplary embodiments, OSCP stapling 222a is through the previously recorded intermediate certificates 104f stored by device 101. Device provider 104 (i) could know that device 101 stores certificates 104f and thus (ii) generate OSCP stapling 222a for network certificate 103c in a manner that device 101 could verify the signatures in OSCP stapling 222a without device 101 accessing any external server for the verification of OSCP stapling 222a.

In exemplary embodiments, device 101 can use a timestamp value from MNO 102 in a system information block (SIB) received via radio 101r in order to acquire a current time value for verifying the time and date validity of signatures within OSCP stapling 222a. In other words, device 101 may need accurate time to verify stored or received certificates for device 101 have not been revoked using OSCP stapling 222a. The accurate time could be acquired via a mobile network system information block containing a current date+time value. OSCP stapling 222a can include expiration times after the creation of digital signatures within OSCP stapling 222a, and device 101 can use the time broadcast by a wireless network to determine the current time, and then compare the current time with the expiration times within OSCP 222a and confirm that the current time is not after any expiration time within OSCP 222a. Device 101 could determine a current date and time value for verifying OSCP stapling 222a via other means as well, such as device 101 operating an internal clock with long-term stability or accuracy. The use of time from SIB information received via radio 101r also addresses a need in the art, where the device 101 may not normally be able to access time servers on the Internet 107 to acquire current and authenticated time values until after device 101 successfully authenticates with a network 103.

Note that the system 200 depicted in FIG. 2 can avoid the requirement that device 101 needs to verify OSCP stapling 222a, for embodiments where device provider 104 creates digital signature 122 in network certificate 103c. The presence of a digital signature 122 can confirm the certificate cert.network 103c is valid for device 101. If the cert.network 103c was revoked or otherwise invalid (such as network 103 is not authorized for device 101), then device provider 104 and/or AUSF 103b could decline to provide a valid digital signature 122 to device 101 in a network certificate cert-.network 103c. If another party than network 103 obtained the secret key SK.network 103c, the party would not feasibly be able to generate the digital signature 122. In some exemplary embodiments, device 101 could store all previously used PK.network 103e and verify that PK.network 103e is not reused and the PK.network 103e in a certificate cert.network 103c is new and requires a new, unique, and different digital signature 122.

At step 231, device 101 can select a device certificate 101c that is compatible with the parameters received within message 228, such as with extensions 219d. A device 101 could record a plurality of different device certificates 101c in a database 101k, such as supporting different cryptographic parameters for digital signature algorithms and also different certificate authorities. Device 101 could use the data for extensions 219d, such as a certificate authority specified in extensions 219d and comprising the provider ID 104a in message 227, in order to select device certificate 101c. In some exemplary embodiments, the certificate authority for device certificate 101c can be device provider 104, and the certificate authority in extensions 219d can be the provider ID 104a.

Using a certificate authority identified by provider ID 104a in extensions 219d in message 227, the device certificate 101c could be verified by either (i) the device provider certificate 104c, or (ii) an intermediate certificate for device provider 104 such as the device provider certificate issuer public key in Cert. Provider-CI 104f. In other words, in exemplary embodiments device 101 selects a device certificate 101c in a step 231 where the signature authority for device certificate 101c is the device provider 104. The device provider 104 may operate an intermediate certificate issuer such as 104f. Or, in other embodiments, device 101 could record a certificate 101c and AUSF 101c can verify the certificate 101c by comparing the certificate 101c received from device 101 with the certificate 101c received from device provider 104 through the secure session 202.

At step 232, device 101 can generate a digital signature for a "Certificate Verify" 232a over at least the selected device certificate 101c with the private key SK.Device 101d for the selected device certificate 101c using the parameters from extensions 219d in message 227. The private key SK.Device 101d is depicted and described above in connection with FIG. 1. Device 101 could follow the steps for generating a "Certificate Verify" in section 4.4.3 of RFC 8446, and other possibilities exist as well without departing from the scope of the present disclosure. A step 232 can include device 101 encrypting the device certificate 101c and the "Certificate Verify" 232a into a ciphertext with the symmetric ciphering key 225b derived in a step 228 above, as well as generating a MAC code using the derived MAC key. As depicted in FIG. 2, the collection of steps for step 219a through 232 by device 101 can comprise a step 243.

Device 101 can then MNO 102 a message 233, where message 233 includes the ciphertext from a step 232 with the encrypted device certificate 101c and the encrypted digital signature of "Certificate Verify" 232a. Note that MNO 102 can use the radio resource connection of device 101 in order to track or identify device 101, and MNO 102 using SEAF 102b can append the SUCI 101b originally sent by device 101 in a message 205 to the message 233, equivalent to MNO 102 or SEAF 102b adding SUCI 101b to message 218 above. In other words, MNO 102 can track the radio resource connection used by device 101 in order to (i) append or add SUCI 101b to message 218 (e.g. message 218a received by AUSF 103b) (ii) append or add SUCI 101b to message 233 received by AUSF 103b. In other words, AUSF 103b can receive the message 233 with the SUCI 101b added, although device 101 may not add SUCI 101b to message 233. Or, in some exemplary embodiments device 101 can add SUCI 101b to both message 218 and message 233. As described below, AUSF 103b can use a network database 103d to record data for sessions with device 101, such as the SUCI 101b and the device provider certificate 104c as well as the server ephemeral private key eSK.TL-S.Network 103q and symmetric ciphering key 225b associated with a device 101 and TLS messages. As depicted for a network database 103d in FIG. 3 below, a network 103 could also store the derived symmetric ciphering key 225b from a step 225, and MAC key as well (although a MAC key in database 103d is not depicted), in order to select symmetric ciphering key 225b using the SUCI 101b from MNO 102 and decrypt the ciphertext in a message 233. A network 103 and AUSF 103b could use other information from a message 233 as well, such as a source IP address and port number in order to associate the messages 233 and 218 with a particular device 101.

In exemplary embodiments, the network certificate 103c received from device provider 104 by AUSF 103c can function as the server certificate for AUSF 103b with device 101. AUSF 103b can use a plurality of different server certificates with a plurality of different devices, and the proper certificate for AUSF 103b to use could be tracked in a network database 103d and selected for a device 101 from messages via MNO 102 using the SUCI 101b added to the messages by MNO 102.

In a step 234, AUSF 103b can use the selected (x) symmetric key 225b from a network database 103d for (y) SUCI 101b received in a message 233 from MNO 102 (or a source IP: port number in message 233) in order to decrypt the ciphertext included in message 233. The plaintext values from a message 233 can comprise the device certificate 101c and the "CertificateVerify" 232a. "CertificateVerify" 232a can comprise a digital signature from device 101 over the plaintext data within message 233 (but potentially excluding the digital signature for "CertificateVerify" 232a). Note that the plaintext data in a message 233 could also include application data 405 as depicted and described in connection with FIG. 4a below. At step 234, AUSF 103b can compare that received device certificate 101c from device 101 is the same as the received device certificate from device provider 104 in a message 213 above.

AUSF 103b can trust or verify the received device certificate 101c from device 101 if the received device certificate 101c from device 101 in a message 233 is the same as the device certificate 101c received from device provider 104, such as in a message 213 via secure session 202. Or, if the received device certificate 101c from device 101 is not the same as 101c from device provider 104 (or AUSF 103b does not have a 101c from device provider 104), then AUSF 103b can verify cert.device 101c through a certificate chain up to a securely recorded certificate in AUSF 103b such as a root certificate Cert. CI-root 105c-1. Network 103 can also verify that a SUPI 101a or a device identity for device 101 in the device certificate cert.device 101c is the same as a SUPI 101a calculated or determined in a step 103j' above.

In exemplary embodiments, a device 101 may not have full access to an IP network 107 to communicate with other servers than for MNO 102 and network 103 until after the successful completion of an EAP-TLS authentication. Thus, device 101 may not be able to generate OSCP stapling (from communication with other servers than MNO 102 and network 103) in order to reasonably prove that device certificate cert.device 101c has not been revoked. By network 103 also receiving the device certificate cert.device 101c from a device provider 104 in a message 213, then network 103 can trust that the device certificate cert.device 101c has not been revoked. Or, in a step 234, network 103 and AUSF 103b could query device provider 104 or the certificate authority for device certificate 101c for the revocation status of device certificate 101c. In some exemplary embodiments, device provider 104 could also maintain a certificate revocation list for device certificate 101c for a plurality of devices 101 and a network 103 could query the certificate revocation list over a secure session 202.

Although a message 213 from device provider 104 with the device certificate 104c is depicted in FIG. 2 as before the receipt of a message 233, in some exemplary embodiments a message 213 with device certificate cert.device 101c from device provider 104 could be after network 103 receives the message 233. In either case (device provider 104 sends network 103 the device certificate 101c before or after a message 233), a device provider 104 could effectively "revoke" a device certificate 101c by not sending the device certificate 101c to the network 103 in a system 100, system 200, and other systems herein. In other words, the authorization that device certificate 101c remains valid (since OSCP stapling may not be available due to the lack of general Internet access to device 101 until after EAP-TLS authentication is complete) can be confirmed for network 103 by network 103 also separately receiving the device certificate cert.device 101c from a device provider 104, such as in a message 213.

Thus, the technology described herein solves a need in the art for a network 103 and AUSF 103b to check or verify that (i) a device certificate 101c has not been revoked (even though a revoked device certificate 101c may properly be verified through a parent certificate chain such as through device provider certificate 104c) and (ii) the device certificate 101c is valid. The comparison by network 103 of a device certificate 101c received from a device 101 with the device certificate 101c from a device provider can confirm the device certificate 101c is valid (if the two device certificates 101c are the same), without requiring a network 103 to conduct the full set of digital signature verifications through parent certificates for device certificate 101c through a stored certificate such as a root certificate 105c-1. Network 103 could also securely receive a root certificate 105c-1 used with device certificates 101c from device provider 104 via the secure session 202. As mentioned above, the sending of device certificate 101c by device provider 104 to network 103 could comprise a signal or indication that the device certificate 101c has not been revoked.

At step 235, AUSF 103b can verify the digital signature value for "CertificateVerify" 232a using the device public key in cert.device 101c as well as the signature parameters in cert.device 101c. AUSF 103b can confirm the received value for "CertificateVerify" 232a matches an internally calculated value for "Certificate Verify" 232a. After successful device authentication in a step 235, AUSF 103b can conduct a step 236 in order to generate an anchor key for SEAF 102b and MNO 102. With EAP-TLS authentication between device 101 and AUSF 103b, the AUSF 103b and device 101 can mutually derive a key Kausf using the steps described in Annex B, section B.3 titled "Key Derivation" for 3GPP TS 133.501 version 15.1.0. AUSF 103b can conduct the steps to derive Kauf in a step 236. Although section B.3 describes the derivation of a Kausf in the context of EAP-TLS authentication using TLS version 1.2 with IETF RFC 5216, the equivalent steps can be conducted with a future version of EAP-TLS authentication for 5G standards supporting TLS version 1.3.

In summary, the successful handshake of messages 218, 227, and/or 233 can be used in a step 236 to derive a TLS mater secret as described in section 7.1 of RFC 8446. Data input into the derivation of a TLS master secret for AUSF 103b can comprise the shared secret 225a derived in a step 225 and at least a portion of the plaintext values for data transmitted in message 218 and 227. The shared secret 225a derived in a step 225 and the plaintext values for data transmitted in message 218 and 227 can be input in a step 236 into a key derivation function in order to derive a TLS master secret for AUSF 103b. In exemplary embodiments, data input in the derivation of a TLS master secret can include at least the shared secret 225a, the device ephemeral public key ePK.TLS.Device 101n sent in a message 218, the network certificate 103c from a message 227, and the network ephemeral public key ePK.TLS.Network 103n from a message 227. Additional data communicated in messages 218, 227, and 233 could be included in the derivation of a TLS master secret. Thus, the TLS master secret and a resulting anchor key can also use data input from a "client finished" 233 message. The TLS master secret can be used to derive an anchor key, as described below.

According the EAP-TLS authentication for RFC 5246, the derived TLS master secret can be input into a key derivation function such as described in section 2.3 titled "Key Hierarchy" of RFC 5246 in order to generate both a master session key (MSK) and an extended master session key (EMSK) 236b. For some exemplary embodiments, the extended master session key 236b can comprise a length of 512 bits. For exemplary embodiments, including those supporting 3GPP TS 133.501 version 15.1.0, the first 256 bits of the EMSK 236b can be taken as the value for Kausf in a step 236 in order to select an anchor key 236a which could comprise Kausf. Note that (i) future versions of EAP-TLS authentication that explicitly support TLS version 1.3 can also derive a value of EMSK 236b from the TLS master secret as described in section 7.1 of RFC 8446, and (ii) future versions of 3GPP TS 133.501 can specify the derivation of Kausf from the EMSK 236b.

In exemplary embodiments, a step 236 can comprise (i) AUSF 103b mutually deriving a TLS master secret according to RFC 8446 with device 101 (and also using the data described two paragraphs above), and then (ii) AUSF 103b mutually deriving with device 101 an anchor key such as Kausf using the mutually derived TLS master secret. An intermediate step between (i) and (ii) for both AUSF 103b and device 101 can be deriving an EMSK 236b according to IETF EAP-TLS standards, where the Kausf or anchor key is derived from the EMSK 236b. Other possibilities for AUSF 103b to mutually derive a shared secret key (different than key 225a, but using at least shared secret 225a) in a step 236 using data from a TLS session such as the keys and values within messages 218, 227, and/or 233 are possible as well without departing from the scope of the present invention.

After a step 236, AUSF 103b can send MNO 102 and SEAF 102b a message 237 through secure session 201, where message 237 can include both the mutually derived (between AUSF 103b and device 101) anchor key 236a, which could comprise a Kausf, and a device identity such as the value of SUPI 101*a*. Note that anchor key 236*a* can comprise a derived shared secret key that is mutually derived between AUSF 103*b* and device 101, and a different name than an "anchor key" of "Kasuf" could be used to describe the key 236*a*, such as a shared secret, a derived shared secret, a shared secret key, etc. In some embodiments, the AUSF 103*b* can derive the anchor key 236*a* as a key Kausf, and the AUSF can subsequently use the steps specified in ETSI TS 133.501 with the Kausf to generate a key Kseaf, and the AUSF 103*b* can send the SEAF 102*b* the Kseaf as the anchor key 236*a*.

Or, in some exemplary embodiments an AUSF 103*b* could send the TLS master secret or EMSK 236*b* in a message 237, and an SEAF 102*b* could derive anchor key 236*a* from the TLS master secret or EMSK 236*b* received in a message 237. The SEAF 102*b* can receive message 237 and conduct a step 238 in order to process the message. In a step 238, SEAF 102*b* can conduct additional key derivations using the anchor key 236*a* such as Kasuf in order to derive an associated key set 238*a* Kseaf, Kamf, Kgnb, etc., as specified in 3GPP TS 133.501.

As depicted in FIG. 2, device 101 in a step 239 can conduct the equivalent steps as AUSF 103*b* in a step 236 in order to mutually derive a shared secret key such as an anchor key 236*a* or Kausf using at least the TLS master secret. Note that 5G standards may refer to the anchor key 236*a* as Kseaf, which can be directly calculated from a value for key Kausf. In exemplary embodiments, either the key Kausf or Kseaf herein resulting from the TLS master secret can be referred to as an anchor key. In addition, a first anchor key as Kausf can be used to derive a second anchor key Kseaf. A network 103 can send an anchor key to the SEAF, where the anchor key is generates using the TLS master secret. A device 101 can internally both (i) calculate the TLS master secret, then (ii) use the TLS master secret to calculate a Kausf, and then (ii) use the Kausf to calculate the Kseaf. The steps for calculating a Kausf and Kseaf can be specified in 3GPP TS 133.501.

Device 101 can use the steps specified in section 7.1 of TLS version 1.3 RFC 8446 in order to derive the TLS master secret. Data input into the derivation of a TLS master secret for device 101 can comprise the shared secret 225*a* derived in a step 228 and the plaintext values for data transmitted in message 218 and 227 (e.g. after decryption of a message 227). The shared secret 225*a* derived in a step 228 and the plaintext values for data transmitted in message 218 and 227 can be input into a key derivation function in order to derive a TLS master secret for device 101. The key derivation function can comprise a secure hash algorithm and also be referred to as a hash-based key derivation function (HKDF). Device 101 could take additional steps equivalent to those described in a step 236 above for an AUSF 103*b* to derive an EMSK 236*b* using at least derived TLS master secret. In exemplary embodiments, data input in the derivation of a TLS master secret can include at least the shared secret 225*a*, the device ephemeral public key ePK.TLS.Device 101*n* sent in a message 218, the network certificate 103*c* from a message 227, and the network ephemeral public key ePK.TLS.Network 103*n* from a message 227. Additional data communicated in messages 218, 227, and 233 could be included in the derivation of a TLS master secret. Thus, the TLS master secret and a resulting anchor key can also use data input from a "client finished" 233 message. The TLS master secret can be used to derive an anchor key for device 101, as described below.

Corresponding to a step 236 for AUSF 103*b* above for a network 103, a device 101 could derive an anchor key 236*a*, such as Kausf and then Kseaf, from the EMSK 236*b* using standards specified for EAP-TLS authentication and/or 3GPP standards for 5G networks. A step 239 for device 101 can also comprise device 101 deriving an associated key set 239*a* using a derived Kausf from the TLS master secret for communication with MNO 102, such as a Kseaf, Kamf, Kgnb, etc. as specified in 3GPP TS 133.501.

After (i) a step 239 by device 101 to derive a shared secret key such as Kausf and related keys such as those specified in 3GPP TS 133.501 and (ii) a step 238 by MNO 102 with SEAF 102*b* to also use the shared secret such as Kausf or an anchor key received in a message 237 to derive related keys such as those specified in 3GPP TS 133.501, then device 101 and MNO 102 can exchange encrypted and integrity protected messages in RF communications 240. RF communications 240 can be conducted with keys 239*a* derived by device 101 in a step 239 and keys 238*a* derived from an anchor key by SEAF 102*b* in a step 238. Note that device 101 could derive a first key for encryption and a second key for decryption using the TLS master secret and network 103 or MNO 102 could derive the first key for decryption and the second key for encryption using the TLS master secret.

The steps for encrypting messages and also conducting integrity checks of messages in communications 240 can also be specified in 3GPP TS 133.501 and related standards. In addition, for embodiments where MNO 102 and device 101 use an 802.11 network instead of a 5G network, then device 101 and MNO 102 could use a least a portion of an EMSK 236*b* (derived from TLS master secret) in order to derive related encryption and integrity protection keys in order to support the 802.11 network between device 101 and MNO 102. In summary, the encryption and integrity protection of messages in communications 240 are with keys derived from the TLS master secret, where the derivation of the TLS master secret is depicted and described above in a step 236 for AUSF 103*b* and a step 239 for device 101. In addition, the encryption and integrity protection of messages in communications 240 are with keys derived from shared secret 225*a* in a step 225 by AUSF 103*b* and the same shared secret 225*a* in a step 228 by device 101, since the TLS master secret for both nodes uses the shared secret 225*a* and data available to both device 101 and AUSF 103*b* such as the plaintext data in messages 218 and 227.

Note that the message 218 can include a random number generated by device 101 and the message 227 can include a random number generated by AUSF 103*b*, where the random numbers are also used in the derivation of the TLS master secret. In this manner, and by (i) including the random number generated by device 101 a message 218 and the random number generated by AUSF 103*b* in a message 227, and (ii) by including the data from a message 218 and a message 227 in the derivation of a TLS master secret, additional entropy or random values can be used by AUSF 103*b* and device 101 in addition to secret 225*a* for the derivation of a TLS master secret. As described above, the TLS master secret can be used to derive a shared secret or an anchor key 226*a* for device 101 and AUSF 103*b* and MNO 102 to use in subsequent communications such as a connection for messages 240. In other words, at least a first random number within a "client hello" message 218 and a second random number within a "server hello" message 227, along with the shared secret 225*a* can be used by device 101 and AUSF 103*b* to derive a shared secret for subsequent communications 240, where the shared secret can comprise an anchor key 236*a*. For 802.11 networks between device 101 and MNO 102, the shared secret can comprise at least a portion of EMSK 236*b*.

For some exemplary embodiments, the wireless networking technology supported by MNO 102 can comprise WiFi networking supporting IEEE 802.11 standards. For these embodiments, the anchor key 236a sent in a message 237 through secure session 201 to MNO 102 can comprise any of (i) the shared secret key 225a, (ii) the TLS master secret derived in a step 236, and/or (iii) the value of EMSK 236b or an MSK value. In other words, when supporting WiFi networking for EAP-TLS authentication for device 101 and MNO 102, network 103 could send a mutually derived anchor key 236a that is different than a Kasuf as contemplated by 5G standards in 3GPP TS 133.501. Other possibilities exist as well for the structure or contents of a mutually derived anchor key 236a sent in a message 237 from network 103 to wireless network 102 without departing from the scope of the present invention.

Further, when supporting 802.11 wireless networks for device 101 and MNO 101, the use of a SUCI according to 3GPP TS 133.501 can be optional, and the device identity as received by network 103 in a message 205 can comprise a SUPI 101a without encryption and also without the device ephemeral public key ePK.ECIES.Device 101h. In exemplary embodiments supporting 802.11 networks and supporting an EAP-TLS authentication based on TLS v. 1.3 standards, the message 205 can include a realm portion of a device identity but omit the user portion of a device identity, and the device identity can be transmitted in an encrypted format within the device certificate 101c within a "finished" message 233.

FIG. 3

FIG. 3 is an illustration of a device database and a network database with exemplary data stored, in accordance with exemplary embodiments. A device provider 104 could store and operate a device database 104d as depicted and described in connection with FIG. 1. Network 103 could store and operate a network database 104d in connection with FIG. 1. The device database 104d or network database 104d could be recorded in a server or collection of servers securely connected to device provider 104 or network 103, respectively. Each database could operate using software such as Oracle, Microsoft SQL Server, MySQL, and other possibilities exist for a database without departing from the scope of the present disclosure.

Although both a device database 104d and network database 103d depict multiple values, strings, or numbers stored in each column and row, some values could be omitted at certain points in time, such as the data not being available at a point in time, although the omitted data could be provided or available later. For example, with a network database 103d, upon receipt of a message 205 with a new SUCI 101b not previously stored in a network database 103d, network 103 could insert a new row into a network database 103d with SUCI 101b entered and the other data empty, until later received in later messages such as message 213 from device provider. Both device database 104d and network database 103d can be encrypted with a symmetric ciphering key such that the data is stored in physical memory as ciphertext.

Values depicted in FIG. 3 with different numeral designations such as "-1", "-2", "-3", etc. can represent different numbers or strings for the depicted value such as SUPI 101a. Values depicted in FIG. 3 with the same numeral designation such as the first two rows of Provider ID 104a in a device database 104d being "104a-1", and then "104a-1" can represent that the number or string for provider ID 104a is the same for each of the devices in the first three rows. Values depicted in FIG. 3 with different numeral designation such as rows three through five of Provider ID 104a in a device database 104d being "104a-2", then "104a-2", then "104a-2" can represent that the number or string for provider ID 104a is different than each of the devices in the first three rows, which are depicted with a designation being "104a-1".

Device database 104d can record data for a plurality of devices 101 which could be managed or supported by device provider 104. A device database 104 could store values, numbers, or strings for a device number or index, a user name for a network access identifier (NAI), a device identity as a SUPI 101a, a device certificate 101c, a provider identity 104a, a provider certificate 104c, a provider secret key 104e, provider secret key parameters 111a", signature parameters 111d for use with the provider secret key 104e to generate a network certificate 103c. Data within a device database 104d could be recorded or stored before device 101 establishes an initial radio resource connection with MNO 102, such as during device manufacturing or distribution or a device configuration, and other possibilities exist as well for the time before a message 205 when data for device database 104d is recorded. As additional devices are added to device provider 104, then additional rows for the additional devices could be inserted into a device database 104d.

As depicted in FIG. 3, a device database could store additional data for a device 101 than the fields or values depicted. For embodiments where device provider 104 conducts an ECIES decryption function 103j' (instead of network 103), a device database could also include the ECIES ephemeral public key 101h received in a message 210 by device provider 104, the SUCI 101b used by a device 101 or a device user name associated with a device 101. In addition, although not depicted for a device database 104d in FIG. 3, a device database 104d could also store a first list of cryptographic algorithms 101s and a second list of cryptographic parameters 111 for a device 101 with SUPI 101a in a device database 104d, where the first list and the second list could be used to determine extensions 219d from an AUSF 103b are supported by device 101. The first list and the second list could also be sent to network 103 in message 213 in FIG. 2 above. Other possibilities exist as well for data stored or recorded in a device database 104d without departing from the scope of the present disclosure.

Although a single device database 104d is depicted in FIG. 3, a device database 104d could comprise either multiple databases or multiple tables with data equivalent or similar to that depicted in FIG. 3. In one exemplary embodiment, a device provider 104 could operate multiple device databases 104d, where a first device database 104d is associated with a first network 103 and a second device database 104d is associated with a second network 103, etc. The realm values for a NAI within a SUCI or SUPI could include a first value for the network portion and/or provider portion of the realm for the first network and first device database. The realm values for a NAI within a SUCI or SUPI could include a second value for the network portion and/or provider portion of the realm for the second network and second device database.

The user name in a device database can comprise the user name portion of a network access identifier (NAI) for a SUPI 101a. The SUPI 101a stored in a device database 104d can comprise the SUPI 101a as described above for a device 101 in FIG. 1. Note that the user name can be plaintext with a SUPI. In addition, a "user name" can comprise an identity for a device 101 and a "user name" does not need to be associated with a person. Device certificate 101c stored in a device database 101d can comprise the device certificate 101c stored and used by device 101 as described for a device 101 in FIG. 1. The format and data structure of device certificate 101c in a network database 103d, device provider database 104d, and device 101 could take many forms such as a *.pem structure, raw text, *.crt, or *.der. *.crt can comprise a certificate format and *.der can comprise distinguished encoding rules for the certificate. Other certificates described herein, including device provider certificate 104c could be stored or transmitted in any of the exemplary formats described in the previous sentence.

The provider ID 104a stored in a device database 104d can comprise the provider identity used in the realm portion of a SUCI 101b and SUPI 101a for a device 101. The provider ID 104a in a device database 104d can also comprise the identity for a device provider stored in a provider certificate 104c, such as an identity in the "common name" field or also possibly a portion of the "subject alternative name", and other possibilities exist as well for the location of the provider ID 104a within provider certificate 104c. Note that the provider ID 104a in a SUCI 101b or SUPI 101a is not required to equal or be the same as a provider ID 104a in the provider certificate 104c. A database 104d can store the provider ID 104a in the provider certificate 104c and also the different provider ID 104a in the SUPI 101a. Provider certificate 104c can be stored in device database 104d, network database 103d, and device 101 in a format or structure similar to device certificate 101c described in the paragraph above. In some exemplary embodiments provider certificate 104c can comprise a certificate in *.pem format.

The device provider certificate 104c in a device database 104d and network database 103d can comprise the device provider certificate 104c depicted and described in FIG. 1 and FIG. 2 and other Figures herein. As depicted in FIG. 3, different devices 101 can use different provider certificates 104c, which is also depicted in device database 104d and network database 103d. Note that the same provider ID 104a can be used with different provider certificates 104c, such as provider ID "104a-2" being associated with both provider certificate "104c-2" and provider certificate "104c-3". For this embodiment, the same provider ID 104a could be used with two different certificates with different parameters such as different certificate expiration dates or different key lengths or key names or different elliptic curves used for the public keys, etc., such that different devices 101 could use different provider certificates 104c. In addition, a device 101 using a SUPI 101a could store or be associated with a plurality of different device provider certificates 104c, and the multiple different device provider certificates 104c could be stored for the device 101 in a device database 104d. A specific device provider certificate 104c for the device 101 could be selected based on the network 103 or MNO 102 communicating with device 101, such as parameters supported by the network 103 or MNO 102, where the parameters could be received by device provider 104 via secure session 202.

In exemplary embodiments, the server certificate for a network 103 when conducting an EAP-TLS authentication with device 101 can use the network certificate cert.network 103c, where the different server public keys PK. Network 103e used by network 103 and AUSF 103b are selected in a step 219b based on the parameters 111a or 111a' received by network 103 (where device 101 supports the parameters 111a or 111a'). Also note that a device database 104d and a network database 103d could record unique certificate identities for the depicted certificates, and the full certificates as exemplary *.pem files could be stored outside of a database (but identified by the unique certificate identities). In addition, a device database 104d can record the equivalent database 101k for a device 101 of the multiple device certificates stored or used by a device 101 in a database 101k, as depicted in FIG. 3 for a device database 104d for the device numbered five.

The provider secret key 104e for a provider certificate 104c can be used with the provider public key stored with the device provider certificate 104c. The use of a provider secret key 104e was described above in FIG. 1 and FIG. 2, such as selecting in a step 221 the provider secret key 104e from a device database 104d based on data in a message 220 such as a network certificate 103c to generate in a CSR 219c from network 103 for the network public key PK.network 103e. Device provider 104 could use the selected device provider secret key 104e in order to conduct the step 122' to create or generate the network certificate 103c of the TLS "server hello" message subsequent sent by AUSF 103b in a message 227 in FIG. 2.

As depicted in FIG. 1, a network 103 could store and operate a network database 103d. Either device database 104d or network database 103d could comprise a collection of servers and storage memory for storing values associated with a plurality of devices in order to support the operation of a system 200 or a system 100 and other systems herein. A network database 103d could store values, strings, or numbers for Device identity/SUCI 101b, Device identity/SUPI 101a, Device Certificate 101c, Provider Certificate 104c, Network secret key 103f, TLS Server Ephemeral secret key 103q, TLS Device Ephemeral public key 101n, Shared Secret 225a, Symmetric key 225b, EMSK 236b, and Anchor Key 236a. Additional supporting data for a network 103 could be stored or recorded in a network database 103d as well without departing from the scope of the present disclosure. A network database 103d could also record the parameters 111a' for the network secret key 103f associated with the network certificate 103c. A network database 103d could also record a plurality of different network secret keys SK.network 103f with parameters 111a', and a network 103 could select the network secret key 103f, corresponding network public key PK.network 103e, and parameters 111a' in a step 402 depicted and described in connection with FIG. 4a below.

Data within a network database 103d could be recorded or stored as network 103 receives data for a device 101 from a MNO 102 and a device provider 104. For example, as a network 103 receives a SUCI 101b for a device 101 from a MNO 102 after device 101 established a radio resource connection with MNO 102 and MNO 102 forwards the SUCI 101b in a message 205 in FIG. 2, then the value for SUCI 101b could be added to the network database 103d. As additional data from additional devices 101 is received by network 103, then additional rows for the additional devices could be inserted into a network database 103d. A network database could store additional data or columns for a device 101 than the fields or values depicted.

Additional data in a network database 103d could include the ECIES ephemeral public key 101h received in a message 205 by network 103, and an identity of MNO 102 of MNO ID 102a that sent a message 205. For embodiments where network 103 uses a new server certificate instead in the "server hello message" 227, then the new server certificate or an identity of the new server certificate could be stored for a device 101 along with the SUCI 101b. As depicted for a network database 103d, a network 103 could use a network certificate 103c with a plurality of devices 101. Additional data in a network database 103d could include the selected extensions 219d used for generating a "server hello" in message 227, where the extensions 219d could be selected in a step 219cb in FIG. 2 above and other possibilities exist as well without departing from the scope of the present disclosure.

Network database 103d can also store values of ECIES secret key 103s (not depicted in FIG. 3), which corresponds to the ECIES public key 101h stored by device 101. Note that in some exemplary embodiments a network 103 can select the ECIES secret key 103s based on the network ID 103a received within a realm value for the SUCI 101b from a message 205 and 207 as depicted in FIG. 2. In other words, in exemplary embodiments, there can be a one-to-one mapping or a unique mapping between ECIES secret key 103s and the network ID 103a in a realm for a network using a network database 103d. In this manner, a network can know which ECIES secret key 103s to use for a plurality of devices 101, where the ECIES secret key 103s to use with an ECIES decryption function 103j can be identified based on the network ID 103a received in a realm of the SUCI 101b.

Although a single network database 103d is depicted in FIG. 3, a network database 103d could comprise either multiple databases or multiple tables with data equivalent or similar to that depicted in FIG. 3. In one exemplary embodiment, a network 103 could operate multiple network databases 103d, where a first network database 103d is associated with a first device provider 104 and a second network database 104d is associated with a second device provider 104, etc. The realm values for a NAI within a SUCI or SUPI could include a first value for the device provider portion the realm for the first device provider and first device database. The realm values for a NAI within a SUCI or SUPI could include a second value for the device provider portion of the realm for the second device provider and second device database.

Values for Device identity/SUCI 101b in a network database 103d could be received in a message 205 from MNO 102 in FIG. 2. Values in a network database 103d of Device identity/SUPI 101a could be generated by an ECIES decryption function 103j. Values of Device Certificate 101c, and Provider Certificate 104c could be received in a message 213 in FIG. 2. Values for TLS Server Ephemeral secret key 103q could be derived in a step 103q' as depicted and described in connection with a step 103q' in FIG. 2. Values for TLS Device Ephemeral public key 101n in a network database 103d could be received in a message 218 from FIG. 2. Values for shared secret key 225a and symmetric ciphering key 225b could be derived in a step 225 in FIG. 2. Values for EMSK 236b and an anchor key 236a or Kausf could be derived in a step 236 in FIG. 2.

Network 103 can use the data recorded in a network database 103d in order to conduct the series of steps and process the series of messages as depicted and described in connection with FIG. 2. As one example and as described for a step 219b, network 103 and/or AUSF 103b could use data recorded in a network database 103d with the SUCI 101b value from a message 218a to select at least a network certificate 103c as the server certificate to use with EAP-TLS authentication and the generation of a "server hello" in message 227. The values for TLS Server Ephemeral secret key 103q and TLS Device Ephemeral public key 101n, along with associated parameters could be selected in a step 225 using the SUCI 101b from a message 218a in order to conduct a step 225 to generate the shared secret 225a and the symmetric ciphering key 225b. The ciphertext in a "server hello" within message 227 can be encrypted with the symmetric ciphering key 225b and the ciphertext in a message 233 can be decrypted with the symmetric ciphering key 225b from a network database 103d. Note that the symmetric ciphering key 225b can comprise two portions, where a first portion is used for encryption and a second portion is used for decryption. The message 233 can be received from MNO 102 with a SUCI 101b, and the symmetric ciphering key 225b selected for decryption from the network database 103d using the SUCI 101b or a source IP: port number from message 218 and message 233, which could comprise the same value for a device 101.

The received device certificate 101c decrypted from a message 233 using the symmetric ciphering key 225b can be compared with the device certificate 101c stored in a database for SUCI 101b using a step 224. Network 103 can derive an anchor key 236a for a device 101 with a SUCI 101b using at least the shared secret 225a and the EMSK 236b stored in a network database 103d for the device 101 identified from MNO 102 with a SUCI 101b. Additional examples for the use of data in a network database 103d were provided in FIG. 2 above, and other possibilities exist as well for a network 102 and/or an AUSF 102b to store and use data from a network database 103d without departing from the scope of the present disclosure.

FIG. 4a

Figure 4A:
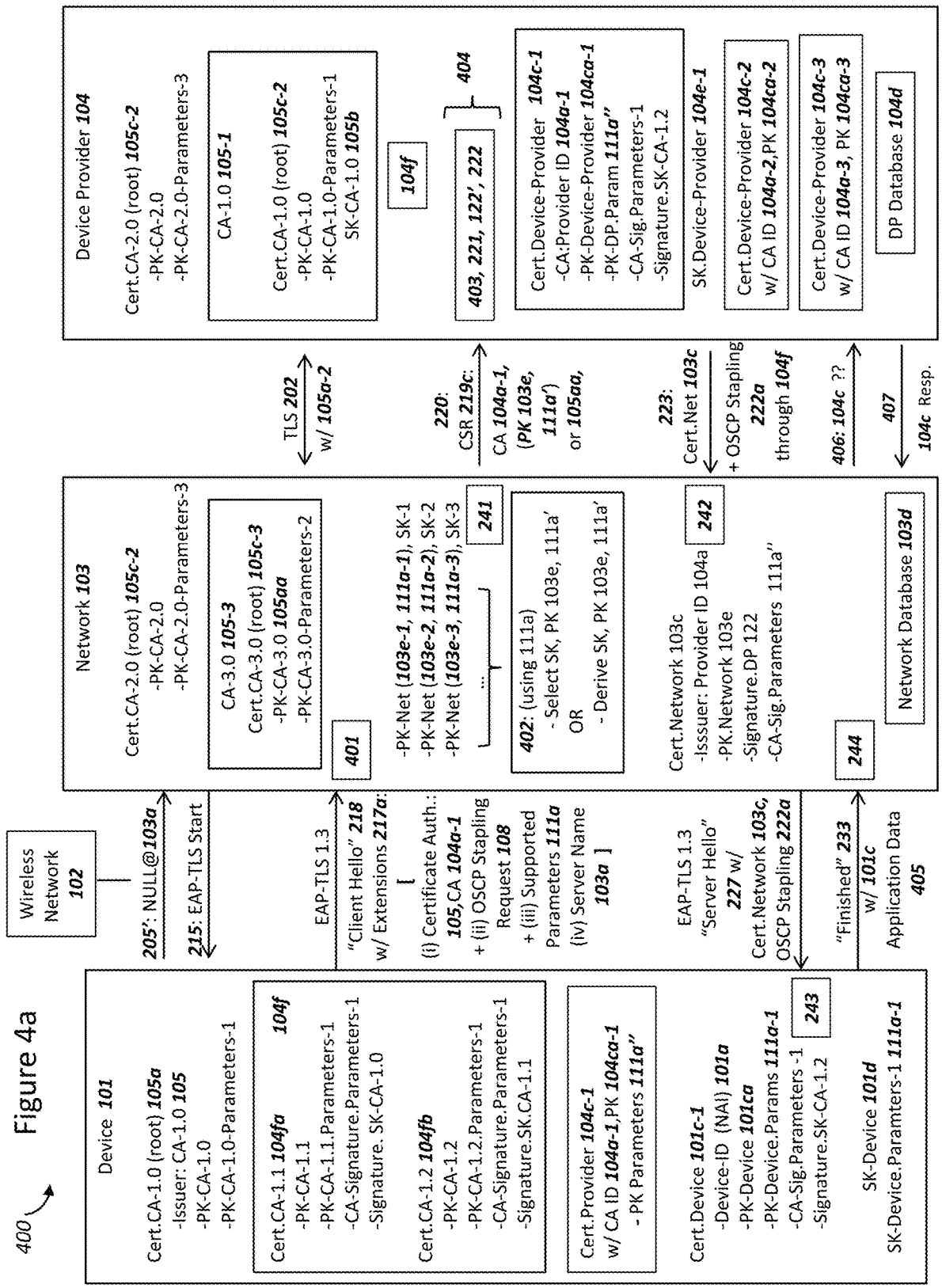
FIG. 4a is a simplified message flow diagram illustrating an exemplary system with exemplary data sent and received by a device, a mobile network operator, a network, and a device provider, in accordance with exemplary embodiments.

FIG. 4a is a simplified message flow diagram illustrating an exemplary system with exemplary data sent and received by a device, a mobile network operator, a network, and a device provider, in accordance with exemplary embodiments. System 400 can include a device 101, a mobile network operator (MNO) 102, a network 103, and a device provider 104. The nodes or entities within system 400 were also depicted and described in connection with FIGS. 1 and 2 above, where FIG. 2 depicts exemplary steps for the nodes and message flows between the nodes. Although a single device 101, MNO 102, network 103, and device provider 104 are depicted in a system 400, a system 400 could include a plurality of each of the depicted nodes connected via an IP network 107. In addition, data recorded for device 101 and device provider 104 depicted and described above in FIG. 1 can be recorded in the device 101 and device provider 104 depicted in FIG. 4a before the steps and message flows are conducted in FIG. 4a. FIG. 4a also depicts additional details for data recorded by each of the nodes for embodiments in FIG. 1 and FIG. 2.

A certificate issuer chain 104f for device 101 can comprise a plurality of certificate issuer certificates. The certificate issuer chain 104f depicted in FIG. 1 can comprise a single certificate issuer certificate, although for other embodiments such as those depicted in FIG. 4a the certificate issuer chain 104f through a root certificate 105c can comprise a plurality of intermediate certificates such as certificate 104fa and certificate 104fb. Device 101 can also record at least one device certificate 101c, which would be the depicted device certificate 101c-1. Device 101 could also record in a database 101k a plurality of device certificates 101c. Device can record a device secret key SK.device 101d for each of the public keys in the certificates 101c.

Device 101 using EAP-TLS authentication can send a message 205' with identification information for device 101 to wireless network 102. Wireless network 102 could comprise a 5G network or a WiFi network, and other possibilities exist as well without departing from the scope of the present disclosure. The message 205' can be different than a message 205, where message 205' could omit information about a user name or user identity in a NAI value, but rather send realm information comprising at least a network identity 103a. The user identity such as a SUPI or a plaintext NAI could be sent within a ciphertext containing the device certificate 101c, as depicted in FIG. 4a (e.g. the device identity could be a value inside the device certificate 101c). Wireless network 102 can use the network ID 103a in the realm portion of a NAI received in message 205' to send the message 205' to the network 103.

Network 103 could include a root certificate authority certificate 105c-2 and also operate a certificate authority 105-3. In other words, network 103 could control the certificate authority 105-3 but certificate authority 105-2 could be external to network 103, such as a traditional certificate authority like Godaddy, Verisign, etc. Network 103 could record or store a plurality of different PKI keys of PK.network 103e, SK.network 103f and associated parameters 111a'. The network 103 and device provider 104 could establish a secure and mutually authentication session 202 using root certificates 105c-2, which can be different than 105c-1 for device provider 104 and 105c-3 for network 103. After receiving the message 205', network 103 could send a command to initiate a TLS 1.3 session using EAP-TLS in message 215. Note that since message 205 could omit information about device provider 104, such as not containing a provider ID 104a within a realm of the NAI, then network 103 may not know or determine which device provider 104 is associated with device 101 until subsequent messages.

Device 101 can generate the "client hello" message 218 using the steps depicted in FIG. 2 above. Message 218 can include extensions 217a with (i) certificate authorities supported by device 101 of the exemplary CA 105-1 and device provider ID 104a-1, (ii) a request for OSCP stapling 108, (iii) supported parameters 111a by device 101, and (iv) a server name indication 103a which can be the same as the network ID 103a in the realm. Other data could be included in the "client hello" message 218 as well.

Network 103 can receive the "client hello" message 218 and process the message using a step 401. In step 401, network 103 can read and process the values for certificate authorities in extensions 217a. In exemplary embodiments, the values for certificate authorities sent by device 101 may not be supported by network 103 until network 103 conducts the subsequent steps as contemplated herein in order to solve the problems with conventional technology. In other words, network 103 may not store or record a certificate for a network public key such as PK.network 103e which is signed by a certificate authority in extensions 217a in message 218. For example, the depicted values for certificate authorities in message 218 include a first certificate authority CA 105c-1 operated by device provider 104 and a second certificate authority for device provider 104a-1. In a step 401, network 103 may determine that network 103 does not record a certificate for a public key PK.network 103a which can be verified using certificates from the first or second certificate authorities (or any CA in extensions 217a). This scenario can frequently arise with thousands of device providers 104 and hundreds of networks 103 globally, where certificates change and public keys change, and device 101 may not record a CA certificate to authenticate a network certificate stored by network 103 for network 103 when sending message 218.

Network 103 can conduct a step 402 to either (i) select a network public key 103e, network private key 103f, and parameters 111a' or (ii) derive the PKI keys supporting the set of parameters 111a received in message 218. Network 103 can then conduct a step 241 to generate a CSR 219c request for device provider 104, where device provider 104 can generate a network certificate 103c for the selected network public key 103e. The step 241 was depicted and described above in connection with FIG. 2 above. In some exemplary embodiments, network 103 could generate CSR 219c and receive network certificate 103c from device provider 104 before the receipt of a message 218 from device 101. For example, network 103 and device provider 104 could conduct steps to support devices 101 before device 101 communicates with network 103. Network 103 could send device provider 103 the CSR 219c in a message 220 from FIG. 2, where the message 220 can include the certificate authority name or identity CA 104a-1, the network public key PK. Network 103e, and the parameters 111a'.

For some embodiments, network 103 could send a certificate authority public key such as key 105ca to device provider 104 for generation of a network certificate 103c, where the network certificate 103c with the certificate authority public key 105ca could be used by device 101 to verify a different, subsequent network certificate 103c' generated by network 103. The internally generated network certificate 103c' could be signed using the private key corresponding to the public key 105ca. Thus, for the embodiments described in this paragraph, network 103 could send device 101 the network certificate 103c' and the network certificate 103c (with key 105ca and signature 122) in a message 227. Device 101 could verify (i) network certificate 103c with device provider certificate 104c, and network certificate 103c' with the network certificate 103c.

Device provider 104 can record a plurality of different device provide secret keys SK.provider 104e with different parameters 111a", corresponding to a plurality of different device provider certificates 104c. Device provider 104 could receive the CSR 219c and process the message. Device provider conduct a step 403 to read the certificate authority name CA 104a-1 to select both (i) the device provider secret key SK.provider 104e and (ii) the parameters 111a" to generate a network certificate 103c for the CSR 219a. The multiple different values of SK.provider 104e, parameters 111a" and provider ID 104a could be recorded in a device database 104d as depicted and described above in connection with FIG. 3. In this manner, device provider 104 could generate a digital signature 122 which can be verified by device 101 using the device provider certificate 104c stored in device 101. In other words, without a step 403 and the receipt of a certificate authority name CA 104a in CSR 219c, device provider 104 may not be able to generate a network certificate 103c which could be verified by device 101.

Note that network 103 may not receive a device identity such as a user name for the device 101 until receipt of a message 233 with a device certificate 101c. Consequently, device provider 104 can use other information than a user name for the device, such as the certificate authority name CA 104a-1 in order to select a device provider secret key SK.provider 104e to generate a digital signature 122 for a network certificate 103c, where the digital signature 122 can be verified by a device 101 using a stored device provider certificate 104c with the public key 104ca corresponding to the selected device provider secret key SK.provider 104e.

Device provider 104 can also conduct the steps 221, 122', and 222 as depicted and described in connection with FIG. 2 in order to generate the network certificate 103c and OSCP stapling 222a for the network certificate 103c. In exemplary embodiments, device provider 104 generates the OSCP stapling 222a through intermediate certificates 104f stored by device 101. Device provider 101 could record the secret keys corresponding to the public keys in intermediate certificates 104f and consequently conduct the OSCP stapling 222*a*. OSCP stapling 222*a* can be used by device 101 to verify that parent certificates of the network certificate 103*c*, such as the device provider certificate cert.provider 104*c* and above have not been revoked, without requiring device 101 to access the public Internet. The collection of steps 403 through 222 can comprise a step 404, as depicted in FIG. 4*a*.

Device provider 104 can then send network 103 a message 223 with the network certificate 103*c* and OSCP stapling 222*a*, where OSCP stapling 222*a* can be through the certificate chain 104*f* stored in device 101. Device provider 104 can control device 101 before connection with network 103 and MNO 103, and consequently device provider 104 could record the certificate chain 104*f* and related certificates for a device 101 in a device database 104*d* before device 101 sends message 205. Network 103 could receive the message 223 and conduct a series of steps 242 in order to process the message. Network 103 could then store the network certificate 103*c*, with the exemplary values depicted, where the steps 242 were depicted and described in connection with FIG. 2 above. The steps 242 could also be used to generate and send the "server hello" message 227. Note that message 227 can include the network certificate 103*c* and the OSCP stapling 222*a* from the message 223. In addition, a network 103 could send a device provider 104 the message 220 with a CSR 219*c* before network 103 receives the message 205' from the device. Network 103 could send device provider 104 a CSR 219*c* when network public keys 103*e* are generated, and then network 103 could subsequently store the resulting network certificates cert.network 103 for use when device 101 sends a message 218.

Device 101 can receive the "server hello" message 227 can conduct steps 243 in order to process the message. The steps 243 were depicted and described for a device 101 in FIG. 2 above. In summary, device 101 can mutually derive the symmetric ciphering key 225*b* with network 103 and AUSF 103*b*, using the ephemeral PKI keys stored by the device 101 for the TLS session. Device 101 can use at least a portion of symmetric ciphering key 225*b* derived in order to decrypt the ciphertext in message 227. The plaintext data for message 227 can comprise the plaintext values depicted and described for a message 227 in FIG. 2. The plaintext data for message 227 can include the network certificate 103*c* as well as OSCP stapling 222*a*. The device 101 can verify a "Certificate Verify" 224*c* digital signature in message 227.

The device 101 can verify the network certificate 103*c* and digital signature 122 using a least the device provider certificate 104*c* recorded by device 101, including parameters 111*a*" in order to process the digital signature 122. Device 101 can verify the OSCP stapling 222*a* using the recorded or stored intermediate certificates 104*f* through a root certificate 105*c*. If any of the verification steps fail, then device 101 could respond with a failure message to network 103 and also then not perform subsequent steps in FIG. 4*a*. If any of the verification steps fail, then device 101 could select a different MNO 102 or a different SUPI 101*a* with a different realm value for a different network 103 in order to repeat sending a new message 205' and restart the process depicted in FIG. 4*a* with the different data.

Steps 243 can include device 101 selecting a device certificate 101*c* from a database 101*k*. Device 101 can select the device certificate 101*c* using the extensions 219*d* and also a list of certificate authorities supported by network 103, where the list of certificate authorities can include an identity for the device provider 104*a*. In other words, the network 103 can store the device provider certificate cert.provider 104*c* from a message 213 in FIG. 2 and specify the device provider ID 104*a* as a supported certificate authority in extensions 219*d* in message 227. Consequently, network 103 and AUSF 103*b* can use the device provide certificate 104*c* to verify a device certificate cert.device 101*c* from device 101 in a subsequent "finished" message 233. Steps 243 can include device 101 selecting a device certificate cert.device 104*c* in order to support cryptographic parameters 111*a* within extensions 219*d* in a message 227.

Device 101 can generate a "CertificateVerify" digital signature for a "finished" message 233 using the device private key SK.device 101*d* for the device public key PK.device 101*ca* in the selected device certificate cert.device 101*c*. Device 101 can also process application data 405 for inclusion with the "finished" message 233. The application data 405 can comprise transducer measurements or values for device 101, control or signaling data communicated from device 101 to network 103, and other possibilities exist as well for application data 405 without departing from the scope of the present disclosure. Message 233 can also include the selected device certificate cert.device 101*c*. In a step 243, device 101 can update or renew the symmetric ciphering key 225*b* with data received in message 227. Device 101 can encrypt the message 233 with at least a portion of the updated symmetric ciphering key 225*b*, where the portion is for an encryption step by device 101 and network 103 could also update the symmetric ciphering key 225*b* with data from message 227 and use the portion of the updated symmetric ciphering key 225*b* to decrypt the message 233. Device 101 can send the message 233 to the network 103.

The network 103 and AUSF 103*b* can receive the message 233 from the MNO 102 and conduct the steps 244 in order to process the message. The steps 244 in order to process the message 233 were depicted and described in connection with FIG. 2 above. One difference for steps 244 in FIG. 2 and the steps for network 103 in FIG. 4*a* can be that network 103 may not receive the device identity 101*a* (such as a SUPI 101*a*) until the receipt of a device certificate cert.device 101*c* in a message 233. Note that the initial message 205' from device 101 can omit a user name, and thus network 103 may not know the specific device 101 with device identity 101*a* until a message 233. Thus, network 103 may not have separately received a device certificate 101*c* from a device provider 104 mapped to the specific device 101 sending a "client hello" message 218, where the separate receipt of device certificate 101*c* in FIG. 2 could be through a message 213 (since the device ID 101*a* was known by network 103 from message 205 in FIG. 2). In FIG. 4*a*, network 103 can subsequently conduct steps to verify that device certificate cert.device 101*c* has not been revoked (even though the device certificate 101*c* could be verified through a device provider certificate 104*c*). Note that in FIG. 4, device provider could send network 103 the device provider certificate 104*c* in the secure session 202 before network 103 receives a message 233 from device 101.

Network 103 can verify that device certificate 101*c* has not been revoked by sending device provider 104 a query message 406 for the device certificate 101*c* from a message 233. The query 406 can be a check against a certificate revocation list for device certificate 101*c*, or the query 406 could be a query that the device certificate 101*c* remains valid. In exemplary embodiments, the query 406 from network 103 can request for the same device certificate 101*c* received in message 233. Device provider 104 can respond with data regarding device certificate 101*c* in a response 407 to the query 406. The response 407 could confirm that device certificate 101*c* remains valid, has not been revoked, or could also include the full device certificate 101c. Network 103 could use the response 407 to determine the device certificate is valid and/or has not been revoked.

For embodiments where response 407 includes the full device certificate 101c, then network 103 could compare the device certificate 101c received from device provider 104 with the device certificate 101c from message 233 received from the device 101. If the certificates are the same, then network 103 could determine that device certificate 101c is valid and has not been revoked. Device provider 104 could signal in response 407 if the device certificate 101c has been revoked, including not sending the device certificate 101c in a response 407 as one form of the signal in response 407. In this manner, network 103 could check the validity and current revocation status of a device certificate 101c from device 101, without requiring the full set of digital signature verification steps through (i) a parent certificate chain for device certificate 101c and/or (ii) a list of OSCP stapling digital signature values for the device certificate 101c. Note that without access to servers on the Internet 107 other than SEAF 102b (which may not be available to device 101 until after completing of an EAP-TLS authentication), then device 101 may not be able to generate current OSCP stapling for the device certificate 101c. Thus, network 103 can send the query 406 and process the response 407 in order to verify the current status of device certificate 101c.

FIG. 4b

Figure 4B:
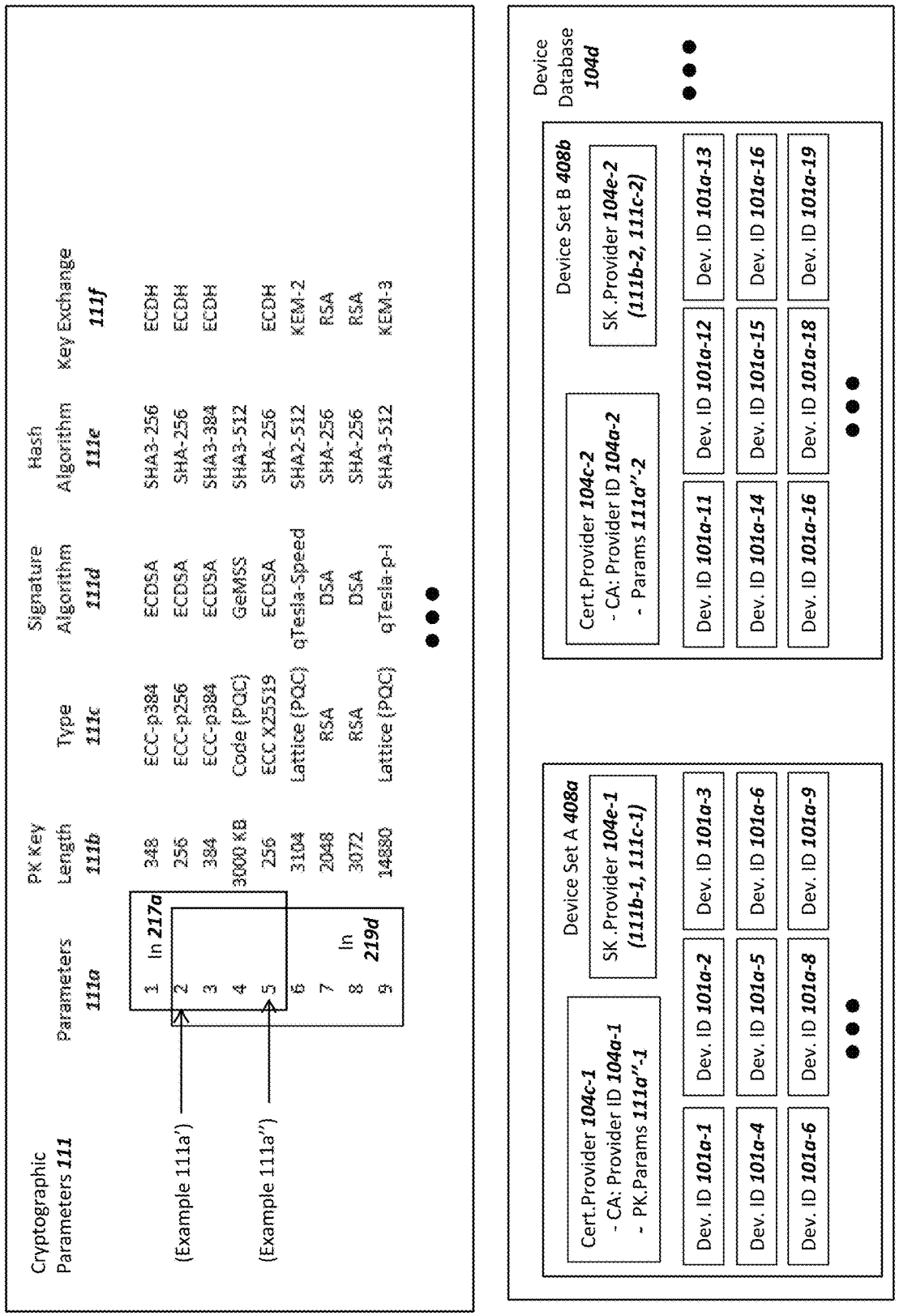
FIG. 4b is an illustration of an exemplary set of cryptographic parameters and a device database, in accordance with exemplary embodiments.

FIG. 4b is an illustration of an exemplary set of cryptographic parameters and a device database, in accordance with exemplary embodiments. Cryptographic parameters 111 can specify sets of cryptographic parameters for cryptographic algorithms that are supported by device 101, network 103, and device provider 104 in order to support the systems depicted herein. Cryptographic parameters 111 or subsets thereof can be recorded in nonvolatile memory in each of device 101, network 103, and device provider 104. Cryptographic parameters 111 can include values for an identification for a collection or subset of set identifier 111a, a key length 111b, a type or name 111c, a signature algorithm 111d, a secure hash algorithm 111e, and a key exchange mechanism 111f. Although not depicted for cryptographic parameters 111 in FIG. 4b, the cryptographic parameters 111 could also specify values or settings for a symmetric ciphering algorithm such as a symmetric ciphering key length, settings for a symmetric ciphering algorithm, and a random number length used to create random numbers.

As contemplated herein, when a selected set of cryptographic parameters such as using the words or description "parameters 111a" or "cryptographic parameters 111a" can specify a row of parameters or values in a set of cryptographic parameters 111, such that the collection of values in the row can be used with key pair generation functions to derive PKI keys (e.g. in steps 103q' and 101q), an ECDH key exchange to mutually derive a shared secret, a key derivation function to derive a symmetric ciphering key such as key 225b using at least the shared secret, and other cryptographic operations and steps as contemplated herein. Set identifier 111a can be an identity for a row or set of values for cryptographic parameters 111. Set identifier 111a' could represent a first set of cryptographic parameters and set identifier 111a" could represent a second set of cryptographic parameters. PK key length 111b could represent the length of a public key in bits or bytes. Parameters 111 could include the length of a private key in bits or bytes as well.

The type or name 111c for a set of cryptographic parameters 111 can specify the cryptographic algorithms to use with PKI keys, such as the exemplary names for ECC curves and also post-quantum cryptography cryptographic algorithms. The field of post-quantum cryptography continues to develop with proposed algorithms currently undergoing revisions for standardization as of July 2019. In general, the leading candidates for post-quantum cryptography key exchange mechanisms propose using (i) lattice-based cryptography, (ii) code-based cryptography, or (iii) Supersingular elliptic curve isogeny cryptography, as described by the Wikipedia article for "Post-Quantum Cryptography" dated Feb. 22, 2019, which is hereby incorporated by reference. The type 111c for cryptographic parameters 111 can specify an ECC named curve, a post-quantum cryptography cryptographic algorithm, or RSA based algorithms for PKI keys used with the type 111c for PKI keys using or associated with the type.

Signature algorithm 111d for a set of cryptographic parameters 111 can specify the digital signature algorithm used with the PKI keys for a selected subset of cryptographic parameters 111a. Exemplary signature algorithms include ECDSA, GeMSS, qTesla, DSA, and other possibilities exist as well. For example, the signature algorithm 111d in a set of cryptographic parameters 111a" could specify the signature algorithm used by device provider 104 in a step 122' in order to generate digital signature 122, as well as the signature algorithm for device 101 to use in order to verify a network certificate 103c with the digital signature 122. Other possibilities for signature algorithms 111d and types 111c, as well as key lengths 111b are possible as well without departing from the scope of the present disclosure.

Hash algorithm 111e in cryptographic parameters 111e can be the name of a secure hash algorithm, such as the exemplary SHA-256 algorithm depicted, which may also be referred to as "SHA-2". Hash algorithm 111e can also be used in a key derivation function (e.g. with a step 225) and also with digital signature step 122 from FIG. 2. Although not depicted in FIG. 4b, settings for a symmetric ciphering algorithm in cryptographic parameters 111 can specify (i) the identity or name of a symmetric ciphering algorithm such as "AES", "AES-SIV", 3DES, Blowfish, etc, and (ii) settings for the symmetric ciphering algorithm. Other possibilities exist as well for data within cryptographic parameters, such as the specification of point compression, encoding rules such as distinguished encoding rules (DER), ASN or CSN syntax notation, padding rules, byte or bit orders such as big endian, little endian, etc.

Key exchange 111f can specify a key exchange algorithm used with the PKI keys for a set of cryptographic parameters 111a. Exemplary exchange algorithms can include an ECDH key exchange using the type 111c. Key exchange 111f could also support other key exchange mechanisms (KEM) such as those for post-quantum cryptographic algorithms depicted as "KEM". The specific steps for a key exchange can be specified according to the type 111c. In general a key exchange mechanism or key exchange 111f can comprise using a public key from a remote entity and a local private key in order to derive a shared secret. The key exchange mechanism could also comprise encrypting a symmetric ciphering key (or value for the key) with a public key and decrypting the symmetric ciphering key (or value for the key) with a private key. Other possibilities exist as well for a key exchange 111f in parameters 111 in order to select or specify the use of cryptographic algorithms such as 101s and 104s without departing from the scope of the present disclosure.

FIG. 4b also depicts exemplary data stored in a device database 104d in accordance with exemplary embodiments. A device database 104d was also depicted and described in connection with FIG. 1 and FIG. 3 above, where FIG. 4b can show additional exemplary data. A device database 104d can support devices 101 with different device provider certificates cert.device 104c. A first set or group of devices 101 could belong or be assigned to a device set A 408a and a second group of device 101 could belong or be assigned to a device set B 408b. The different sets of devices could be different families, types, generations, or even different manufacturers, and other possibilities exist as well. The first set A 408a could record or store a first device provider certificate 104c-1. The second set B 408b could record or store a second device provider certificate 104c-2. The first device provider certificate 104c-1 could include a first device provider ID 104a-1 and first set of parameters for the public key in the certificate of parameters 111a"-1. Although not depicted, first device provider certificate 104c-1 could also include a first device provider public key PK.provider 104ca-1.

The second device provider certificate 104c-2 could include a second device provider ID 104a-2 and second set of parameters for the public key in the certificate of parameters 111a"-2. Although not depicted, second device provider certificate 104c-2 could also include a second device provider public key PK.provider 104ca-2. A device database 104d could also store a corresponding secret key for the public keys in device provider certificates 104c such as the depicted SK.provider 104e-1 for the first device provider certificate 104c-1 and the depicted SK.provider 104e-2 for the second device provider certificate 104c-2. Note that in some embodiments the first and second values for device provider ID 104a can be the same, and a device provider 104 could select or use the certificate 104c based on the parameters 111a''.

In exemplary embodiments, a device provider 104 could select the device provider certificate 104c for a device 101 using the database 104d and the provider ID 104a. For the embodiments depicted in a system 200 in FIG. 2, where a device provider receives a device identity 101a (such as a SUPI or a NAI) for a device 101 in a message 210 from a network 103, the device provider 104 could select the device provider certificate 104c and corresponding private key SK.provider 104e in a step 211 from a device database 104d using the provider ID 104a or the device identity 101a.

For the embodiments depicted in a system 400 in FIG. 4a, where device provider 104 receives a device provider ID 104a in a message 220, then the device provider 104 can select the device provider certificate 104c and corresponding private key SK.provider 104e in a step 403 from a device database 104d using the provider ID 104a. A device database could also record additional sets of devices, device certificates, and private keys for the certificates. In this manner (via a step 211 or step 403 with the data stored in a device database 104d), a device provider can select the device provider certificate 104c and corresponding secret key, along with parameters 111a" for generating a digital signature 122 for the network certificate 103c. Consequently, a device 101 could verify the network certificate 103c received in a "server hello" message 227 using the device provider certificate 104c stored in device 101.

FIG. 5a

Figure 5A:
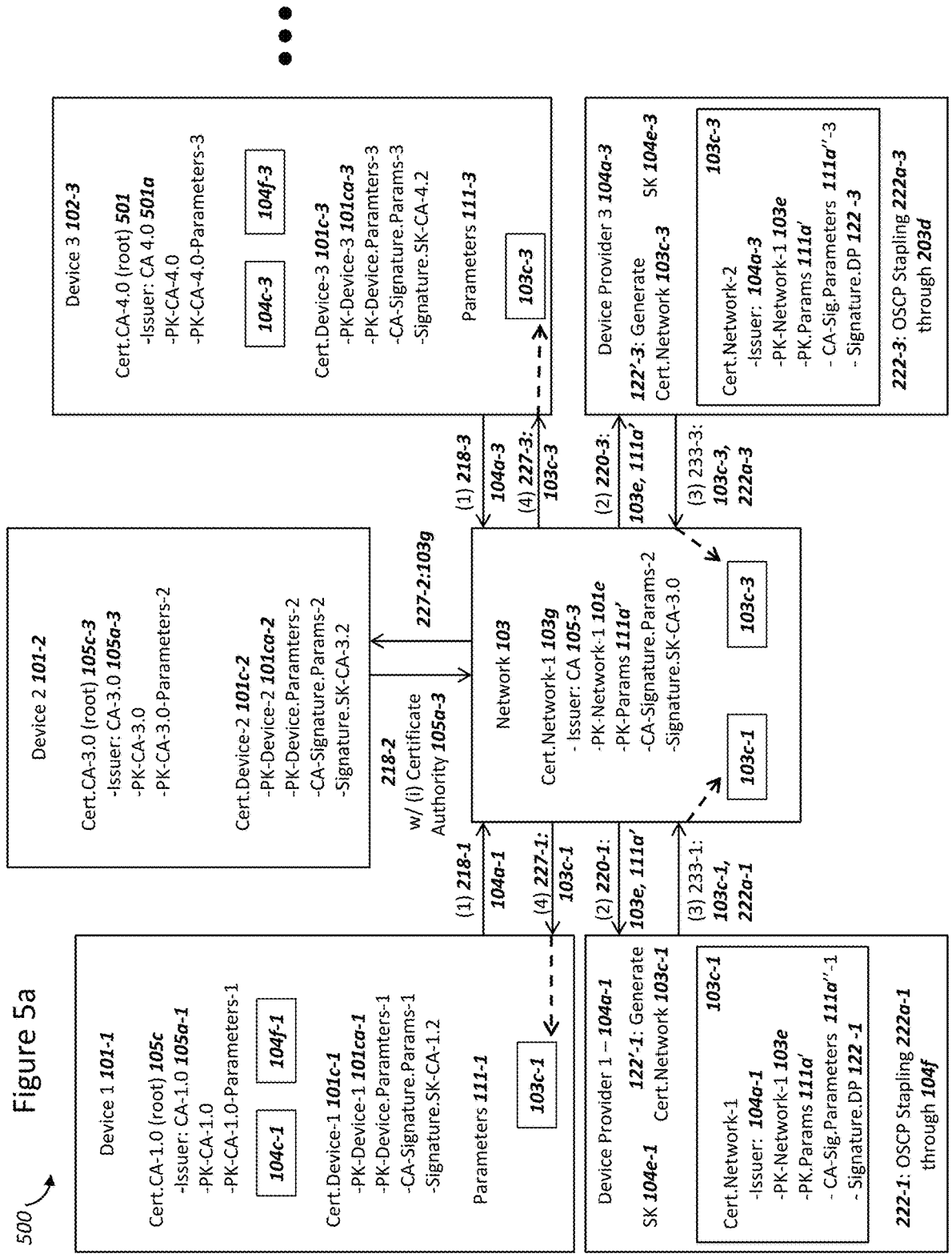
FIG. 5a is an illustration of an exemplary system where a network communicates with a plurality of devices and a plurality of device providers, in accordance with exemplary embodiments.

FIG. 5a is an illustration of an exemplary system where a network communicates with a plurality of devices and a plurality of device providers, in accordance with exemplary embodiments. A system 500 can include a network 103, a plurality of devices 101 and a plurality of device providers 104. Each of the devices 101 can include root certificates and device certificates. A first device 101 could store a first device provider certificate 104c-1 for a first device provider 104-1. A second device 101 could store a root certificate 105c-3 of a certificate authority 105-3 for network 103 and also a second device certificate 101c-2. A third device 101 could store a second device provider certificate 104c-3 for a second device provider 104-3. A system 500 can include additional devices 101 and device providers 104 as well.

A first device provider 104-1 could be associated with the first device 101-1, such a being the manufacturer, distributor, or owner of the first device 101-1, and other possibilities exist as well for the relationship between the first device provider 104-1 and the first device 101. A second device provider 104-3 could be associated with the third device 101-3, such a being the manufacturer, distributor, or owner of the third device 101-3, and other possibilities exist as well for the relationship between the second device provider 104-3 and the third device 101-3. The first device provider 104-1 could store a device provider private key SK.provider 104e-1 for the device provider certificate cert.provider 104c-1 stored by the first device 101-1. The second device provider 104-3 could store a device provider private key SK.provider 104e-3 for the device provider certificate cert.provider 104c-3 stored by the third device 101-3.

The network 103 could receive a "client hello" message 218 from the first device 101-1 with an identity of the first device provider 104a-1 as a certificate authority for device 101, which is depicted in sequence "(1)". The network 103 could select the first device provider 104-1 using the identity of the first device provider 104a-1. The network 103 could use the steps of system 200 in FIG. 2 or system 400 in FIG. 4 to send a message 220-1 with a CSR 219c to the first device provider 104-1. The message 220-1 can include a network public key PK.network 103e and associated parameters 111a' for the network public key. The message 220-1 is depicted with a sequence "(2)". The first device provider 104-1 could use the message 220-1 to select a device provider secret key SK.provider 104e-1 for the public key PK.provider 104ca-1 in the device certificate 104c-1 stored by first device 101-1. The first device provider 104-1 could use a step 122' to generate a digital signature 122-1 and a first network certificate 103c-1 using the selected secret key 104e-1. The first device provider 104-1 could generate OSCP stapling 222a-1 for the first network certificate 103c-1

The first device provider 104-1 could send the network 103 the first network certificate 103c-1 and the OSCP stapling 222a-1 in a message 233, which could be received by a network 103. The message 233 is depicted in FIG. 5a with a sequence of "(3)". The network 103 could store the first network certificate 103c-1 and associated OSCP stapling 222a-1. Note that network 103 could also use the stored first network certificate 103c-1 and OSCP stapling 222a-1 for future use with other devices 101, where the "client hello" message 218 includes an identity 104a of the first device provider 104-1 as a certificate authority. In this manner, the steps depicted in a system 500 and other systems herein for a network 103 to receive and store a network certificate 103c for a certificate authority 104a do not need to be performed every time a "client hello" with a certificate authority of 104a is received.

Network 103 could then conduct the series of steps depicted and described in connection with FIG. 2 and FIG. 4 in order to generate a "server hello" message 227-1 for the "client hello" message 218-1. Network 103 could then send device 101 the "server hello" message 227-1 with the first network certificate 103c-1 and OSCP stapling 222a-1. The "server hello" message 227-2 is depicted in FIG. 5a with a sequence of "(4)". The first device 101-1 could then process the "server hello" message 227-1 and verify the first network certificate 103c-1 with the first device provider certificate 104c-1 stored by device 101-1. Device 101-1 could also verify OSCP stapling 222a-1 using device provider certificate 104c and the intermediate certificate chain 104f stored by the first device 101-1. The first device 101-1 can store the first network certificate 103c-1 for use in subsequent communications with network 103.

Network 103 could also communicate with a second device 101-2. For some embodiments, a device 101 could store a certificate authority certificate for the network 103 before the device 101 communicates with the network 103. For these embodiments, the generation of a network certificate 103c by a device provider 104 would not be required in order for device 101 to mutually authenticate with a network 103. This embodiment is depicted with the second device 101-2 in FIG. 5a. The network 105 could store a network certificate cert.network 103g, where the digital signature within the certificate cert.network 103g can be verified by device 103 using a certificate authority certificate 105c-3 stored by the device. The network certificate 103g could include an issuer or certificate authority of 105-3, matching or verifiable by the certificate authority certificate 105c-3 store by the second device 101-2.

Continuing with the communications for the second device 101-2, The certificate authority certificate 105c-3 could comprise a root certificate, although an intermediate certificate authority certificate could be used by device 101 as well in order to verify a network certificate 103g. If the intermediate certificate authority certificate stored by device 101 is trusted by device 101 (such as being securely recorded (i) during a configuration process of device 101 or (ii) before device 101 sends a "client hello" message 218), then verification by device 101 through a root certificate 105c is not required and device 101 could verify a network certificate 103g through the intermediate certificate authority certificate.

The second device 101-2 could send a "client hello" message 218-2 with an identity or name for certificate authority of 105-3, which could comprise an identity 105a-3. The network 103 could select the network certificate 103g using the ID 105a-3 for certificate authority 105-3 in the message 218-2. The network 103 could generate a "server hello" message 227-2 using the network certificate 103g. The network 103 could send the second device 101-2 the "server hello" message 227-2 with the network certificate 103g. The second device 101-2 could receive the message 227-2 and process the message and verify the network certificate 103g using the certificate authority certificate 105c-3 (which could comprise a root certificate).

Note that the first, second, and third devices 101 in a system 500 and a network 103 can conduct the series of steps after a message 227, where the series of steps after a message 227 include steps 243 depicted and described in connection with FIG. 2. The devices 101 could send network 103 a message 233 in FIG. 2 (but not depicted in FIG. 5). The network could conduct the series of steps 244 as in FIG. 2 (but not depicted in FIG. 5). The network 103 and devices 103 could conduct the steps to mutually derive an anchor key 236a or a master key and/or an EMSK 236b in order for device 101 and wireless network such as MNO 102 to send and receive encrypted messages 240.

Network 103 could also communicate with the third device 101-3. The third device 101-3 could specify the identity of a second device provider 104a-3 as a certificate issuer or certificate authority in extensions 217d within a "client hello" message 218-3. Note that the device provider certificate 104c-3 can include the identity 104a-3 of device provider 104-3 as the certificate issuer, and the third device 101-3 could use that identity 104a-3 within the extensions 217d of the "client hello" message 218-3. Additional, or other certificate issuers such as a CA 501 with CA identity 501a could have certificates within device 101 as well, and the CA identity 501a could be included also with the extensions 217a in message 218-3.

Network 103 can receive the message 218-3 from device 101-3. Network 103 could read the CA ID 501a and provider ID 104a-3 in extensions 217a of message 218-3. Network 103 in a step 401 from FIG. 4 could select the device provider 104-3 based on the provider ID 104a-3 from extensions 217a within message 213. Network 103 in a step 402 from FIG. 4 could also select a network public key PK.network 103e and corresponding private key SK.network 103f using the parameters 111a in extensions 217a within message 218-3. The selected parameters 111a' for PK.network 103e could be the preferred subset of parameters 111a within message 218-3. Network 103 can then send the selected device provider 104-3 a CSR 219c for the selected PK.network 103e in a message 220-3, along with the provider ID 104a-3 for a message 220-3 as depicted in FIG. 4.

Device provider 104-3 can receive the message 220-3 and use the provider ID 104a-3 to select (i) the secret key SK.provider 104e-3 associated with the provider ID 104a-3 as well as (ii) parameters 111a"-3 for a digital signature algorithm in order to create a digital signature 122-3 in a step 122'-3. Device provider 104-3 can create the network certificate 103c-3 with the digital signature 122-3 and parameters 111a"-3. Note that the parameters 111a"-3 can be different than parameters 111a' for the network pubic key PK.network 103e. The third device 101-3 could store the device provider certificate 104c-3 with a public key for the secret key SK.provider 104e-3. Device provider 104-3 and network 103 can determine that device 101-3 stores the device provider certificate 104c-3 based on the provider ID 104a-3 in the message 218-3 and message 220-3.

Device provider 104-3 can also generate OSCP stapling 222a-3 through intermediate certificates 104f-3 stored in device 101-3. The intermediate certificates 104f-3 could be associated with provider ID 104a-3 and a device 101-3 using provider ID 104a-3 could also record the intermediate certificates 104f-3. Device provider 104-c could store and record the private keys for the public keys in intermediate certificates 104f-3 and consequently generated the digital signatures for OSCP 222a-3 using the private keys. Device provider 104-3 can send network 103 the generated network certificate 103c-3 in a message 223-3 along with the OSCP stapling 222a-3. In exemplary embodiments, a message 223 such as message 223-3 in FIG. 5a can include the device provider certificate 104c for the secret key SK.provider 104e used to create the digital signature 122 in a network certificate 103c, such as network certificate 103c-3 in FIG. 5a.

Network 103 can receive the message 223-3 and store the network certificate 103c-3 and the corresponding device provider certificate 104c used to verify the network certificate 103c-3. Network 103 can then conduct the steps in FIG. 2 and FIG. 4 to generate a "server hello" message 227-3 with the received network certificate 103c-3. The message 227-3 can include the OSCP stapling 222a-3 as well. Both network 103 and the device 103-3 can then conduct the steps depicted and described in connection with FIG. 2 and FIG. 4 to complete an EAP-TLS authentication, or a TLS handshake.

The steps contemplated herein can be used with a traditional TLS handshake and authentication and are not limited to only EAP-TLS authentication. Steps depicted in FIG. 2 after the receipt of a message 233 can be associated with EAP-TLS authentication and the use of a 5G network or a WiFi network. However, the use of a 5G network or a WiFi network are not required to obtain benefits of the technology disclosed herein, and in some exemplary embodiments the steps in FIG. 2 for a device 101 and network 103 after a message 233 can be omitted.

FIG. 5b

Figure 5B:
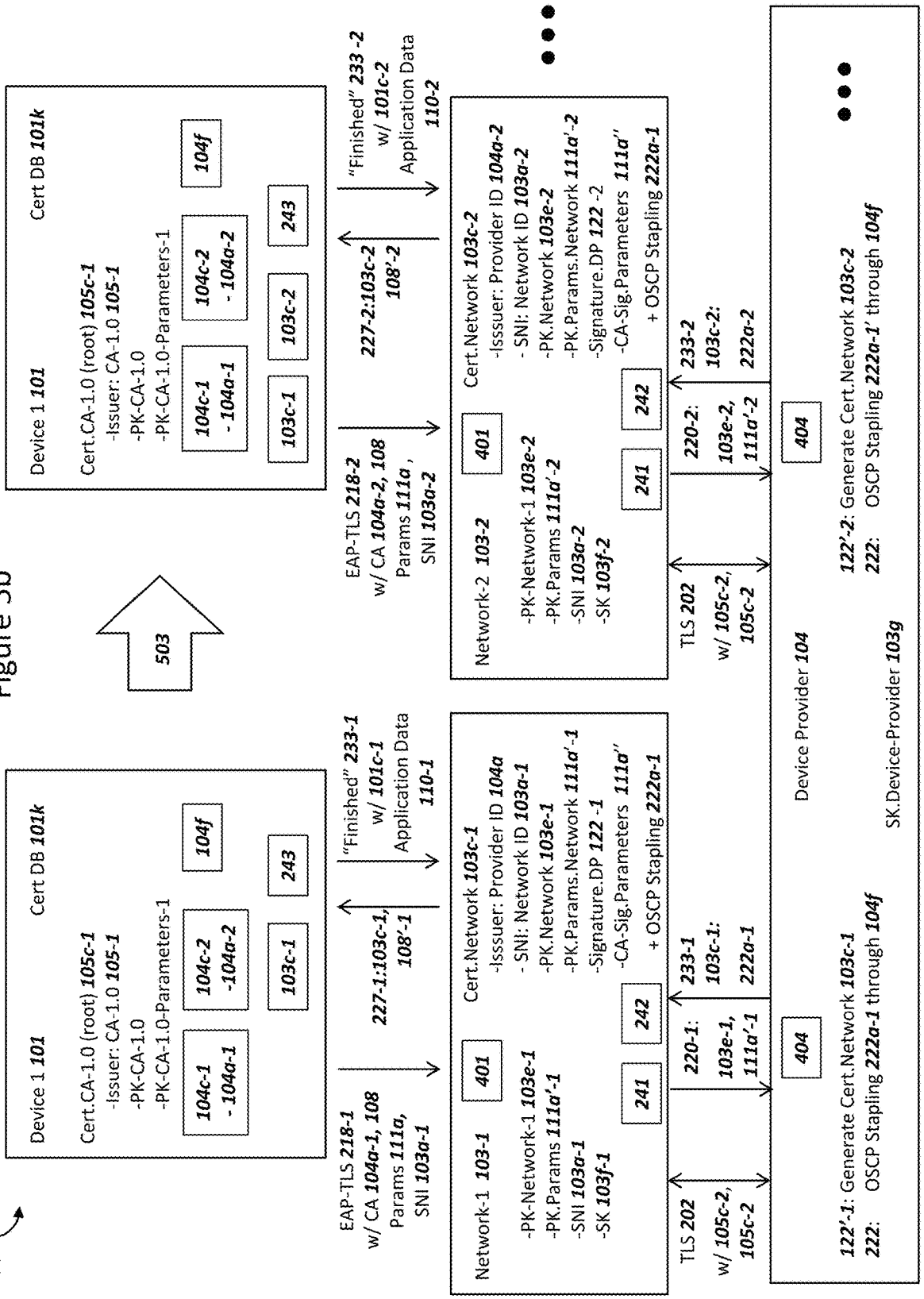
FIG. 5b is a graphical illustration of communication between a device, a plurality of networks, and a device provider in accordance with exemplary embodiments.

FIG. 5b is an illustration of communication between a device, a plurality of networks, and a device provider in accordance with exemplary embodiments. A system 502 can include a device 101, a first network 103-1, a second network 103-2, and a device provider 104. Although only two networks 103 are depicted in FIG. 5b, a system 502 and other systems herein can include a plurality of networks 103. A device 101, networks 103-1 and 103-2, and device provider 104 can comprise the device 101, network 103, and device provider 104 depicted and described in connection with FIG. 1, FIG. 2, FIG. 4, and FIG. 5a herein. A device 101 can connect with a first network 103-1 using TLS authentication, which could include EAP-TLS authentication and also support TLS v. 1.3. A device 101 could use a MNO 102 or a wireless network such as WiFi in order to communication with the first network 103-1 and the second network 103-2. A device 101 could also conduct a move 503 step from the first network 103-1 to the second network 103-2 during the lifetime of device 101. Although only a single move 503 is depicted in FIG. 5b, a device 101 could conduct multiple move 503 steps during the lifetime of device 101. A move step 503 can result from (i) a geographic change or movement of device 101 or (ii) a logical change or switching by device 101 to change communications from the first network 103-1 to the second network 103-2.

A device 101 can send the first network 103-1 a "client hello" message 218-1. Device 101 could conduct the series of steps depicted in FIG. 2 and FIG. 4a in order to process or generate the "client hello" message 218-a. The first network 103-1 can receive the message 218-1 and process the message. Network 103-1 can conduct a step 401 in order to determine that a supporting network certificate 103c-1 from device provider 104 is required in order to support a mutual TLS authentication with device 101. Network 103-1 can conduct the steps 241 in order to select a PK.network 103e-1 and parameters 111a'-1 supported by cryptographic algorithms 101s in device 101. Network 103-1 and device provider 104 can establish a secure session 202 using a certificate authority 105-2, where the root certificate 105a-2 for the certificate authority for network 103-1 and device provider 104 was depicted in FIG. 4a. Network 103-1 can send device provider 104 a message 220-1 with the PK.network 103e-1 and parameters 111a'-1 though the secure session 202.

Device provider 104 can then conduct the series of steps 404 from FIG. 4a in order to process the message 220-1, where the message 220-1 can include a CSR 219c for the PK.network 103e. Message 220-1 can also include the provider ID 104a received in a message 218-1. Device provider 104 can generate a network certificate 103c-1 for the first network 103-1 and OSCP stapling 222a-1. Device provider 104 can send network 103-1 a message 223 with the network certificate 103c-1. Network 103-1 can store and use the network certificate 103c-1 with steps 242 in order to process and send a "server hello" message 227-1.

Device 101 can conduct the series of steps 243 in order to process the "server hello" message 227-1, including verifying the network certificate 103c-1 with a device provider certificate 104c stored within device 101. For some exemplary embodiments, a message 227-1 can also include the device provider certificate 104c with the network certificate 103c-1. A device 101 could verify the device provider certificate 104c with a certificate authority certificate 105c-1 stored within device, and then verify the network certificate 103c-1 with the device provider certificate 104c. Device 101 could then send a "finished" message 233-1 with a first device certificate 101c-1 and application data 110. Note that device 101 could select the first device certificate 101c-1 from the device certificate database 101k using extensions 219d in message 227, such as preferred parameters 111a'-1 for the certificate 103c-1. Network 103-1 could conduct the steps 244 in FIG. 2 in order to process the "finished" message 233-2. Device could conduct the steps 239 in FIG. 2 to derive encryption keys and session keys with a wireless network 102.

Device 101 could then conduct the move step 503 to switch or change to communicating with a second network 103-2. Device 101 could continue to store the network certificate 103c-1 for the first network 103-1. Note that if device 101 moves back to the first network 103-1 then device 101 could trust network certificate 103c-1 since it was previously securely received. Also, if additional, different devices 101 connect with the first network 103-1 using the provider ID 101a as a supported certificate authority, the network 103 can reuse the network certificate 103c-1 without generating another CSR 219c in a message 220.

In exemplary embodiments, a device 101 could record a first device provider certificate 104c with a first provider ID 104a of "Provider Europe" and a first PK.provider 104ca. Other possibilities exist as well, such as a date or a version number in the provider ID 104a (e.g. "Provider Version X"). Device provider 104c could use a SK.provider 104e with the provider ID 104. A device 101 could record a second device provider certificate 104c with a second provider ID 104a of "Provider Americas" and a second PK.provider 104ca. Upon a move 503, such as to a different geographical region with a different network as depicted in FIG. 5b (e.g. a change in location from Europe to the Americas), the device 101 could change the preferred provider ID 104a and associated supported certificate issuer in extensions 217a from the first provider ID 104a-1 to the second provider ID 104a-2.

Or, the move 503 could be a logical change of network or change of provider ID 104a by device 101 from a first provider 104a-1 to a second provider 104a-2, without requiring a physical movement of device 101. In exemplary embodiments, a logical move 503 could comprise device 101 changing the provider ID 104a from a first provider ID 104a to a second provider ID 104a, such as updating a version number supported and other possibilities exist as well. In addition, although the parameters 111a depicted in FIG. 5b could be different before move 503 and after move 503. The parameters 111a could be included in extensions 217a within a "client hello" message 218.

Further, although FIG. 5b depicts that device 101 can use two different provider IDs of 104a-1 and 104a-2 as a certificate issuer or certificate authority in a "client hello" message 218 with two different networks 103, the device 101 could use the same provider ID of 104a-1 with the two different networks 103. In addition, although FIG. 5b depicts that device 101 communicates with two different networks 103 with two different provider IDs of 104a-1 and 104a-2 as a certificate issuer or certificate authority in a "client hello" message 218, device 101 could send the same, single network 103-1 the different "client hello" messages 218-2 and 218-2 over time, where the first message 218-1 includes the first provider ID 104a-1 as the certificate authority for device 101, and the second message 218-2 to the same network 103-1 includes the second provider ID 104a-2 as the certificate authority for device 101.

This embodiment of sending the same network 103-1 two different provider IDs 104a could occur when device 101 conducts a logical move 503, such as device 101 changing or switch to use of a new configuration, such as device 101 preferring to use a new set of cryptographic algorithms 101s or cryptographic parameters 111, and other possibilities exist as well. For example, device 101 may prefer to change from an exemplary "Provider Version X" as first a provider ID 104a-1 in "client hello" message 218-1 to an exemplary "Provider Version Y" as a second provider ID 104a-2 in "client hello" message 218-2. For exemplary embodiments, a network certificate 103c as received by device 101 and signed by device provider 104 can change as depicted in FIG. 5b through the use of a different provider ID 104a as a certificate authority in a "client hello" message 218. In exemplary embodiments, the change of sending a first provider ID 104a-1 and a second provider ID 104a-2 could also occur when a first device provider certificate 104c-1 that contains the provider ID 104a-1 has been deprecated or revoked, and other possibilities exist as well.

For embodiments where device 101 conducts a move 503 from using a first network 103-1 to using a second network 103-2, device 101 can conduct the equivalent steps and send/receive the equivalent messages with the second network 103-2 as with the first network 103-1, as depicted in FIG. 5b. Device 101 could use a second device provider ID 104a-2 in a second "client hello" message 218-2 as a certificate authority, although in some embodiments device 101 could continue to use the same provider ID 104a-1 as a certificate authority in the second "client hello" message 218-2. In either case (message 218-2 uses either provider ID 104a-1 or provider ID 104a-2), a device 101 and the second network 103-2 will need a network certificate 103c-2 (i) that can be verified by device 101 and (ii) where the second network 103-2 operates with the SK.network 103f-2 for the public key in the network certificate 103c-2. The second network 103-2 could establish a secure session 202 with the device provider 104. The second network 103-2 can select a PK.network 103e-2 and associated private key SK.network 103f-2 and parameters 111a'-2. Note that the parameters 111a'-2 may be different than the parameters 111a'-1 for the first network 103-1, but both parameters 111a'-1 and 111a'-2 can belong to the set of parameters 111 depicted and described in connection with FIG. 4b.

The device provider 104 can receive a message 220-2 from the second network 103-2 with a CSR 219c for the PK.network 103c-2. The device provider 104 can conduct the steps 404 for the message 220-2. The device provider 104 can generate a network certificate 103c-2 for the second network 103-2. In some embodiments, device provider 104 could use and select a different SK.provider 104e for a digital signature steps 122' with the second network 103-2 than with the first network 103-1. In some embodiments, a device 101 could select a different name or value for the provider ID 104a within a CA field in extensions 217a in message 218, and a network 103 such as network 103-2 could forward the different value for the provider ID 104a in the message 220 to the device provider 104 with a CSR 219c. In other words, a device 101 could record a plurality of different device provider certificates 104c with different values or names for the certificate issuer as a provider ID 104a, where multiple values could be associated with the device provider 104.

The second network 103-2 can complete the TLS session setup using step 242 and 244 from FIG. 2, and device 101 could complete the TLS session setup using step 243 from FIG. 2. Note that device 101 could select the second device certificate 101c-2 from the device certificate database 101k using extensions 219d in message 227-2, such as preferred parameters 111a'-2 for the certificate 103c-2. Or, the device 101 could select the second device certificate 101c-2 from the device certificate database 101k using the provider ID 104a-2 as a certificate authority both (i) sent in a message 218 and (ii) received in a message 227. Additional steps for deriving session encryption keys between device 101 and wireless network 102 could include steps 239 and 238 from FIG. 2 as well.

Conclusion

Various exemplary embodiments have been described above. Those skilled in the art will understand, however, that changes and modifications may be made to those examples without departing from the scope of the claims.

The invention claimed is:

1. A method for a device to support an extensible authentication protocol-transport layer security (EAP-TLS) authentication with a network, the method performed by the device, the method comprising:
   a) storing (i) a plurality of device certificates for the device, (ii) a plurality of network certificates, (iii) a subscription permanent identifier (SUPI) for the device, and (iv) a network static public key;
   b) generating a first device ephemeral public key and a first device ephemeral private key;
   c) generating a subscription concealed identifier (SUCI) using the SUPI, the first device ephemeral private key, and the network static public key, wherein the SUPI and the SUCI include a plaintext value for an identity of the network;
   d) transmitting the SUCI to the network;
   e) generating a second device ephemeral public key and a second device ephemeral private key;
   f) sending the second device ephemeral public key to the network and receiving a server ephemeral public key and a ciphertext;
   g) generating a shared secret using the second device ephemeral private key and the server ephemeral public key;
   h) decrypting the ciphertext into a plaintext using the shared secret, wherein the plaintext includes at least a server certificate;
   i) selecting a network certificate from the plurality of network certificates using the identity for the network in the SUCI;
   j) verifying the server certificate using at least the selected network certificate; and
   k) generating an anchor key for communicating with the network, wherein the device generates the anchor key using at least the shared secret, the second device ephemeral public key, the server certificate, and the server ephemeral public key.

2. The method of claim 1, wherein the identity of the network comprises a realm within for the SUCI.

3. The method of claim 1, wherein the device (i) sends the second device ephemeral public key in a "client hello" message and (ii) receives the server ephemeral public key and the ciphertext in a "server hello" message, and wherein the "client hello" and "server hello" messages support a Transport Layer Security version 1.3, and wherein the network generates the "server hello" message.

4. The method of claim 3, wherein the "client hello" message includes extensions, and wherein the extensions include cryptographic parameters, and wherein the server ephemeral public key, and the second device ephemeral public key support the cryptographic parameters.

5. The method of claim 4, further comprising generating, by the device, the shared secret using an elliptic curve Diffie Hellman (ECDH) key exchange and the cryptographic parameters.

6. The method of claim 1, wherein the network includes at least one server and an authentication server function (AUSF).

7. The method of claim 1, wherein the network certificate comprises a device provider certificate.

8. The method of claim 1, wherein the SUCI includes a user name for the device as a ciphertext, and wherein the SUPI includes the user name for the device as a second plaintext.

9. The method of claim 1, wherein the device encrypts data for the network using at least the anchor key, and wherein the anchor key comprises at least one of a Kausf key and a Kseaf key, and wherein the device generates the anchor key with a hash-based key derivation function (HKDF) over at least (i) shared secret, (i) the second device ephemeral public key, (iii) the server certificate, and (iv) the server ephemeral public key.

10. The method of claim 1, further comprising (i) generating a shared symmetric ciphering key using at least the shared secret and a key derivation function with the shared secret, and wherein the key derivation function uses a secure hash algorithm, and (ii) decrypting the ciphertext into a plaintext using the shared symmetric ciphering key.

11. The method of claim 1, further comprising, after step j) and before step k), sending to the network a "client finished" message with a certificate verify for the device.

12. The method of claim 11, further comprising generating the anchor key for the network using at least the "client finished" message.

13. The method of claim 1, wherein the device stores a first device ephemeral private key for the first device ephemeral public key, and wherein the device encrypts the SUPI using the static public key and the first device ephemeral private key in order to generate the SUCI, and wherein the device sends the SUCI to the network.

\* \* \* \* \*